United States Patent
Essig, Jr. et al.

(10) Patent No.: US 6,897,832 B2
(45) Date of Patent: May 24, 2005

(54) INFLATABLE MULTI-FUNCTION PARABOLIC REFLECTOR APPARATUS AND METHODS OF MANUFACTURE

(76) Inventors: John R. Essig, Jr., P.O. Box 3333, Fairfax, VA (US) 22038-3333; James M. Essig, 3500 Burrows Ave., Fairfax, VA (US) 22030-2902

(*) Notice: Subject to any disclaimer, the term of this patent is extended or adjusted under 35 U.S.C. 154(b) by 0 days.

(21) Appl. No.: 10/156,814

(22) Filed: May 30, 2002

(65) Prior Publication Data

US 2003/0020667 A1 Jan. 30, 2003

Related U.S. Application Data

(60) Provisional application No. 60/294,440, filed on May 30, 2001.

(51) Int. Cl.[7] .......................... H01Q 15/00; H01Q 15/14
(52) U.S. Cl. ........................... 343/912; 343/915; 342/8; 342/10
(58) Field of Search ................................ 343/912, 915, 343/709; 342/8, 9, 10; 359/846, 848

(56) References Cited

U.S. PATENT DOCUMENTS

| | | | |
|---|---|---|---|
| 2,977,596 A | 3/1961 | Justice | |
| 3,005,987 A | 10/1961 | Mack et al. | |
| 3,221,333 A | 11/1965 | Brown | |
| 3,413,645 A | 11/1968 | Koehler | |
| 3,471,860 A | 10/1969 | Amburgey | |
| 4,352,112 A | 9/1982 | Leonhardt et al. | |
| 4,672,389 A | 6/1987 | Ulry | |
| 4,741,609 A | 5/1988 | Sallis | |
| 4,755,819 A | 7/1988 | Bernasconi | |
| 5,276,600 A | 1/1994 | Takase et al. | |
| 5,486,984 A | 1/1996 | Miller | |
| 5,836,667 A | 11/1998 | Baker et al. | |
| 5,893,360 A | 4/1999 | Stoumen et al. | |
| 5,920,294 A * | 7/1999 | Allen | 343/912 |
| 5,947,581 A | 9/1999 | Schrimmer et al. | |
| 5,967,652 A | 10/1999 | Ramer et al. | |
| 6,102,555 A | 8/2000 | Mizoguchi | |
| 6,106,135 A | 8/2000 | Zingale et al. | |
| 6,150,995 A | 11/2000 | Gilger | |
| 6,219,009 B1 * | 4/2001 | Shipley et al. | 343/915 |
| 6,238,077 B1 | 5/2001 | Ramer et al. | |
| 6,417,818 B2 * | 7/2002 | Shipley et al. | 343/915 |

FOREIGN PATENT DOCUMENTS

| | | |
|---|---|---|
| FR | 1.048.681 | 12/1953 |
| GB | 758090 | 9/1956 |
| JP | 59097205 | 6/1984 |

* cited by examiner

*Primary Examiner*—Tan Ho

(57) ABSTRACT

An inflatable, multifunction, multipurpose, parabolic reflector apparatus 10 having a plurality of manufactured parabolic mirrors 14, 16 made from a pressure-deformable reflective covering of an inflatable ring 12 for focusing electromagnetic energy from radio frequency radiation (RF) through the ultraviolet radiation (UV) and solar energy for (1) heating and cooking, for (2) electrical power generation, for (3) enhancing the transmission and reception of radio signals, for (4) enhancing vision in low-light environments, and for (5) projection of optical signals or images. The device also has non-electromagnetic uses, such as the collection of water. A first main embodiment utilizes two reflective membranes. A second main embodiment utilizes a reflective membrane and a transparent membrane. Portability is enhanced by complete collapsing of the inflatable device.

67 Claims, 58 Drawing Sheets

US 6,897,832 B2

INFLATABLE MULTI-FUNCTION PARABOLIC REFLECTOR APPARATUS AND METHODS OF MANUFACTURE

CROSS-REFERENCE TO RELATED APPLICATIONS

This application relates to co-pending PCT Patent Application Ser. No. PCT/US02/16918 filed May 30, 2002.

BACKGROUND OF THE INVENTION

1. Field of the Invention

The present invention relates most broadly to multifunction, field-deployable tools, which are principally configured for use as highly portable solar cooking, heating, and energizing apparatus, but which may also serve numerous other functions. More specifically, the present invention relates to multifunction, multipurpose, solar energy concentrating devices, which are typically specially configured to also effectively and reliably perform one or more other functions selected from a broad range of focused electromagnetic, non-focused electromagnetic, and non-electromagnetic functions, thereby rendering the invention highly amenable to a broad scope of practical applications.

In greater detail, the basic invention is an inflatable multifunction parabolic reflector apparatus made from pressure-deformable membranes, at least one of which is reflective, supported by an integral inflatable ring. A first main embodiment utilizes two or more pressure-deformable membranes, at least one of which, is reflective, in conjunction with the inner portion of the support ring to form a central reflector chamber, which generally can be inflated to either sub-ambient pressure (as required for most applications) or super-ambient pressure to deploy the reflective membrane(s). A second main embodiment utilizes at least one reflective membrane and at least one transparent membrane to form a central reflector chamber, which generally can be inflated only to super-ambient pressure to deploy the reflective membrane. The invention contemplates numerous optional features and accessory elements, which typically can be incorporated into both main embodiments of the device to increase performance, enhance safety, and/or facilitate use. The invention also contemplates various novel methods of manufacture as well as novel methods of using the inflatable multifunction parabolic reflector apparatus.

The present invention is generally optimized for concentrating, focusing, and beaming radiant electromagnetic energy and is effective over a wide range of the electromagnetic spectrum from radio frequency (RF) radiation through ultraviolet (UV) radiation including broad-spectrum solar energy. However, the present invention can also effectively and reliably perform numerous other functions not related to concentrating, focusing, and beaming radiant electromagnetic energy. Focused electromagnetic applications of the present invention include (1) heating, cooking, and processing materials by concentrated solar radiation, (2) generating electrical power, (3) enhancing the transmission and reception of radio signals, (4) enhancing vision in low-light environments, and (5) projecting optical signals or images. Non-focused electromagnetic applications include (1) use as an emergency thermal blanket, (2) use as an electromagnetic shield, and (3) use as an electrostatic insulator. Non-electromagnetic applications include (1) the collection and storage of water, (2) use as a water flotation device, (3) use as an inflatable cast, (4) use as a portable fermentor apparatus, and (5) the directional amplification of sound. The invention contemplates numerous other uses as discussed hereinbelow and as readily apparent to a user of the device.

Ultimately, the present invention serves as a highly portable, field-deployable, multifunction, multipurpose apparatus or tool, which can quickly and economically provide in the field (e.g., a significantly infrastructure-deprived environment or other selected environment) at least one life-enhancing or life-sustaining function or utility. More specifically, the invention can perform many of the life-sustaining functions and/or utilities routinely provided by much more massive, semi-portable apparatus and/or substantially fixed elements of infrastructure that are typically found within highly infrastructure-rich environments. Consequently, the highly portable multifunction apparatus of the present invention can rapidly, effectively, and economically replace, either temporarily or permanently, many of these life-sustaining apparatus and/or elements of infrastructure, examples of which include various domestic (i.e., household) appliances and/or other housewares; research, commercial, industrial, recreational, and/or military equipment; municipal power, water, and/or communication utilities; and the like. Accordingly, the present invention is ideally and uniquely suited to facilitate a broad range of activities including, for example, remote field work, emergency response, disaster relief, outdoor recreation (such as camping, backpacking, picnicking, boating, and the like), education, and other activities in terrestrial and/or non-terrestrial (e.g., space-based) environments.

2. Related Art a. DESCRIPTION

The related art of interest describes various electromagnetic energy harnessing devices, but none discloses the present invention. There is a need for an economical device useful for many different purposes and deflatable for portage and storage.

U.S. Pat. No. 3,326,624 issued on Jun. 20, 1967, to Wladimir von Maydell et al. describes an inflatable paraboloid mirror capable of being formed into a permanently rigid structure in outer space to collect solar energy for space stations and flying bodies. The mirror has a valved annular ring, radial segmental covers or strip springs, radial heating wires, and a valved double walled mirror formed with polyester foam coated with a reflector material. The ring and mirror have internal rigid spacers.

U.S. Pat. No. 5,920,294 issued on Jul. 6, 1999, to Bibb B. Allen describes a space antenna having an interior tensioned multiple cord attachment in a balloon which uses Mylar® for electromagnetic and solar energy applications in a first embodiment. A second embodiment utilizes an exterior tensioned cord attachment to a spacecraft of an antenna reflector of a gold-plated molybdenum or graphite wire mesh inside an inflated toroidal support balloon which uses Mylar® for electromagnetic and solar energy applications.

U.S. Pat. No. 4,352,112 issued on Sep. 28, 1982, to Fritz Leonhardt et al. describes a large reflector having an inner face of either a polished aluminum sheet or a plastic sheet backed by individual membrane segments of a rigid foam backing having a curved concave surface and an opening in its center. Two membranes formed as concave or convex reflectors are used to reflect and concentrate solar rays to a heat absorber, heat exchanger and the like.

U.S. Pat. No. 2,977,596 issued on Mar. 28, 1961, to Harold D. Justice describes an inflatable circular antenna saucer on a transmitter or receiver base.

U.S. Pat. No. 3,005,987 issued on Oct. 24, 1961, to Kent M. Mack et al. describes an inflatable antenna assembly comprising a radome covering an inflatable elliptical tubular membrane support having structural lacing and two concave sheets of flexible non-conducting sheets, wherein one sheet is coated with vaporized aluminum.

U.S. Pat. No. 3,056,131 issued on Sep. 25, 1962, to Ralph L. McCreary describes an inflatable reflector for electromagnetic radiation comprising two concave thin sheets of flexible plastic material, wherein at least one sheet having a parabolic shape.

U.S. Pat. No. 3,221,333 issued on Nov. 30, 1965, to Desmond M. Brown describes an inflatable radio antenna comprising an oblate bag aerial including a pair of spaced parallel insulating planar surfaces connected to a medial portion and having two antenna elements mounted parallel to form a capacitive plate antenna.

U.S. Pat. No. 3,413,645 issued on Nov. 26, 1968, to Richard J. Koehler describes an elongated inflatable parabolic radar antenna toroid assembly providing a small wave energy aperture in one plane and a larger wave energy aperture in a perpendicular plane.

U.S. Pat. No. 3,471,860 issued on Oct. 7, 1969, to Floyd D. Amburgey describes a reflector antenna having a variable or flexible surface, the geometrical shape of which may be changed by air pressure or a partial vacuum behind the flexible membrane for the purpose of obtaining the best reception from this antenna type.

U.S. Pat. No. 4,672,389 issued on Jun. 9, 1987, to David N. Ulry describes an inflatable reflector apparatus and a method of manufacture. A super-ambient pressure is maintained within the envelope which is maintained by a compression frame member.

U.S. Pat. No. 4,741,609 issued on May 3, 1988, to Daniel V. Sallis describes a stretched membrane heliostat having a membrane mounted on a circular frame, there being a double-walled portion of the membrane that extends in a circle near the periphery of the membrane to form a bladder that is inflatable to tension the membrane.

U.S. Pat. No. 4,755,819 issued on Jul. 5, 1988, to Marco C. Bernasconi et al. describes a parabolically-shaped reflector antenna intended for space vehicle applications. The device is inflated by a gas in space to form an antenna reflector and an antenna radome stabilized by a rigidizing torus. The covering material is a resin-impregnated fabric which when heated by the sun polymerizes to render the reflector antenna stable and requires no gas pressure to keep its shape.

U.S. Pat. No. 5,276,600 issued on Jan. 4, 1994, to Takase Mitsuo et al. describes a planar reflector composed of a base and a flexible polymeric plastic substrate having a highly reflective silver layer formed thereon and overlayed on the base with an adhesive layer interposed between the two layers.

U.S. Pat. No. 5,486,984 issued on Jan. 23, 1996, to Jack V. Miller describes a parabolic fiber optic light guide luminary device comprising an elongated fiber optic light guide having one end accepting light and the opposite end emitting light on a coaxially disposed optical axis near the focus of the paraboloidal reflector.

U.S. Pat. No. 5,836,667 issued on Nov. 17, 1998, to Glenn Baker et al. describes an electromagnetic radiation source or arc lamp located at a point displaced from the optical axis of a concave toroidal reflecting surface. The target is an optical fiber. A second concave reflector is placed opposite the first reflector to enhance the total flux collected by the small target.

U.S. Pat. No. 5,893,360 issued on Apr. 13, 1999, to O'Malley O. Stoumen et al. describes an inflatable solar oven comprising two sheets of flexible material sealed at their edges. The top sheet is clear and the bottom sheet has a reflective layer.

U.S. Pat. No. 5,947,581 issued on Sep. 7, 1999, to Michael L. Schrimmer et al. describes a light-emitting diode (LED) illuminated balloon comprising a gas-impermeable membrane containing gas and a self-contained illuminating LED.

U.S. Pat. No. 5,967,652 issued on Oct. 19, 1999, and U.S. Pat. No. 6,238,077 issued on May 29, 2001, to David P. Ramer et al. describes an apparatus for projecting electromagnetic radiation with a tailored intensity distribution over a spherical sector.

U.S. Pat. No. 6,106,135 issued on Aug. 22, 2000, to Robert Zingale et al. describes an inflatable translucent balloon having a light source attached suspended inside and tethered by an AC light source or a fiber optic. The light source can be an internal incandescent lamp, LED, laser, a flashing xenon lamp or a DC battery.

U.S. Pat. No. 6,150,995 issued on Nov. 21, 2000, to L. Dwight Gilger describes a combined photovoltaic array and a deployable perimeter truss RF reflector.

U.S. Pat. No. 6,219,009 issued on Apr. 17, 2001, to John Shipley et al. describes a tensioned cord and tie attachment of a collapsible antenna reflector to an inflatable radial truss support structure.

U.K. Patent Application No. 758,090 published on Sep. 26, 1956, for Charles T. Suchy et al. describes an inflatable balloon having arranged within a radio aerial.

France Patent Application No. 1.048.681 published on Dec. 23, 1953, for Adnan Tarcici describes a reflector for concentrating solar energy for cooking when camping.

Japan Patent Application No. 59-97205 published on Jun. 5, 1984, for Yasuo Nagazumi describes a parabolic antenna having an airtight chamber filled with nitrogen and demarcated with a radiating aluminum casing and a heat insulating mirror.

b. ADVANTAGES THEREOVER

The instant device is superior to the related art in at least six very significant respects. First, the instant device is superior to the related art as a result of its highly multifunctional, multi-purpose nature. It is noted that both the first and second embodiments of the instant device have numerous electromagnetic and non-electromagnetic utilities. In contrast, all related art is significantly more limited with respect to utilities and applications thereof. In greater detail, it is emphasized that none of the prior art makes any references to, or accommodations for, performing non-electromagnetic functions, such as water collection and storage, which is a critically important aspect of the present invention when the device is deployed in the field as a multifunctional survival tool.

Second, the instant device is superior to the related art as a result of its extremely lightweight and compactly foldable construction, which greatly facilitates portage and storage. As an example, note that a pocket-sized version of the instant device with a mass of approximately 125 grams and measuring only 9.0 cm by 12.0 cm by 1.0 cm when fully collapsed can be inflated to yield a fully deployed device having a 120 cm diameter primary reflector providing 1000 watts of highly concentrated broad-spectrum radiant energy when utilized terrestrially as a solar energy concentrating device. It is noted that such a device can thus provide an unprecedented mass-specific power output approximating 8000 watts per kilogram and a non-deployed, compactly folded, volume-specific power output (i.e., non-deployed power density) approximating 10 megawatts per cubic meter.

Third, the instant device is superior to the related art as a result of its precisely pre-formed reflective membranes and other optional features, which greatly increase the operational safety of the device. More specifically, the use of pre-formed parabolic reflective membranes (instead of planar membranes as generally used in related art) allows the device to have (and can limit the device to) relatively short and substantially fixed focal lengths, thereby enabling the user to maintain greater control over the location of any potentially dangerous, high concentrations of radiant energy. In addition, pre-formed, non-parabolic reflective membranes may be used to limit the maximum degree of energy concentration to lower and, thus, safer levels. Further, the use of optional integral safety cages, safety covers, and/or other safety features significantly reduces the risk of accidental exposure to high concentrations of electromagnetic radiation. Again, such features and their associated benefits are not contemplated by prior art.

Fourth, the instant device is superior to the related art in that it is easier to deploy (e.g., inflate) and operate. Note that by using pre-formed reflective membranes, such reflective membranes can be fully deployed using significantly less differential pressure across the membranes, thereby facilitating proper inflation. In addition, various optional elements may be incorporated into the device, which further enhance ease-of-use during deployment and/or operation. For example, such elements include (1) various novel means for supporting and/or orienting the device, (2) various novel apparatus for holding materials or accessory elements in proximity to the focal point, and (3) the use of simple, well-known inflation valves, which greatly facilitate deployment, even by persons having limited education or prior experience with solar concentrating apparatus. In contrast, except for the occasional use of well-known focal point supports, prior art neither contemplates nor anticipates such elements or the benefits thereof.

Fifth, the first embodiment of the instant device is more efficient in that it eliminates all loss-inducing intervening layers as contained within the optical paths of all closely related prior art, i.e., art employing pressure-deformable reflective membranes supported by an inflatable ring. Note that by employing a sub-ambient pressure reflector chamber, as in the first embodiment of the instant device, sunlight or other electromagnetic radiation can travel, unobstructed, from the energy source to the reflector and then to the target. Accordingly, the first embodiment of the instant device causes no (i.e., zero) losses of radiant electromagnetic energy as such energy travels to and from the reflector. In contrast, most related art requires sunlight or other electromagnetic radiation to pass through the transparent membrane of a super-ambient reflector chamber on its way to and from the reflector, thereby resulting in a plurality of losses. The remaining prior art, although utilizing a sub-ambient pressure reflector chamber, also requires the electromagnetic energy to pass through at least one intervening layer, such as a radome, again resulting in a plurality of losses. In general, these losses include the reflection, absorption, and diffusion of electromagnetic radiation by the intervening layer as the radiation travels to and from the reflector.

In greater detail, as light or other electromagnetic energy travels to the reflector, some of the energy is reflected by the outer surface of the intervening layer, through which the energy must pass on its way to the reflector. As the remaining energy travels through the thickness of the intervening layer, additional energy is absorbed and/or diffused as a result of molecular interaction. Next, as the remaining energy reaches the interior surface of the intervening layer, additional energy is reflected back through the intervening layer because of a difference between the indices of refraction of the intervening layer and the gas (typically air) located on the inner side of the intervening layer. For a device having a focal point located on the opposite side of the intervening layer from the reflector, these three loss-inducing processes are repeated as the reflected energy travels back through the intervening layer to the focal point, thus resulting in a total of six significant transmission losses. Furthermore, energy which does manage to successfully pass through the intervening layer is still subject to unwanted diffusion or dispersion due to the optically imperfect surfaces of the intervening layer. Ultimately, the intervening layers of prior art are typically responsible for reducing the efficiency of such devices by as much as twenty percent, or more, depending upon the wavelength of the impinging radiation and the transmission characteristics of the material or materials comprising the intervening layer.

Sixth, the instant device is superior to the related art as a result of its extremely simple, highly integrated structure, which has been specially configured to facilitate high-speed mass-production, thereby making the device very economical to produce. Note that the designs specified in the related art do not demonstrate the high degree of integration and resulting simplicity of construction to the extent specified herein for the instant device. Also note that the relative simplicity of the instant device is due, in part, to the fact that its reflective membrane(s) can be deformed into substantially parabolic surfaces utilizing only the surrounding ambient (i.e., atmospheric) pressure and simple, manually-operated, integral valves. In contrast, all related art relies on complex mechanical arrangements, complex electrostatic systems, or complex pressure adjusting systems to deform the reflective membranes into substantially parabolic surfaces.

It should be noted that each of the above aspects of the instant invention, taken separately, represents a significant improvement over prior art. However, in combination, these superior aspects of the instant invention represent an enormous improvement over prior art, the significance of which should not be underestimated. More specifically, as a result of possessing all of the noted improvements over prior art, the instant invention can effectively serve as a highly multifunctional, highly portable, generally safe-to-operate, easy-to-use, high-performance, and highly economical tool—a tool which has the ability to significantly enhance one's ability to enjoy and/or survive a variety of difficult or demanding physical environments, which, for a variety of reasons, have few if any of the typical life-sustaining facilities or elements of infrastructure upon which much of humanity is presently highly dependent. In particular, the device offers greatest benefits to persons who are suddenly and unexpectedly forced to dwell in regions of the world in which basic food preparation facilities, potable water systems, or other critical elements of the local infrastructure have been either destroyed or otherwise rendered inoperable, whether as a result of war, natural disaster, or other crisis. Under such circumstances, it should be noted that the efficacy with which emergency supplies and temporary infrastructure can be reestablished within the disaster area directly affects the quality of life and, more importantly, the survival rate of the persons located in the affected region. Ultimately, to alleviate as much general hardship as possible, but also to minimize the mortality rate, substitute temporary-use facilities need to be reestablished throughout the affected region in sufficient quantities, and with a minimum of time, effort, and expense. Due to its low cost, ease-of-use, and high degree of portability, the multifunction device disclosed herein is ideally and uniquely suited to facilitate such emergency or disaster relief efforts. As a result, the instant invention provides a highly effective method for meeting this unending global need—an aspect of the invention that is neither contemplated nor anticipated by prior art.

The device can also be of great benefit to individuals living, working, or traveling in underdeveloped or neglected parts of the world. For the outdoorsman or explorer, the device can serve as an invaluable multifunctional survival tool. In addition, as noted above, the device can offer many benefits to persons who choose to participate in a variety of outdoor recreational activities for which portable food preparation facilities and/or other functions of the instant invention are either needed or desired. Further, is should be noted that the highly economical device is ideally suited for use as an instructional aide for teaching students or other interested parties about solar energy. Considering the world's dwindling supply of fossil fuels and other conventional fuels—especially in conjunction with the present ever-increasing global demand for energy—worldwide education about solar energy is becoming increasingly necessary to protect the environment, sustain the global economy, and ensure a reasonable quality of life for all creatures inhabiting the Earth. Once again, these additional purposes and benefits are neither contemplated nor anticipated by prior art.

As one reads subsequent sections of this document, it will become quite clear that the first and second embodiments of the instant device are also superior to the related art in a variety of other ways including, among other items, various novel methods of manufacturing, deploying, and using the inflatable multifunction parabolic reflector apparatus.

SUMMARY OF THE INVENTION

The basic invention, in its preferred embodiments, is a portable, multifunction, multipurpose, inflatable parabolic reflector apparatus principally made from pressure-deformable (i.e., pressure-deployable) membranes, of which at least one is reflective, supported by an integral inflatable tubular ring. The apparatus is primarily configured for use as a highly portable solar cooking, heating, and/or energizing device; however, the apparatus is typically (but not necessarily) specially configured to also effectively and reliably perform, either by itself or in conjunction with various optional accessory elements of the present invention, one or more other functions selected from a broad range of focused electromagnetic, non-focused electromagnetic, and non-electromagnetic functions. Hence, the invention is a highly portable, selectably deployable, multifunction tool, which is highly amenable to a broad scope of practical applications.

In greater detail, the present invention is generally optimized for concentrating, focusing, and beaming radiant electromagnetic energy and is effective over a wide range of the electromagnetic spectrum from radio frequency (RF) radiation through ultraviolet (UV) radiation including broad-spectrum solar energy. However, as indicated above, the present invention can also effectively and reliably perform numerous other functions not related to concentrating, focusing, and beaming radiant electromagnetic energy. Focused electromagnetic applications of the present invention include 1) heating, cooking, and processing materials by concentrated solar radiation, (2) generating electrical power, (3) enhancing the transmission and reception of radio signals, (4) enhancing vision in low-light environments, and (5) projecting optical signals or images. Non-focused electromagnetic applications include 1) use as an emergency thermal blanket, (2) use as an electromagnetic shield, and (3) use as an electrostatic insulator. Non-electromagnetic applications include (1) the collection and storage of water, (2) use as a water flotation device, (3) use as an inflatable cast, (4) use as a portable fermentor apparatus, and (5) the directional amplification of sound. The invention contemplates numerous other uses as discussed hereinbelow and as readily apparent to a user of the device. However, it is emphasized that any particular embodiment or manifestation of the present invention need not perform all such functions, i.e., a particular embodiment can be configured to perform a limited number or subset of these functions without departing from the nature of the invention.

A first main embodiment utilizes two pressure-deformable membranes, at least one of which is reflective, in conjunction with the inner portion of the support ring to form a central reflector chamber, which generally can be inflated to either sub-ambient pressure (as required for most applications) or super-ambient pressure to deploy the reflective membrane(s). A second main embodiment utilizes at least one reflective membrane and at least one transparent membrane to form a central reflector chamber, which generally can be inflated only to super-ambient pressure to deploy the reflective membrane. Both embodiments generally employ one or more reflective membranes, which are pre-formed substantially into the shape of a paraboloid to enhance safety and facilitate operation. (It is noted that a "pre-formed" pressure-deformable membrane is a membrane which is fabricated to substantially embody or possess its pressure-deformed shape, i.e., its deployed surface contour, prior to the application of differential pressure across the membrane.) However, the use of non-preformed, i.e., planar, reflective membranes is contemplated to enable a variable focal length. Further, the use of pre-formed, non-parabolic reflective membranes, e.g., reflective membranes having surfaces which are spherical, undulating, a series of conic sections, and the like, is contemplated to limit the maximum degree of concentration to further enhance safety. Numerous optional features and accessory elements typically can be incorporated into both main embodiments of the device to increase performance, further enhance safety, and/or facilitate use.

Specific portable apparatus are shown primarily for the first main embodiment (as exemplary for both main embodiments) which greatly facilitate or enable a wide range of useful applications such as (1) the concentration and collection of broad-spectrum solar energy for cooking, heating, distillation, and power generation, (2) the reception and transmission of radio signals, (3) the illumination of interior, subterranean, and underwater environments, (4) the collection and storage of water or other liquids, and (5) the directional amplification of sound. Additionally, the invention contemplates that many other portable apparatus may be provided for these and other useful purposes by judiciously combining the basic apparatus or alternate configurations thereof with any of the numerous optional features and/or accessory elements of the present invention, i.e., the invention is not limited to the specific examples shown and/or described herein.

The invention also contemplates various novel methods of manufacture. More specifically, fabrication processes are disclosed for economically producing the instant invention from multiple, thin, flexible (e.g., pressure-deformable) membranes.

Ultimately, the present invention serves as a highly portable, field-deployable, multifunction, multi-purpose apparatus or tool, which can quickly and economically provide in the field (e.g., a significantly infrastructure-deprived environment or other selected environment) at least one life-enhancing or life-sustaining function or utility. More specifically, the invention can perform many of the life-sustaining functions and/or utilities routinely provided by much more massive, semi-portable apparatus and/or substantially fixed elements of infrastructure that are typically found within highly infrastructure-rich environments. Consequently, the highly portable multifunction apparatus of the present invention can rapidly, effectively, and economically replace, either temporarily or permanently, many of these life-sustaining apparatus and/or elements of infrastructure, examples of which include various domestic (i.e., household) appliances and/or other housewares; research, commercial, industrial, recreational, and/or military equipment; municipal power, water, and/or communication utilities; and the like. Accordingly, the present invention is ideally and uniquely suited to facilitate a broad range of activities including, for example, remote field work, emergency response, disaster relief, outdoor recreation (such as camping, backpacking, picnicking, boating, and the like), education, and other activities in terrestrial and/or non-terrestrial (e.g., space-based) environments.

OBJECTS AND ADVANTAGES

Accordingly, it is a principal object of the invention to provide a highly portable, multifunction, multipurpose apparatus and fabrication methods thereof, which is generally optimized for use as a substantially parabolic reflector to focus electromagnetic energy from radio frequency radiation (RF) through ultraviolet radiation (UV) including solar radiation (or a predetermined subset thereof), but which typically can also be used for numerous other electromagnetic and/or non-electromagnetic utilities. Regarding the multi-functional nature of this invention, specific (but optional) objects of this invention are:

(a) to provide a highly portable multifunction apparatus for concentrating broad-spectrum (i.e., solar) radiation for cooking, heating, sterilizing, distilling, material processing, and/or for other purposes requiring or benefiting from the application of radiant heat, which may optionally utilize various accoutrements specially configured for absorbing concentrated solar radiation including, for example, a solar oven or autoclave having a high-emissivity (generally blackened) energy-absorbing external surface;

(b) to provide a portable multifunction apparatus for generating electrical power utilizing turboelectric, thermoelectric, and/or photoelectric devices;

(c) to provide a portable multifunction apparatus which can be utilized to concentrate light radiating from a relatively dim source, such as a street lamp, to operate (and/or recharge) an otherwise inoperable, low-power, photovoltaic device, such as a handheld calculator;

(d) to provide a portable multifunction apparatus which can be used for enhancing or enabling radio, microwave, and/or satellite communications, and/or for enabling radio-telescopy;

(e) to provide a portable multifunction apparatus for enhancing vision in darkened environments by concentrating visible light radiating from a dim source, such as a crescent moon, onto an object to be viewed;

(f) to provide a portable multifunction apparatus for enhancing vision in darkened environments by projecting light from non-collimated sources, such as a candle, into dark environments;

(g) to provide a highly portable multifunction apparatus for enabling or enhancing optical signal communications, such as when used with a non-collimated light source held at the focal point to form a signal beacon;

(h) to provide a portable multifunction apparatus employing a waveguide system to capture and deliver panchromatic visible light (or other useful spectral range of radiation) to interior, subterranean, and/or underwater environments to enhance vision and/or to operate equipment such as an optical image projector;

(i) to provide a portable multifunction apparatus which can serve as a multi-layer emergency thermal blanket, electrostatic insulator, and/or electromagnetic energy shield to protect a person or object, but which also allows a person or object to hide from an infrared (IR) camera or otherwise be shielded from an electromagnetic imaging or detection device;

(j) to provide a portable multifunction apparatus which can serve as a soft, compliant support for persons or objects, including use as an inflatable cast;

(k) to provide a portable multifunction apparatus which can be used as a water flotation device, boat, or snow sled;

(l) to provide a portable multifunction apparatus which can be used to capture, store, process, and/or distribute water, other liquids, and/or certain solid materials, for which various optional accoutrements (such as catchment rings, gutters, funnels, filters, tubes, valves, pumps, and the like) can be either integrally or removably incorporated into the apparatus;

(m) to provide a portable multifunction apparatus incorporating a high-emissivity surface, such as a matte black surface, which can be used to collect water at night by radiative condensation processes;

(n) to provide a portable multifunction apparatus which can be used as a fermentor, which in conjunction with the distillation function noted above, allows the apparatus to produce high grade spirits for fuel, medicinal, and other purposes;

(o) to provide a portable multifunction apparatus for the directional amplification of sound; and/or (p) to provide a portable multifunction apparatus optionally incorporating one or more pressure-deformable, planar, reflective membranes to allow the device to have a variable focal length.

A second main object of the invention is to provide a multifunction apparatus which optionally is extremely lightweight, fully collapsible, and compactly foldable so as to greatly facilitate portage and storage, thereby providing a high performance apparatus which is ideally suited to camping, backpacking, picnicking, boating, emergency use, disaster relief, and/or other situations (terrestrial or space-based) for which high mass-specific and/or high volume-specific performance is critical. Regarding portage and storage, specific (but optional) objects of this invention are:

(a) to provide a multifunctional apparatus having a primary structure comprised entirely of thin and/or very thin, high-strength membranes to minimize weight;

(b) to provide a multi-functional apparatus which is inflatable (rigidizable and otherwise fully deployable) by using pressurized gas which generally need not be carried with the device;

(c) to provide a multifunctional apparatus which is fully collapsible and compactly foldable when not in use to minimize volume;

(d) to provide a multifunctional apparatus which, due to its extremely low weight and stored (non-deployed) volume, yields very high mass-specific and volume-specific performance approximating 8000 watts per kilogram and 10 megawatts per cubic meter, respectively, when used terrestrially as a broad-spectrum solar concentrator; and/or (e) to provide a multifunctional device having extremely lightweight and compact inflation valves, for example, valves made from membranous material and including an interlocking tongue-and-groove (i.e., "Ziploc®"-type), clamped or tied, or self-sealing type closure mechanism.

A third main object of the invention is to provide a multifunctional apparatus which optionally is safer to operate, transport, and/or store. Regarding safety, specific (but optional) objects of this invention are:

(a) to provide a portable multifunctional apparatus having an integral safety cage which forms a physical barrier around the focal point, thereby preventing accidental exposure to potentially dangerous concentrations of electromagnetic radiation;

(b) to provide a portable multifunctional apparatus having an integral safety cover to block radiation from striking the reflective membranes when the device is not in use, thereby preventing the formation of and, thus, the risk of accidental exposure to potentially dangerous concentrations of electromagnetic radiation at or near the focal point;

(c) to provide a portable multifunctional apparatus having an integral reflector wrinkling mechanism for distorting the reflective membranes when not fully deployed (pressurized), thereby once again substantially preventing the formation of any unintentional, potentially dangerous concentrations of electromagnetic energy;

(d) to provide a portable multifunctional apparatus having one or more pre-formed parabolic reflective membranes, which limit the device to substantially fixed, short focal lengths, thereby enhancing safety by giving the operator greater control of the location of the highly concentrated energy at the focal point; and/or (e) to provide a portable multifunctional apparatus having one or more pre-formed, non-parabolic reflective membranes to limit the maximum degree of energy concentration to lower and, thus, safer levels.

A fourth main object of the invention is to provide a portable multifunctional apparatus that optionally is easier to deploy and/or operate. Regarding ease of use, specific (but optional) objects of this invention are:

(a) to provide an apparatus having various integral securing and storage features such as handles, apertured tabs, ties, weighting and storage pouches (especially those which are lightweight, compact, and can be made from extensions of the membranes out of which the device is composed);

(b) to provide an apparatus having various integral accessory hardware attachment devices such as clevises, clips, brackets, sockets, hook-and-loop patches, and other common fastening mechanisms;

(c) to provide an apparatus having various lightweight, portable mechanisms for supporting and orienting the device including, for example, an inflatable adjustable dipody support, a stack of inflatable tapered support/leveling rings, and/or an inflatable substantially hemispherical mounting element with a separate optional inflatable.(floating) support ring;

(d) to provide an apparatus having lightweight, portable mechanisms for holding various items and/or accoutrements at or near the focal point including, for example, a collapsible, multipurpose rotisserie/kettle support, a collapsible multi-leg focal point support, and/or an inflatable focal point support;

(e) to provide an apparatus having one or more pre-formed, pressure-deformable reflective membranes, which can be fully deployed using significantly lower differential pressures across the membranes than devices employing planar reflective membranes, thus facilitating proper inflation;

(f) to provide an apparatus having integral orientation and alignment features, such as a visual alignment guide, inclinometer, level, and/or magnetic compass, to facilitate alignment with an electromagnetic source and/or target, and/or for orienting the device for other purposes;

(g) to provide an apparatus having a light/heat intensity controller such as a louver or iris mechanism which is manually or automatically controlled; and/or (h) to provide an apparatus having various integrally or separately attached electronic and/or mechanical elements to facilitate various applications including but not limited to photovoltaic cells, electric pumps, fans, drivers, timers, thermostats, controllers, and/or other useful devices.

A fifth main object of the invention is to provide a portable multifunctional apparatus which optionally is more efficient, wherein two pressure deformable membranes are utilized to form a sub-ambient concave-concave reflector chamber configuration, thereby eliminating the plurality of losses inherent in devices having one or more intervening layers in the optical path, such as a transparent membrane of a super-ambient reflector chamber, through which light must pass at least once on its way to or from the focal point.

A sixth main object of the invention is to provide a portable multifunctional apparatus which optionally is highly economical by virtue of its extremely simple, highly integrated construction, and which can thus be made universally available for both routine use as well as educational purposes. Regarding economy, specific (but optional) objects of this invention are:

a) to provide an apparatus (first and/or second main embodiment) made from a plurality of (generally four or more) sheets of thin, high-strength, high-elastic-modulus (preferably), commercially available material(s), plus the necessary valves, using a substantially flat pattern fabrication method that greatly simplifies manufacturing tooling and processing, thereby reducing fabrication cost; and/or (b) to provide an apparatus (second embodiment) which can be fabricated from as few as two thin sheets of high-strength, commercially available material(s), plus the necessary valves, using simple, well-established manufacturing processes.

A seventh main object of the invention is to provide a portable multifunctional apparatus that is optionally highly drop tolerant and/or otherwise damage tolerant. Regarding drop/damage tolerance, specific (but optional) objects of this invention are:

(a) to provide an apparatus having one or more redundant reflector chambers such that if one reflector chamber is damaged, the device is still operable; and/or (b) to provide an apparatus constructed primarily of highly flexible materials such that the apparatus can be dropped intentionally (e.g., air dropped) and/or unintentionally (i.e., accidentally) yet sustain no appreciable damage.

An eighth main object of the invention is to provide a portable multifunctional apparatus that is highly environmentally friendly by virtue of the fact that the apparatus generally requires no fuel to operate. Instead, the instant invention typically relies solely on radiating solar energy when used for heating, cooking, and the like, thereby minimizing air, water, and ground pollution. This is in stark contrast to other common portable cooking and heating equipment, which generally rely on the combustion of hydrocarbon fuels and, thus, inherently cause pollution through both combustion processes and unintentional fuel releases (e.g., spills, leaks, vapor releases, and the like).

It is a further object of the invention to provide improved elements and arrangements thereof for the purposes described which is inexpensive, dependable, and fully effective in accomplishing its intended purposes.

These and other objects of the present invention will become readily apparent upon further review of the following specification and drawings. However, it is once again emphasized that any particular embodiment or manifestation of the present invention need not perform all such functions or otherwise meet all such objects of the present invention as noted herein, thus prompting the use the term "optional" and/or "optionally" when referring to the various objects of the invention in several of the preceding paragraphs. Specifically, any particular embodiment of the present invention can be configured to perform and/or meet only a limited number (or subset) of these functions and/or objects without departing from the basic nature of the invention.

BRIEF DESCRIPTION OF THE DRAWINGS

FIG. 50C is a schematic cross-sectional view of the. FIG. 50A third species in a second subspecies flat pattern, wherein the outer layers of the support ring are extensions of the reflective membranes.

FIG. 53A also represents the first subspecies of this sixth species in an as-manufactured condition wherein the support ring is made from two fully pre-formed sheets and, thus, is indistinguishable from its inflated condition.

DETAILED DESCRIPTION OF THE PREFERRED EMBODIMENTS

The basic device is an inflatable, multifunction, multipurpose parabolic reflector apparatus intended for use primarily as a highly portable combination solar cooking, heating, and/or energizing device and field-deployable multifunction survival tool. More specifically, the basic device is a radiant electromagnetic energy concentrating, focusing, and beaming type apparatus which manipulates radiant energy through the implementation of at least two pressure-deformable (i.e., pressure-deployable) membranes, at least one of which must be reflective, supported by an inflated toroid or tubular ring, which is generally (but not necessarily) toroidal in shape, and which defines a vacant center. The device is generally effective over a wide range of the electromagnetic spectrum from radio frequency (RF) through ultraviolet (UV) including broad-spectrum solar energy (or a predetermined portion or subset thereof). Although generally optimized for various electromagnetic applications, it is emphasized that this highly multifunctional device is also amenable to numerous non-electromagnetic applications. Consequently, the multifunction apparatus is selectably deployable by the user or operator of the apparatus to perform at least one user-selectable function, typically within a user-selectable environment.

Figure 1:
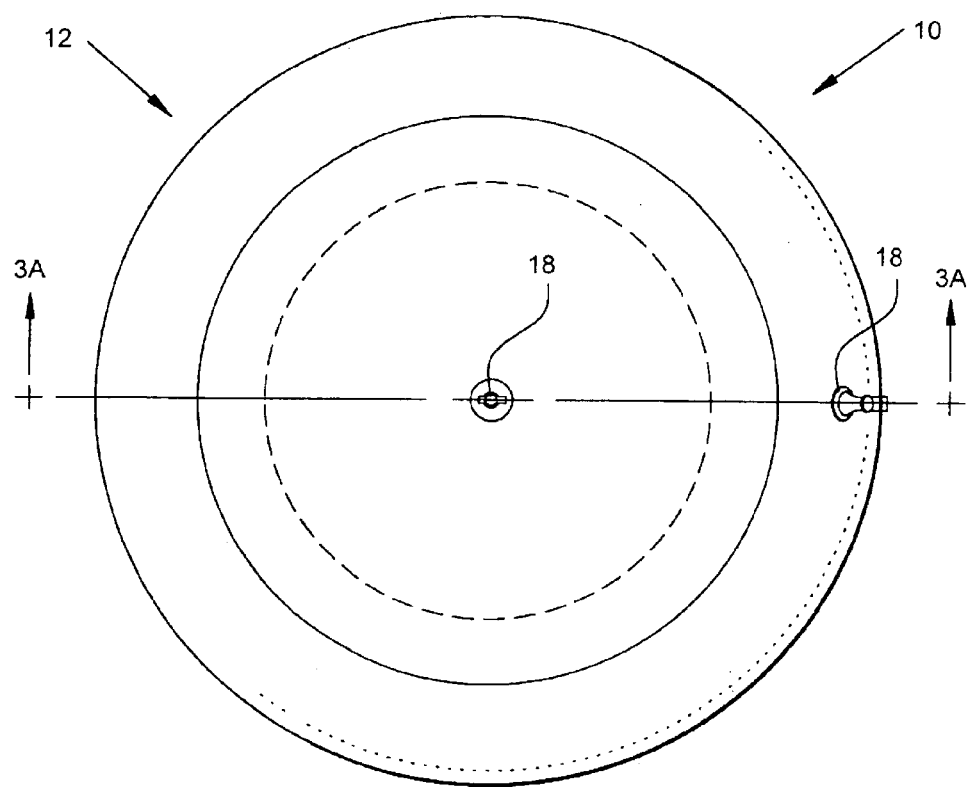
FIG. 1 is a top plan view of a first main embodiment device having an inflatable torus-shaped member which supports two central pressure-deformable circular membrane devices with the circular frontal membrane and the circular rear membrane having concave reflective surfaces when deployed in sub-ambient mode.
Figure 56:
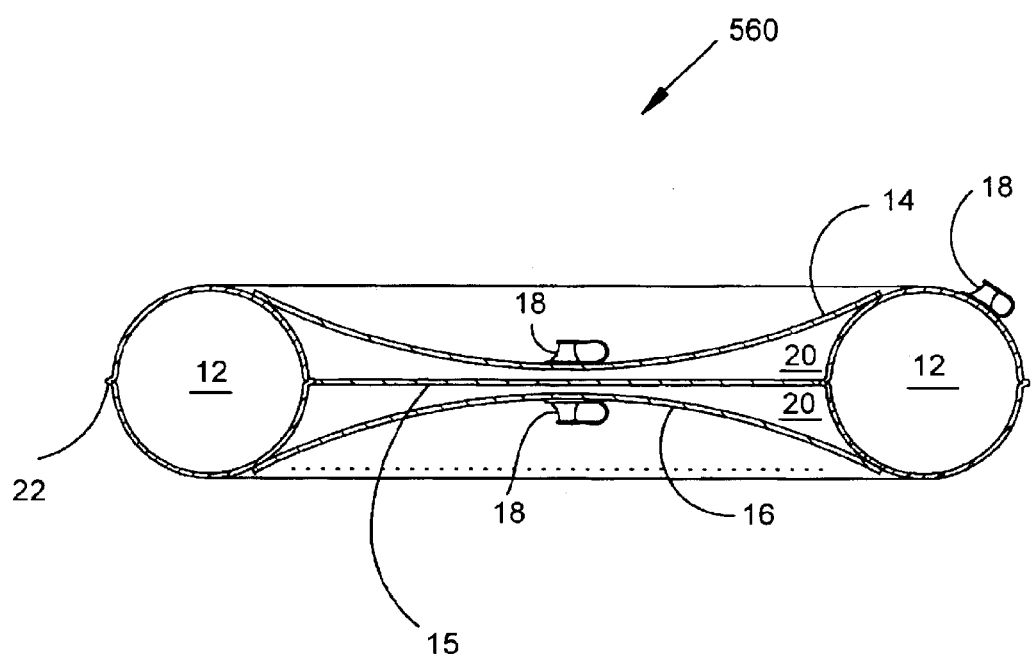
FIG. 56 is a schematic diametric elevational cross-sectional view of a ninth species of the first main embodiment having two reflective outer membranes and a non-reflective center membrane serving to form a redundant reflector chamber.

A first preferred main embodiment of the basic device illustrated in FIGS. 1 through 56 has a central reflector chamber (i.e., pressure envelope) defined by at least two central pressure-deformable membranes, at least one of which must be reflective (for electromagnetic applications), and the inner portion of the support ring. This reflector chamber configuration, which is the primary distinguishing feature of the first main embodiment, can be inflated to either a sub-ambient pressure to form a concave-concave reflector configuration as is preferred for most applications (i.e., deployed in sub-ambient mode), or to a super-ambient pressure to form a convex-convex lens configuration ideally suited to other applications (i.e., deployed in super-ambient mode). When operated as a terrestrially based solar concentrator in sub-ambient mode, the first main embodiment device has an effective capture efficiency exceeding 90% and the ability to concentrate sunlight by factors in excess of 10,000.

A second main embodiment of the basic device illustrated in FIGS. 57 through 64 has a central reflector chamber generally comprising only one or more reflective membranes and one or more transparent membranes (i.e., the support ring does not form a substantial part of the reflector chamber in the second main embodiment). This reflector chamber configuration of the second main embodiment generally can be inflated to only a super-ambient pressure to form a convex-convex lens configuration (i.e., deployed in super-ambient mode). When operated as a terrestrially based solar concentrator, the second embodiment of the device typically has an effective capture efficiency of 75–85%.

Although less efficient than the first embodiment when used as a broad-spectrum solar concentrator, the second embodiment of the device closely matches the efficiency of the first embodiment when used for radio frequency electromagnetic applications, and it can often meet or exceed the efficiency or effectiveness of the first embodiment when used for various non-electromagnetic applications. In addition, the second embodiment can be of extremely simple construction and, thus, very economical to produce. However, is should be noted that both the first and second main embodiments posses very simple, highly integrated structures, which can be economically fabricated from commercially available materials using well-established manufacturing processes. The fabrication of the central pressure-deformable membranes and support rings by joining different numbers of pieces of thin, flexible material is illustrated in detail for the first main embodiment; however, most of these methods of manufacture are equally amenable to one or more species of the second embodiment. It should be noted that most of the various optional features, accessory elements, alternate configurations, specialized apparatus, and practical applications shown for the first main embodiment also apply to the second main embodiment. The invention further contemplates that both the first and second main embodiments may incorporate any judicious combination or arrangement of such optional features, accessory elements, alternate configurations, and/or improvements thereof to provide specialized apparatus for any of the purposes disclosed herein or as known to the user of the apparatus, i.e., the invention is not limited to the specific examples shown and/or described herein.

Figure 2:
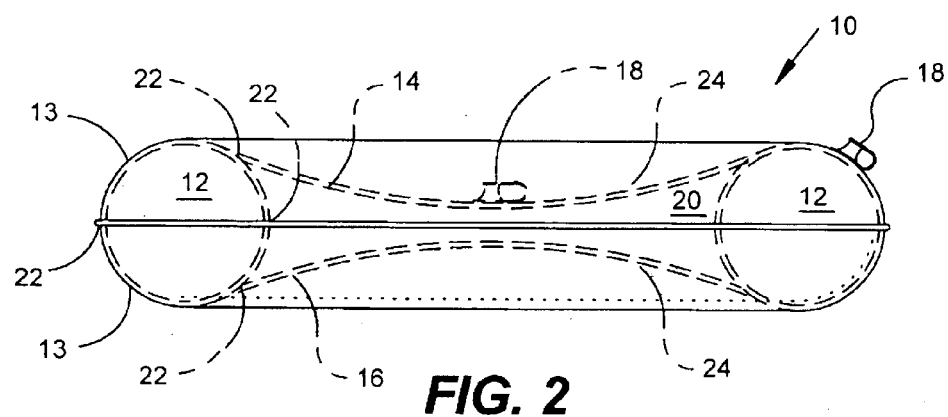
FIG. 2 is a schematic side elevational cross-sectional view of the first main embodiment device deployed in sub-ambient mode depicting an inflatable toroidal support ring supporting two concavely deformed central pressure-deformable reflective membranes shown in shadow.

FIGS. 1–7—Description and General Operation of the Basic Configuration of the First (Preferred) Main Embodiment In FIGS. 1 and 2, the first main embodiment device 10 is illustrated as an inflated toroid or support ring 12 having a circular cross-section and supporting an upper frontal elastic reflective membrane 14 and a lower rear redundant elastic reflective membrane 16. The two central reflective membranes 14, 16 in conjunction with the inner portion of the toroidal support ring 12 provide a central reflector chamber (i.e., pressure envelope) 20 with a double parabolic concave-concave reflector configuration when inflated to a sub-ambient pressure, i.e., deployed in sub-ambient mode. The membrane 14 has a centered inflation valve 18 as an example of a pressure-adjusting or inflation means for inflating or adjusting the pressure within the central reflector chamber 20. The inflatable toroidal support ring 12 also has a valve 18 as an example of an inflation means for inflating the support ring to form a rigid ring (two valves are shown for separate inflation of the support ring and the reflector chamber). It should be noted that by utilizing the inner portion of the support ring as an integral part of the reflector chamber, the first embodiment device 10 can be manufactured very economically from a minimum number of pieces.

The toroidal support ring 12 is fabricated from two sheets 13, which are substantially flat and annular prior to inflation, and which are adhesively or thermally bonded to each other along continuous seams 22 at their inner and outer periphery to form a toroid upon inflation, as one example of forming the toroid. The two sheets 13 comprising the toroid 12 are made of a high-strain-capable material, i.e., a material having high strength and low elastic modulus, such as vinyl, which is necessary for allowing the inner potion of a toroid fabricated from flat annular sheets to strain (i.e., stretch) sufficiently so as not to impede full inflation of the toroidal support ring 12.

The central pressure-deformable membranes 14, 16 are made from thin circular sheets of high-strength, flexible material such as Mylar®, a polyethylene terephthalate plastic composition. Reflective surfaces 24 are provided by preferably coating the outer side of the membranes 14, 16 with vapor deposited aluminum and the like reflective material, as one example of a means for reflecting radiant electromagnetic energy. The reflective membranes 14, 16 are thermally or otherwise pre-formed during fabrication into the shape of a paraboloid to provide a short, fixed focal length for safety purposes (as one example of a means and/or method for enhancing the safety of an apparatus having a pressure-deformable reflective membrane), and to reduce the differential pressure required to fully deform and smooth the reflective membranes 14, 16, thus facilitating deployment as well as reducing the loads imposed on the support ring by the central membranes (i.e., mechanical loads) and the reflector chamber (i.e., pressure loads). Seams 22 are shown for adhesively or thermally bonding the periphery of the reflective membranes 14, 16 to the toroid 12 at or near what will become circular lines of tangency between the parabolic reflective membranes 14, 16 and the toroidal support ring 12 upon inflation.

Numerous alternate toroid configurations can be incorporated (i.e., substituted) into the basic first embodiment device as described above. FIG. 1 shows that the toroidal support ring 12 has a circular planform; however, it is noted that the invention can be practiced using other types of support rings including those having hexagonal, square, rectangular, elliptical, and other planforms. (Note that planforms having at least one substantially or effectively linear peripheral edge may prove useful for orienting and/or stabilizing the apparatus.) Furthermore, as will be shown below, the simple two-sheet construction of the toroid as described above may be replaced with various alternate toroidal support rings offering greater performance and stability, but generally at the expense of somewhat greater complexity. Additionally, it should be noted that the invention is not intended to be limited to the specific materials and/or configurations as specified above for the toroid. Depending on the configuration, the toroid can be made from any suitably flexible material.

Similarly, numerous alternate central pressure-deformable membrane configurations can be incorporated (i.e., substituted) into the basic first embodiment device as described above. As will be shown below, the invention can be practiced using planar (i.e., non-pre-formed) pressure-deformable reflective membranes to yield a device capable of providing a variable focal length as a function of the differential pressure imposed across the reflective membranes 14, 16. Furthermore, the use of pre-formed, non-parabolic reflective membranes (e.g., reflective membranes having surfaces which are spherical or undulating, or which comprise a series of conic sections, and the like) is contemplated to limit the maximum degree of concentration to further enhance safety and/or to provide more uniform heating. It should be noted that the invention is not intended to be limited to the specific materials and/or configurations as specified above for the central pressure-deformable membranes. Similar to the toroid, depending on the configuration, the central membranes can also be made from any suitably flexible material. Additionally, the apparatus may optionally incorporate other means for reflecting radiant electromagnetic energy. For example, the reflective surfaces can be provided by plastic reflective membranes, which alternatively have reflective particles homogeneously incorporated, or which contain an integral conductive wire or mesh, all of which tend to selectively reflect or filter the impinging radiation. Also, the device may optionally incorporate membranes having other arbitrary but useful optical properties such as transparency, color, and/or texture (e.g., a transparent membrane per FIG. 30 or a membrane having a matte-black surface per FIG. 45) for practical and/or artistic applications.

To fully deploy the basic first embodiment device 10 in sub-ambient mode as shown in FIGS. 1 and 2, the device, which is typically compactly folded for storage and portage, is first unfolded to gain access to the two inflation valves 18. Subsequently, the toroidal support ring 12 is inflated to a super-ambient pressure to rigidize the support ring 12 as is necessary to properly support and tension the reflective membranes 14, 16. The reflector chamber 20 is then inflated to a sub-ambient pressure (as is required for most applications) to deform and smooth the reflective membranes 14, 16 into concave parabolic reflectors. Finally, the focal axis of one of the parabolic reflective membranes is appropriately oriented toward the energy source and/or target, as required for a particular application or mode of operation. As previously noted, the first main embodiment device 10 can also be deployed in super-ambient mode as shown later in this document; however, operating the device in super-ambient mode for some electromagnetic applications generally requires (1) that one of the reflective central membranes 14 or 16 be replaced with an alternate central membrane which is transparent to the particular spectrum of electromagnetic radiation utilized for the selected application, and (2) that the reflector chamber be inflated to a super-ambient pressure to deform and smooth the remaining central reflective membrane 14 or 16.

Figure 3A:
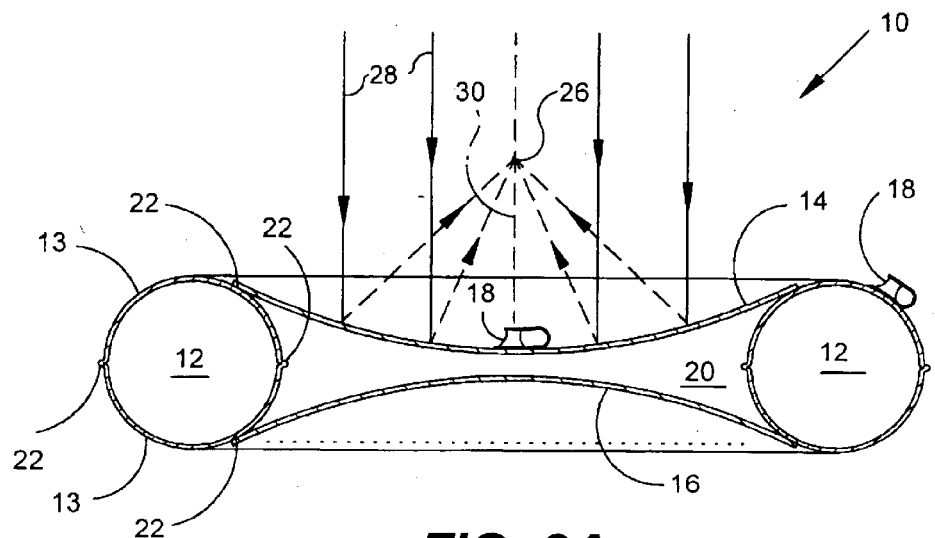
FIG. 3A is a schematic diametric elevational cross-sectional view of the first main embodiment device operating with its reflector chamber inflated to a sub-ambient pressure and used to concentrate radiant electromagnetic rays.

FIG. 3A depicts the first main embodiment device 10 deployed in sub-ambient mode as an electromagnetic radiant ray concentrator having the focal axis 30 of the pre-formed parabolic reflective membrane 14 oriented toward the sun (not shown). The radiant solar rays 28 are reflected by the pre-formed parabolic reflective membrane 14 to focus on an energy-absorbing object (not shown) placed at the focal point 26.

Regarding the instant device's ability to capture and concentrate electromagnetic radiation, it should first be noted that a device deployed in sub-ambient mode allows the electromagnetic rays to travel unobstructed to and from the reflector, thus providing superior capture efficiency relative to much of the prior art as well as the second main embodiment of the instant invention (capture efficiency is defined herein as the portion of the incoming radiant energy that is delivered to the focal point and local surrounding area). As an example, when operated in sub-ambient mode as a terrestrially-based solar concentrator as shown in FIG. 3A, the first main embodiment device has an effective capture efficiency exceeding 90%, which is limited only by the reflective efficiency of the membrane and the transmission and dispersion characteristics of the surrounding atmosphere. Second, although a reflective parabolic surface is the ideal geometry for reflecting all incoming parallel radiant rays to the focal point and, thus, producing extremely high theoretical concentrations of energy, the ability of the instant device to concentrate energy is limited by several factors including, but not limited to, the geometric precision of the reflective membrane and, hence, its supporting toroidal support ring, the capture efficiency of the device as noted above, the apparent finite angular diameter of the source (e.g., the sun), and the wavelength of the radiation relative to the diameter of the reflector. Despite these and other limiting factors, a precisely constructed first embodiment device used as a terrestrially-based solar concentrator has the ability to concentrate sunlight by factors in excess of 10,000.

Regarding safety, as one consequence of having a pre-formed reflective membrane 14, the device has a fixed focal length, i.e., the focal point is located at a substantially fixed distance from the reflective membrane along the focal axis of reflector 14. This fixed focal length greatly enhances safety by allowing the user to maintain greater control of the location of any potentially dangerous high concentrations of electromagnetic radiation at the focal point. A second consequence of employing thermally or otherwise pre-formed reflective membranes is that pre-forming allows the reflectors to achieve significantly shorter focal lengths than is practical using non-pre-formed, planar membranes due to the limited ability of planar membranes to elastically deform. The very short focal lengths achieved by such deeply pre-formed reflective membranes further enhance safety by providing the user with even greater control over the location of the concentrated electromagnetic radiation.

Figure 3B:
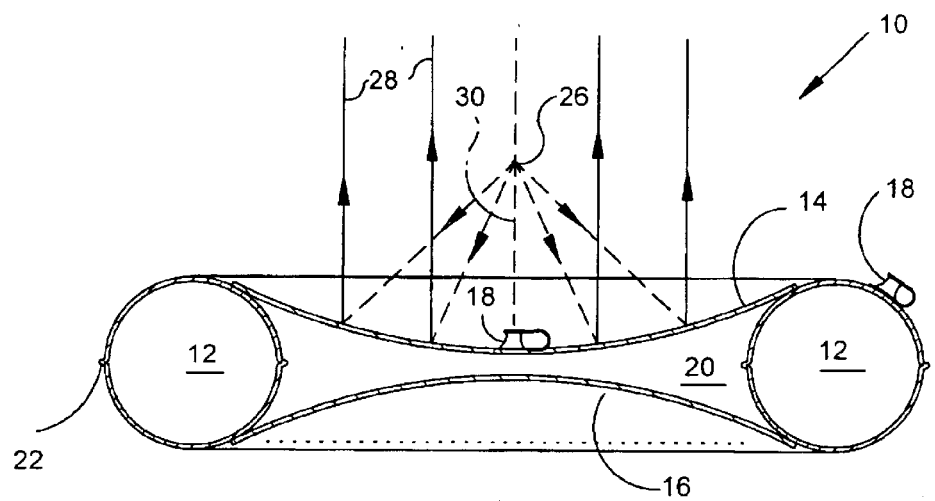
FIG. 3B is a schematic diametric elevational cross-sectional view of the first main embodiment device operating with its reflector chamber inflated to a sub-ambient pressure and used to project radiant electromagnetic rays.

FIG. 3B depicts a first main embodiment device 10 deployed in sub-ambient mode as a radiant ray projector with the same reflector structure 20 as shown in FIG. 3A, but projecting a collimated beam of the electromagnetic rays from a non-collimated light source (not shown) such as a light bulb, lamp, or candle placed at the focal point 26 to a distant object (not shown). It should be noted that the selection of the concentrating or projecting mode depends on the position of the light or other electromagnetic source relative to the focal point of the device.

It should be further noted that the focal axis 30 of the pre-formed parabolic reflective membrane 14, as depicted in FIGS. 3A and 3B, is coincident with the axis-of-revolution of the toroidal support ring 12, thereby causing the focal point of the device to be aligned with the axis-of-revolution of the toroid and, thus, to be located directly above the center of the reflective membrane. However, one or both of the reflective membranes 14, 16 may be pre-formed and/or attached to the toroidal support ring 12 in such a manner that the focal point of the device 10 is located off the axis-of-revolution of the support ring 12. Note that such "off-axis" reflectors can facilitate orientating the device relative to the energy source and/or target for certain applications, as is illustrated or suggested by several of the figures presented hereinbelow.

Figure 4A:
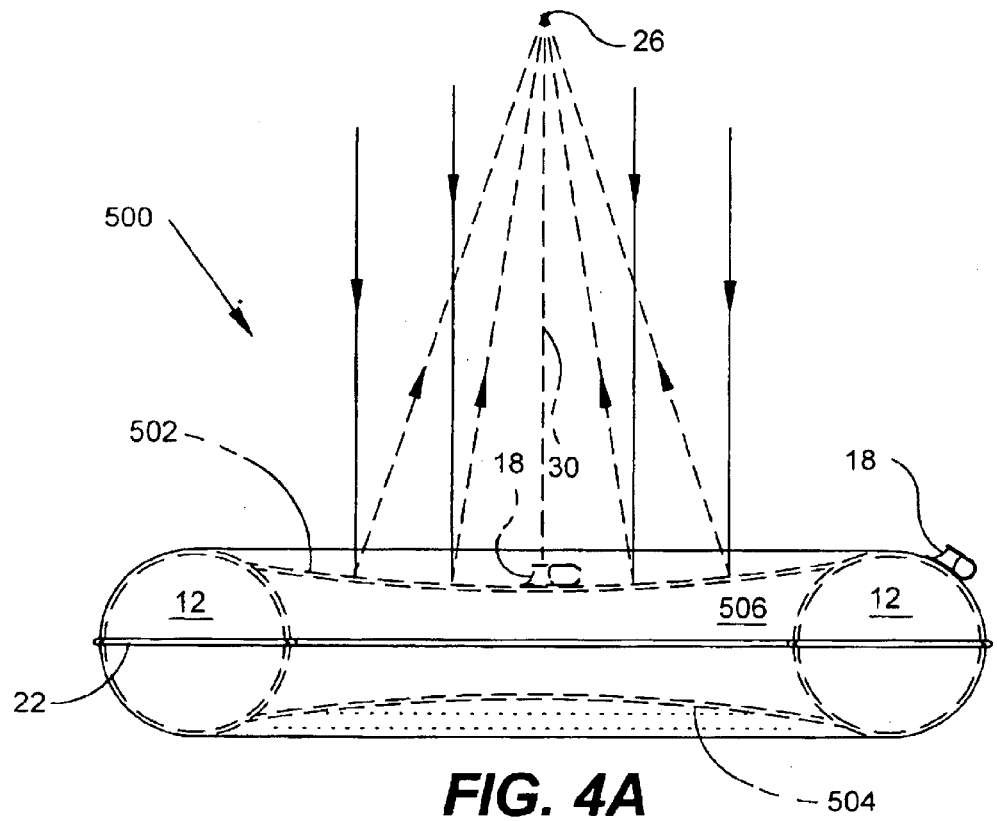
FIG. 4A is a schematic side elevational cross-sectional view of the first main embodiment having a slightly pressure-deformed central reflective membrane providing a relatively long focal length as an example of the ability to vary the focal length of a device containing a planar reflective membrane.
Figure 4B:
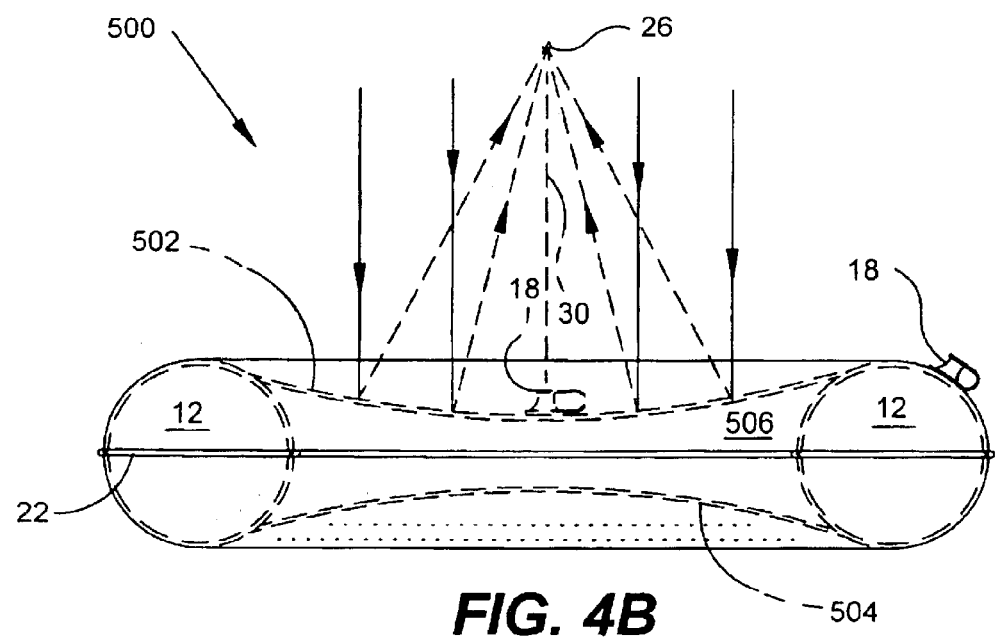
FIG. 4B is a schematic side elevational cross-sectional view of the first main embodiment having a moderately pressure-deformed central reflective membrane providing a relatively short focal length as an example of the ability to vary the focal length of a device containing a planar reflective membrane.

FIGS. 4A and 4B depict an alternate first embodiment device 500 incorporating planar, i.e., non-pre-formed, elastic reflective membranes 502 and 504, which enable the device to have a variable focal length 30 as a function of the pressure imposed across the reflective membranes 502 and 504. In general, the focal length 30 of the modified first embodiment device 500 can be decreased by decreasing the sub-ambient inflation pressure, i.e., increasing the vacuum pressure relative to ambient pressure, within the reflector chamber 506. FIG. 4A depicts a device having a reflector chamber 506 inflated to a slightly sub-ambient pressure (i.e., lightly evacuated), which causes only small deformations in the reflective membrane 502, thereby providing a relatively long focal length 30. In contrast, FIG. 4B depicts the device 500 with a more strongly evacuated reflector chamber 506, which causes greater deformations in the reflective membrane 502, thereby providing a shorter focal length 30. It should be noted that a flat circular elastic membrane held fixed at its periphery will deform under uniform pressure to form a relatively precise parabolic surface, which, as noted above, is geometrically ideal for reflecting incoming parallel rays to a single point in space, i.e., the focal point.

Figure 5:
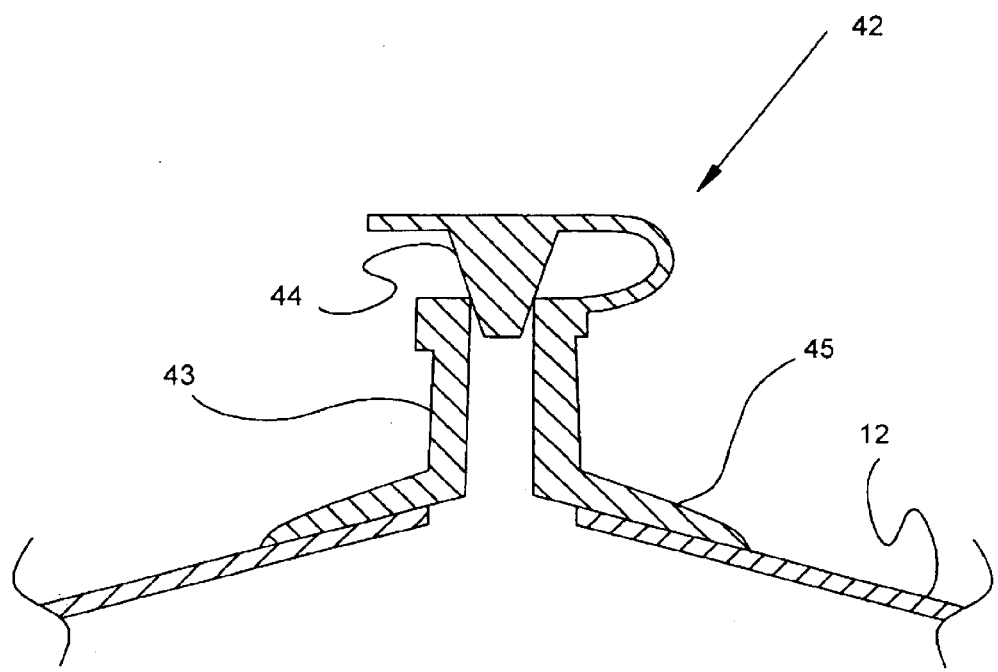
FIG. 5 is a schematic cross-sectional view of an integral plastic plug valve.

FIG. 5 illustrates a flexible plug valve 42 comprising a tube or conduit 43, an integral plug 44 as a closure means, and an integral mounting flange 45 shown mounted on the toroid 12 as exemplary of the valve for also the reflective membrane 14. It is noted that these valves 42 can be low profile valves and can be threaded, internally and/or externally, to increase the integrity of the seal and/or to facilitate the attachment of accessory elements. It is further noted that the invention is not intended to be limited to the specific valve configurations or materials as specified herein. Specifically, many other common types of valves and/or other well-known inflation/pressure adjusting devices may be utilized as an inflation and/or pressure adjusting means.

Figure 6:
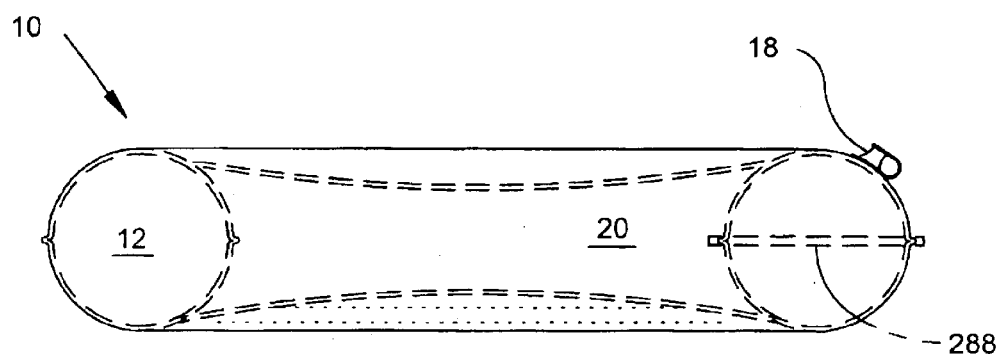
FIG. 6 is a schematic cross-sectional view of the first embodiment device utilizing a first valve for the support ring and a second valve for the reflector chamber, wherein the second valve is located on the outer portion of the support ring and has a conduit passing through the support ring into the reflector chamber.

FIG. 6 shows a first embodiment device 10 with a first valve 18 for the support ring 12, but modified with an extended second valve 288 for the reflector chamber 20. This alternate valve 288 for the reflector chamber 20 is located on the outer edge of the support ring 12 and has an extended conduit passing through the support ring 12 to enter the reflector chamber 20. It should be noted that this alternate valve configuration is particularly useful for minimizing any valve-related distortions in the reflective membranes.

Figure 7B:
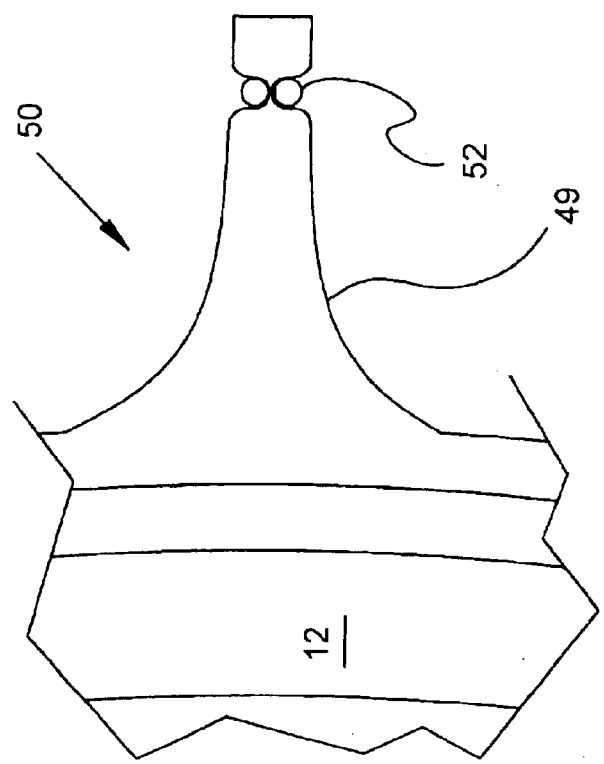
FIG. 7B is a schematic partial top plan view of the first main embodiment having a clamp or tie closure for a valve located at the outer edge of the support ring.
Figure 7A:
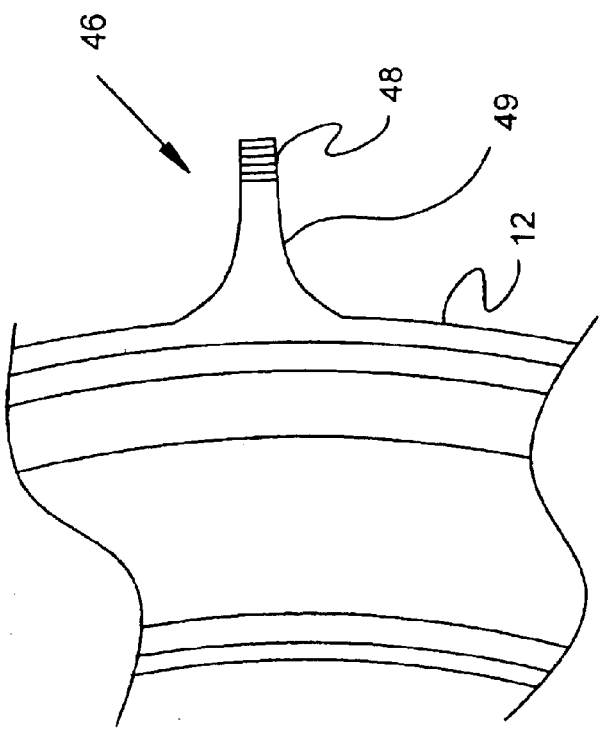
FIG. 7A is a schematic partial top plan view of the first main embodiment having a tongue-and-grove (i.e., "Ziploc®"-type) valve located at the outer edge of the support ring.

FIG. 7A depicts an interlocking tongue-and-groove, i.e., "Ziploc®"-type, valve 46 for inflating, as an example, the support ring 12. The interlocking tongue-and-groove or "Ziploc®"-type sealing mechanism 48 serves as the valve's closure means and is shown located near the outer end of a thin membranous conduit 49 attached to the outer edge of the support ring 12.

FIG. 7B shows a valve 50 comprising a similar membranous conduit 49 attached to the outer edge of the support ring 12 and clamped to close by either a clamp or tie 52, as examples of other closure means. It should be noted that the device 10 can employ self-sealing membrane valves (not shown) such as those commonly used in toy "Mylar®" of "foil" balloons, wherein a self-sealing membrane serves as the closure means for a flexible conduit similar to conduit 49. It should also be noted that each of these valves is highly amenable to fabrication from thin membrane materials to minimize size and weight to facilitate portage and storage. It is further noted that each valve can be fabricated fully or in part from extensions of the reflective membranes 14, 16 and/or the membranes comprising the support ring 12 to facilitate manufacturing.

It is emphasized that each of the valve types depicted in FIGS. 5 through 7B and/or described in the associated text may be incorporated, either alternatively or supplementally to valve 18, as an inflation means for inflating the support ring 12, a pressure adjusting or inflation means for adjusting the pressure within the central reflector chamber 20, and/or as an inflation means for inflating any inflatable accessory element of the present invention.

FIGS. 8–20—Description of Optional General-Purpose Features

Figure 8:
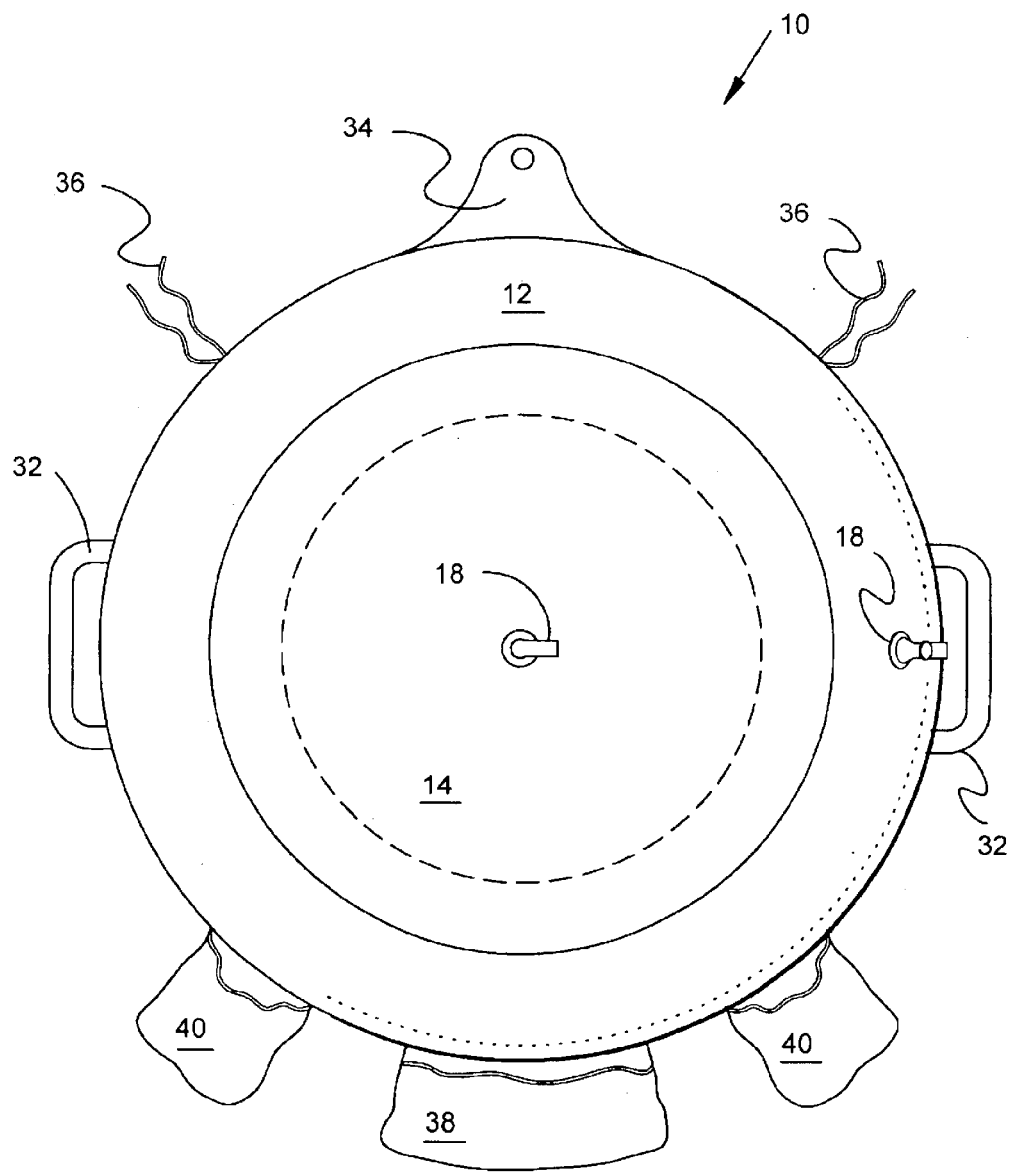
FIG. 8 is a top plan view of the first main embodiment device having additional optional securing and storage elements attached generally to the periphery of the inflatable support ring.

FIG. 8 shows optional appendages which can be added to the toroid 12 to implement a stable position and to attach other elements. A pair of handles 32 is positioned diametrically on the sides of the toroid 12. An apertured tab 34 is provided on a side equidistantly between the handles 32 for hanging up when in storage or the like. A pair of tying or hanging straps 36 is attached on either side of the apertured tab 34. A storage pouch 38 is provided for storing the deflated and folded apparatus 10. A pair of bottom stabilizing pouches 40 is provided for filling with material (e.g., dense material) to stabilize an upright apparatus 10. It should be noted that these appendages can be incorporated into the device in any useful quantity, location, and combination thereof. It should also be noted that each of these appendages is highly amenable to fabrication from thin membrane materials to minimize size and weight to facilitate portage and storage, and that each can be fabricated fully or in part from extensions of the central membranes 14, 16 and/or the membranes comprising the toroidal support ring 12 to facilitate manufacturing.

Figure 9:
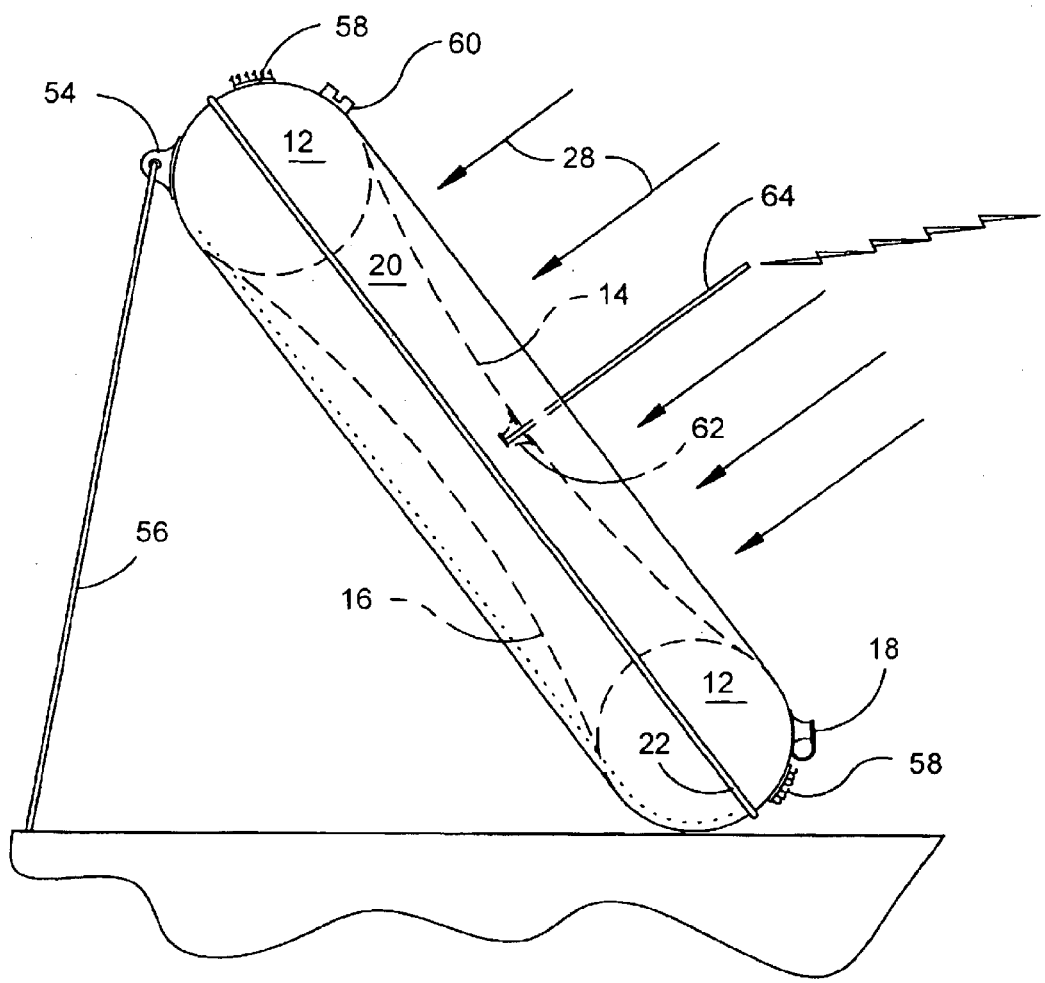
FIG. 9 is a schematic side elevational cross-sectional view of the first main embodiment device having an inflatable support ring further including additional optional attachment devices such as a clevis, clip, bracket, mounting stud, and hook-and-loop fastening patches, and a frontal membrane further including a centered socket into which an antenna is anchored.

FIG. 9 depicts various optional attachment devices on the first main embodiment device 10 such as a clevis, shackle, clip or bracket 54 for attaching various accessory elements including, for example, a support rod 56 or a line. Hook-and-loop fastening patches 58 and a mounting stud 60 are also provided for attaching various accessory elements. A centered socket 62 is shown in the upper frontal reflective membrane 14 for supporting other accessory elements including, for example, an antenna 64. It should be noted that these attachment devices can be incorporated into the device 10 (or any other embodiment of the present invention) in any useful quantity, location, and combination thereof.

Figure 10:
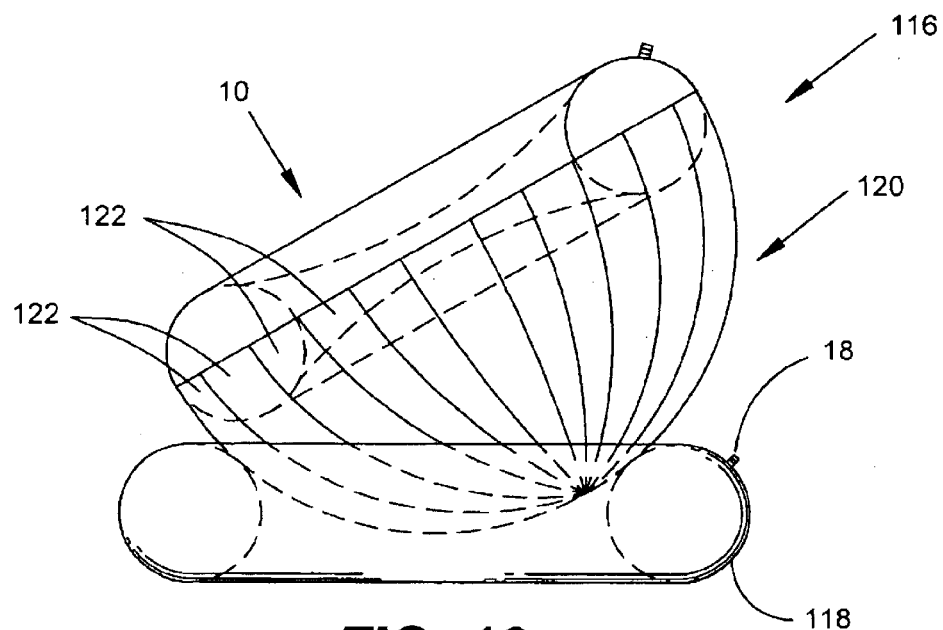
FIG. 10 is a schematic side elevational view of the first embodiment device being supported by an optional integral inflatable hemispherical support and a separate inflatable support ring.

FIG. 10 shows an optional means for supporting the first main embodiment device 10 for which the device 10 is modified to form apparatus 116 by adding an inflated base ring 118 which supports an inflated hemispherical mounting and stabilization element 120, optionally made from gores 122, within which the first main embodiment device 10 is couched. The apparatus 116 generally requires two additional valves 18: one valve 18 to inflate the base ring 118, and one valve (not shown) to inflate the hemispherical support element 120. The base ring 118 and the hemispherical support element 120, as many other accessory features described herein, may optionally incorporate any of the securing and attachment devices noted above in FIGS. 8 and 9 to fix their relative position and to secure apparatus 116 to the surface upon which it is resting. The apparatus 116 is particularly useful for applications in which the orientation of the parabolic reflector 14 of the basic first embodiment device 10 must be precisely maintained, such as when the parabolic reflector 14 is used in conjunction with an accessory receiver (not shown) to receive satellite transmissions. To facilitate precise orientation of the apparatus, various orientation devices, such as a bubble level (or other leveling device), an inclinometer (i.e., angle gauge), and/or a magnetic compass may be added to the apparatus 116 (or any other apparatus of the instant invention) in any useful location, quantity, and combination thereof. It is noted that another method of supporting the hemispherical mounting element 120 includes resting the hemispherical mounting element in a ground depression, such as that which may be dug in sand, in lieu of using base ring 118. It is also noted that the inflatable support ring 118 can be used as a float to stably support the apparatus on water. It is further noted that the generally hemispherical support element can comprise a larger or smaller portion of a sphere to increase or decrease, respectively, the range of motion.

Figure 11:
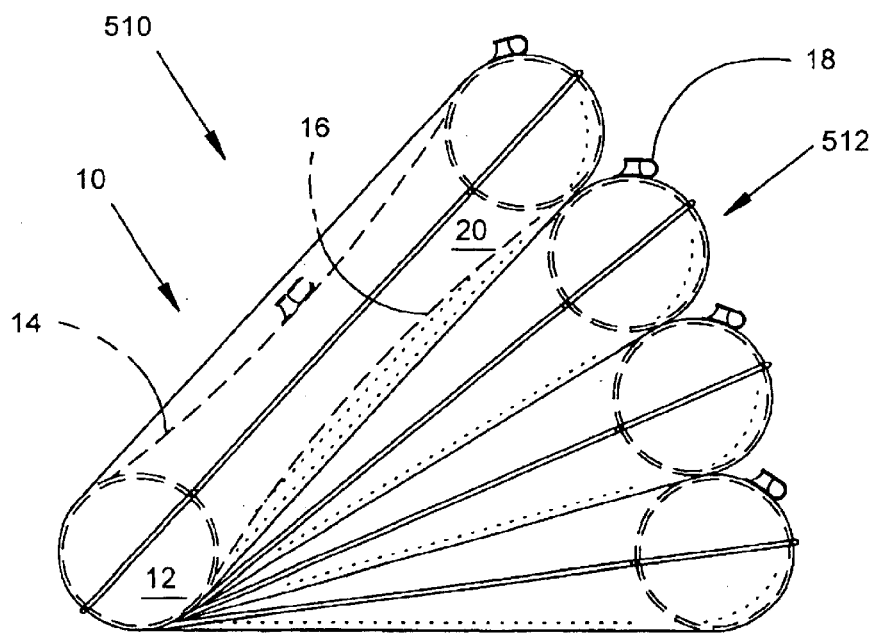
FIG. 11 is a schematic side elevational cross-sectional view of the first embodiment device being supported by an optional inflatable stack of tapered orienting and leveling rings.

FIG. 11 depicts another optional means for supporting the basic first embodiment device 10 for which device 10 is modified to form apparatus 510 by adding a plurality (i.e., stack) of inflatable tapered support rings 512 (having at least one inflation means) used to incline the device for proper orientation to an electromagnetic source and/or target. The tapered support rings 512 may also be used for other purposes such as serving a leveling function when the device is resting on an inclined surface or a hill.

Figure 12:
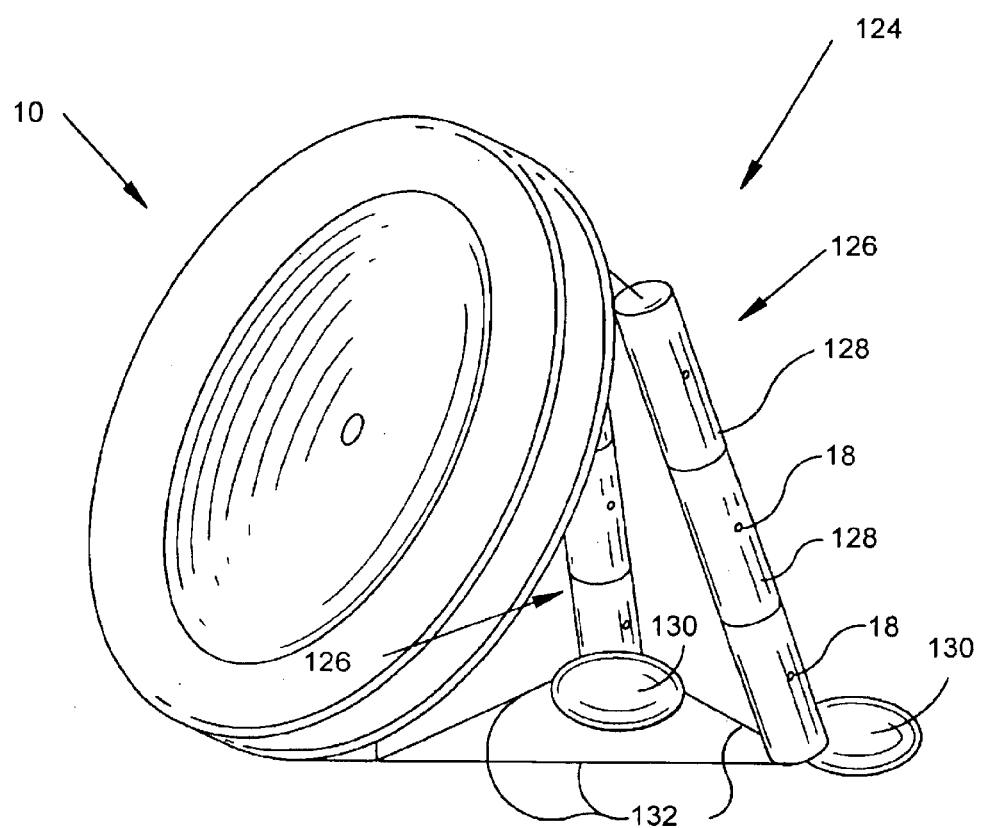
FIG. 12 is a schematic perspective view of the first embodiment device being supported in the rear by a pair of optional inflatable support tubes, each of which has compartments for controlling the supporting length of the tube, a weight-fillable pouch at the bottom to stabilize the tube, and tension cables attached to the other tube and to the base of the support ring to further enhance the stability of the entire apparatus.

FIG. 12 depicts an optional inflatable, height-adjustable, dipody support structure 124 shown supporting the first main embodiment device 10 by two support tubes 126 having inflatable compartments 128 with individual gas inflation valves 18, as an example of an inflation means for inflating the tubes. Thus, these support tubes 126 are adjustable in height for orienting the device to a source and/or target, and/or for placing the device on uneven terrain, by controlling the amount of air inserted in each compartment of each support tube. The top or upper proximal end of each support tube 126 is attached to the top of the inclined apparatus 10 by the tying straps 36, as shown in FIG. 8, or any other well-known fastening means. The opposite or lower proximal end of each support tube 126 has a pouch 130 for storing the tube when not in use, and/or for weighing down the tube to stabilize the apparatus 124 during use. Cords 132 attached to the bottom of each tube 126 connect the tubes to each other and to the bottom of apparatus 10 for maintaining the relative position of these elements. In addition to the securing and fastening means noted above (e.g., strap 36, pouch 130, cords 132), the tubes 126 can optionally incorporate other securing and fastening means for securing each proximal end of the tubes to implement a stabile apparatus.

Figure 13:
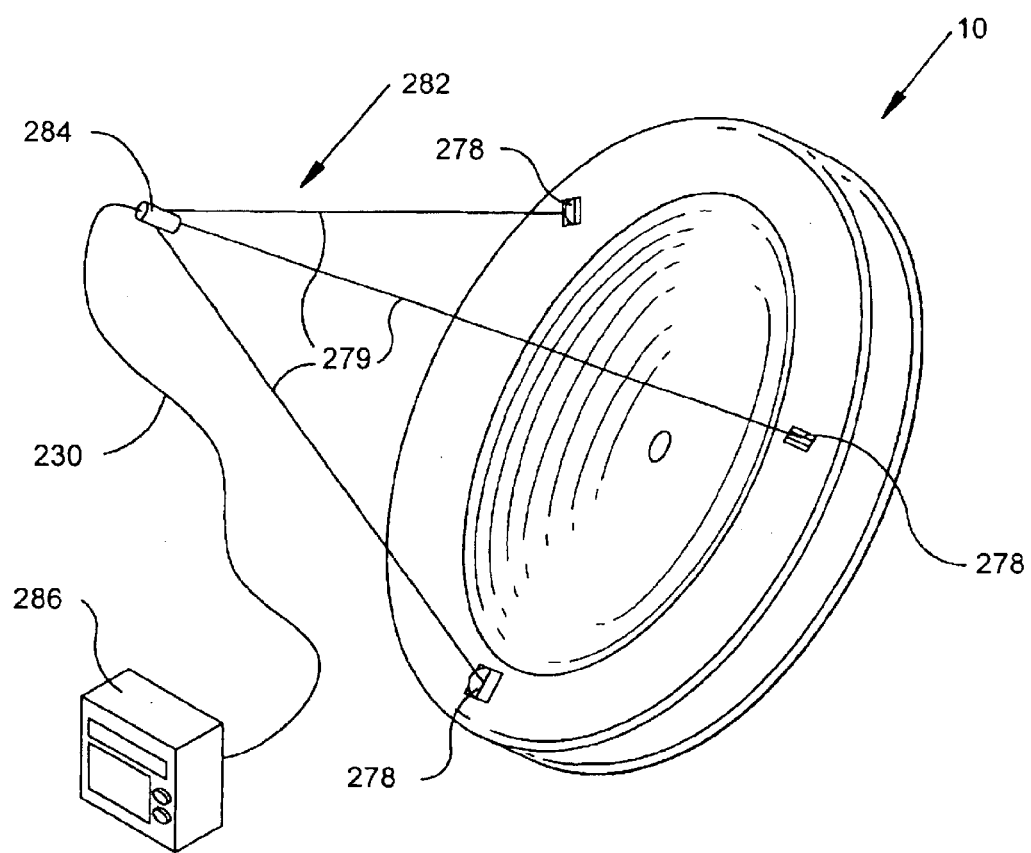
FIG. 13 is a schematic perspective view of the first embodiment device having an optional multiple-leg focal point support apparatus utilized to hold any accessory device or material at or near the focal point, such as an antenna, which is connected by way of an electric cord to a receiver device.

FIG. 13 depicts an optional multi-leg support apparatus 282 comprising a plurality (e.g., three) of rods 279 attached via pin joints 278 (or other common fastening means) to the first embodiment device 10 for supporting various accessory elements at the focal point, such as an electromagnetic radiation receiving device 284, or any other suitable accessory element as disclosed herein or as known to the user of the device. Device 284 is connected by a conducting wire 230 to a receiver indicator device 286. It should be noted that the multi-leg support apparatus 282 may alternatively be used to support and/or orient the device 10. Note that when using the multi-leg support apparatus 282 in an orientation similar to that shown in FIG. 13, only the lower leg 279 need be rigid; however, apparatus 282 must incorporate at least one means for stabilizing the rigid rod or element, such as at least one other rod (as shown) or other suitable structural element.

Figure 14:
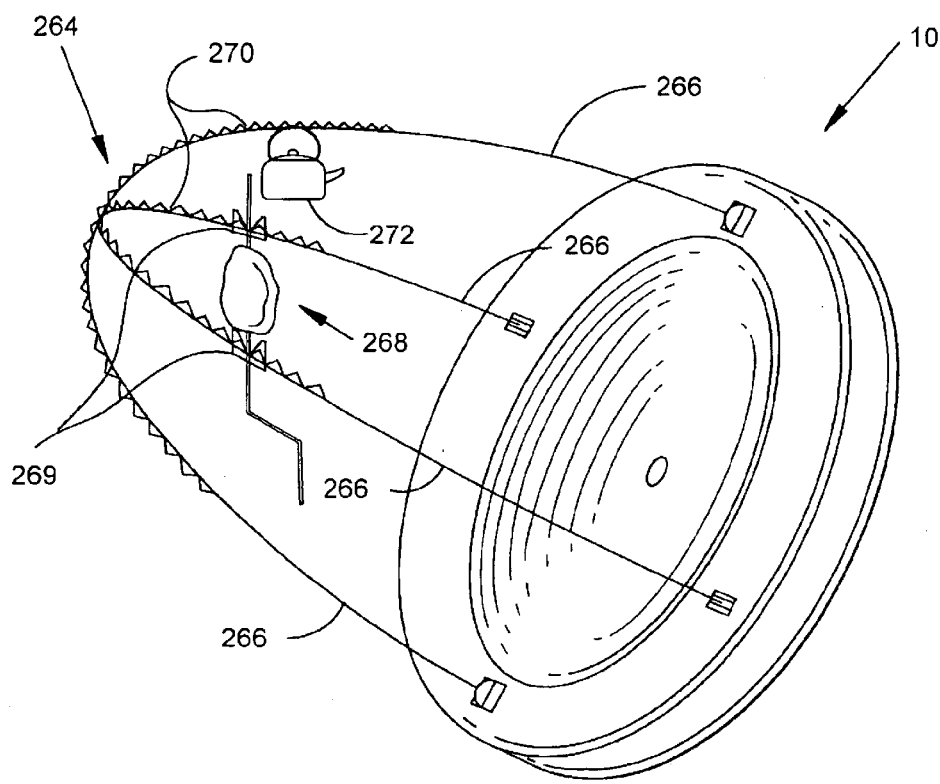
FIG. 14 is a schematic perspective view of the first embodiment device having an optional user-adjustable combination rotisserie/kettle support apparatus used primarily to facilitate heating and cooking by solar radiation.

FIG. 14 illustrates a first embodiment device 10 having an optional multi-purpose, user-adjustable accessory support apparatus 264 (such as a combination rotisserie and kettle support) for holding items at the focal point, or at a user-controllable discrete distance from the focal point, to facilitate cooking and other applications. This multi-purpose support apparatus 264 has a plurality (e.g., four) of attached arcuate rods 266 which are pinned to the device 10. The rods 266 optionally have hooks 269, a series of ridges 270, and/or other means for adjustably supporting various accessory elements or cooking utensils, such as a rotisserie device 268 and a water kettle 272, in proximity to the focal point. The device 10 is energized by solar radiation or other suitable source.

Figure 15:
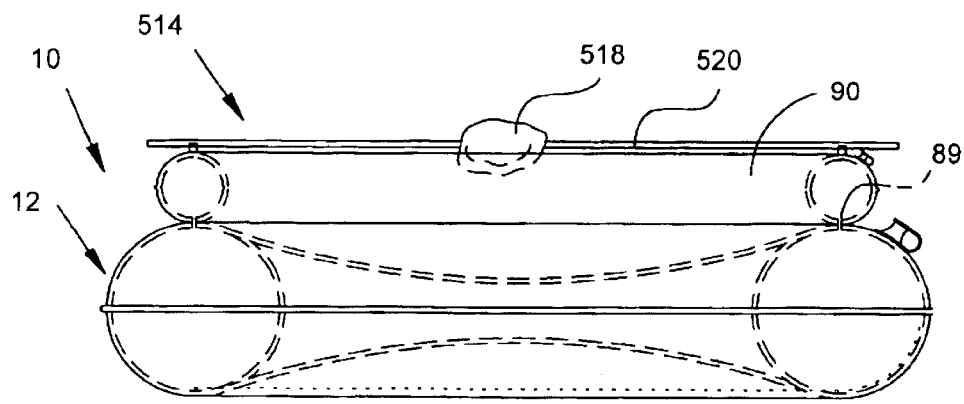
FIG. 15 is a schematic side elevational cross-sectional view of the first embodiment device having an optional lightweight inflatable focal point support element holding an energy-absorbing or emitting object at the focal point on a rod spanning the inflatable focal point support.

FIG. 15 illustrates a first embodiment device 10 having an optional inflatable focal point support apparatus 514 comprising an inflatable support ring 90 attached to and above the toroidal support ring 12 and a rod 520 (or other equivalent device) diametrically spanning the inflatable support ring 90 for supporting an energy-absorbing (or emitting) object 518 at or near the focal point. The inflatable support ring 90 can be a separate, user-attachable element with a separate inflation valve (as one example of a means for inflating the support ring or element 90), or it can be made integral with the support ring 12 and optionally incorporate gas ports 89 to the support ring 12 to allow simultaneous inflation with the support ring 12 (as another example of a means for inflating the support ring or element 90). Additional rings 90 may be added to increase the height of the wall formed by the ring(s) 90 to any predetermined or other practical height.

Figure 16:
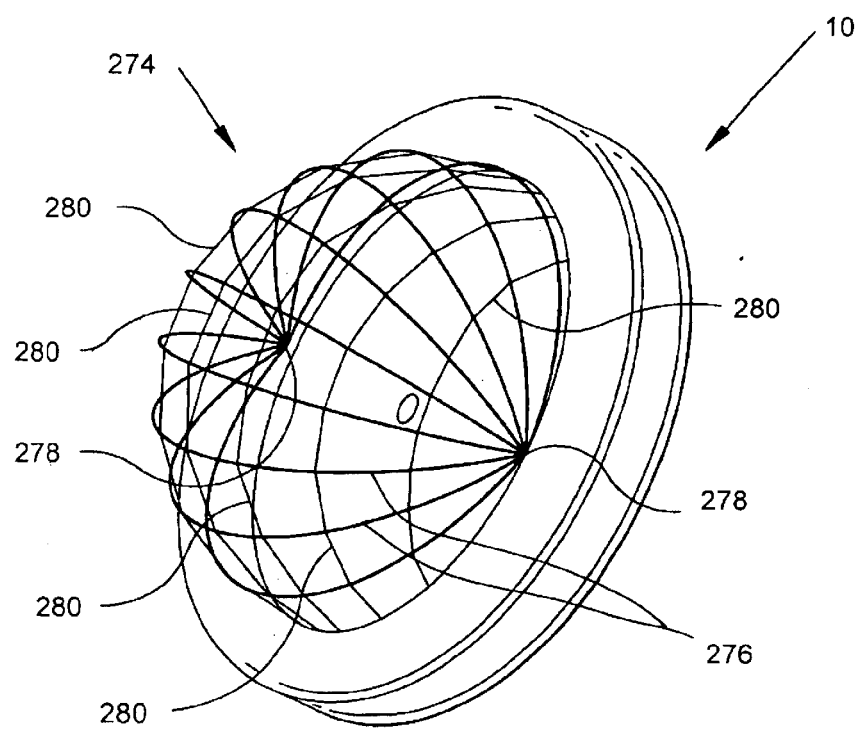
FIG. 16 is a schematic perspective view of the first embodiment device having an optional deployable and retractable safety cage for protecting the user from accidental exposure to highly concentrated energy.

FIG. 16 shows a first embodiment device 10 having an optional foldable safety cage 274 for protecting oneself from accidental exposure to dangerous concentrations of solar radiation by providing a physical barrier around the focal point. Safety cage 274 comprises a plurality, e.g., nine, of rigid metal or plastic (or other suitable material) semicircular elements 276 (or other suitably shaped substantially rigid elements) attached at their ends to a pair of diametrical pin joints 278 on the device 10, and held stable by a plurality of flexible metal or plastic (or other suitable material) cables 280 attached to space each rigid element 276. It is noted that the safety cage 274 may also serve as a support for holding various items at or near the focal point similar in function to the multipurpose user-adjustable accessory support apparatus 264 as shown in FIG. 14 (based on the similar shape of the arcuate/semicircular rigid elements, and optionally similar construction). It is further noted that a second safety cage may be mounted on the opposite side of the device 10 to provide protection from a second reflective membrane, and that such safety cages may alternatively be used to support the device 10 in a manner similar to the hemispherical support 120 as shown in FIG. 10 (once again, based on the similar shape).

Accordingly, each of the support apparatus depicted in FIGS. 13–16 (i.e., the multi-leg support apparatus 282, the user-adjustable accessory support apparatus 264, the inflatable focal point support apparatus 514, and the safety cage 274) serves as an effective means for supporting at least one accessory element (and/or other objects and/or materials) in proximity to the focal point.

Figure 17:
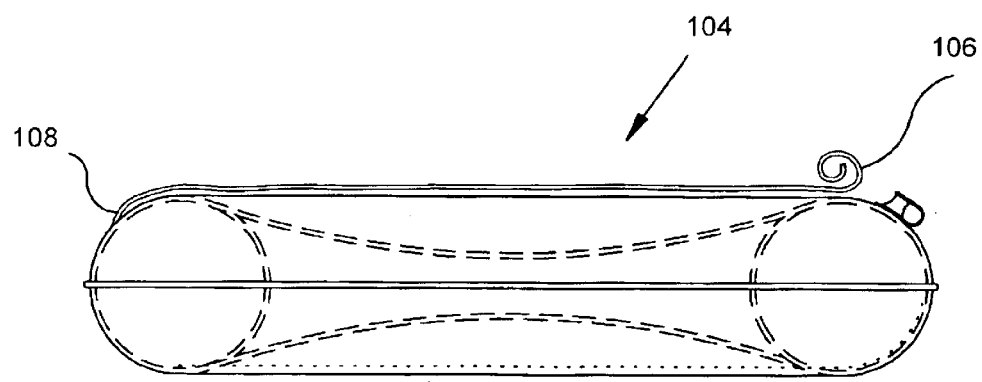
FIG. 17 is a schematic side elevational cross-sectional view of the first embodiment device having an optional rollable opaque safety cover, which can be deployed when the device is not in use.

FIG. 17 depicts a first embodiment device 10 modified to form apparatus 104 by incorporating an optional circular plastic cover 106 capable of being rolled up to the attachment point 108 on the toroid 12. Cover 106 may optionally have hook-and-loop patches (or any other means of fastening) to allow it to be held in either rolled or deployed condition. The purpose of the cover is to protect the reflective membrane and to prevent the device from unintentionally producing dangerous concentrations of energy when not in use. It should be noted that additional covers can be added to protect additional reflective membranes and/or other elements of the device.

Figure 18A:
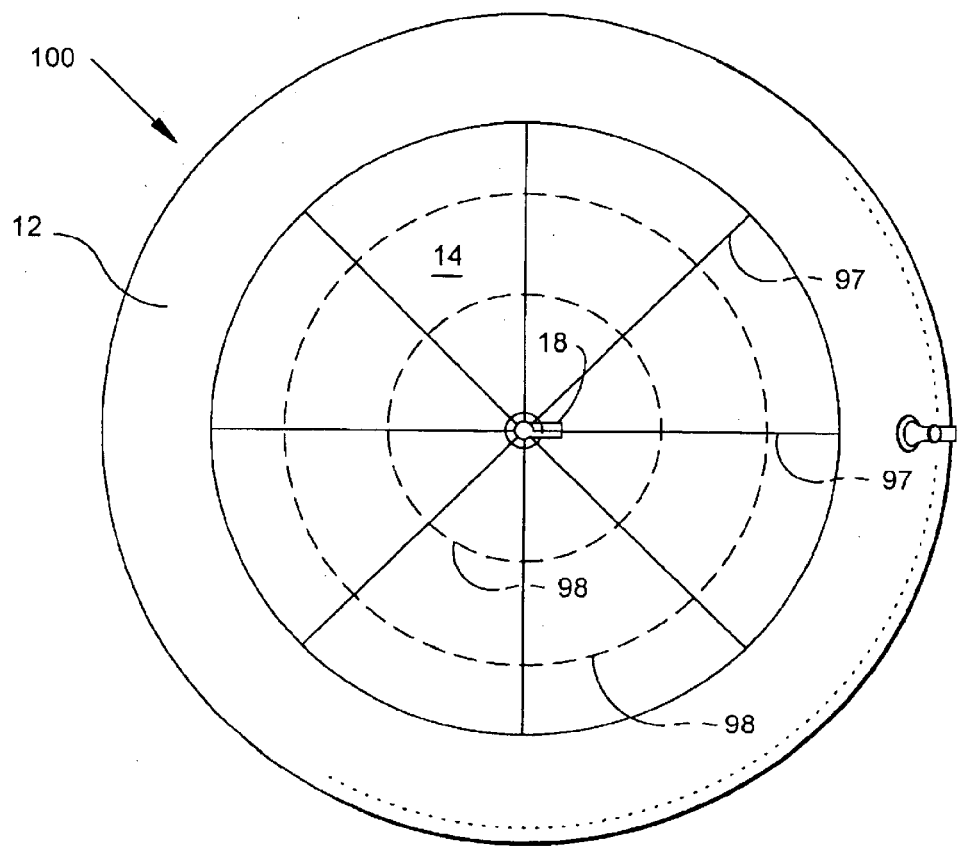
FIG. 18A is a schematic top plan view of the first embodiment device modified with optional stretched radial (shown solid) and/or continuous stretched circular (shown dashed) elastic bands attached to the internal surfaces of both reflective membranes to cause wrinkling or distortion of the reflective surfaces as a safety feature when the device is not being used.
Figure 18B:
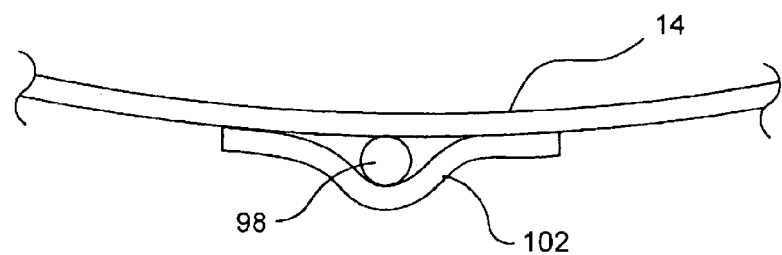
FIG. 18B is a schematic partial cross-sectional elevational view of a stretched elastic band secured at spaced points by a securing plastic strip attached to the inside of a reflective membrane.

FIGS. 18A and 18B illustrate the addition of several optional strips 97 or circular bands 98 (shown dashed) of stretched elastic material (such as rubber) attached to the membranes 14, 16 as a safety feature to prevent the apparatus 100 from creating potentially dangerous concentrations of energy by wrinkling or otherwise distorting the surfaces of the reflective membranes 14, 16 when not fully deployed. FIG. 18B shows the elastic band 98 being secured within the reflector chamber by spaced plastic strips 102, which are thermally or otherwise bonded to the inner surface of the reflective membranes 14, 16. It is noted that such elastic bands can also be attached in a radial (shown solid) orientation or other useful orientation.

Accordingly, each of the safety apparatus as depicted in FIGS. 16–18 (i.e., the safety cage 274, the safety cover 106, and the stretched elastic bands 98), as well as a pre-formed reflector and a non-parabolic pre-formed reflector, serve as an effective safety means for reducing the risk of accidental or unintentional exposure to concentrated electromagnetic radiation.

Figure 19:
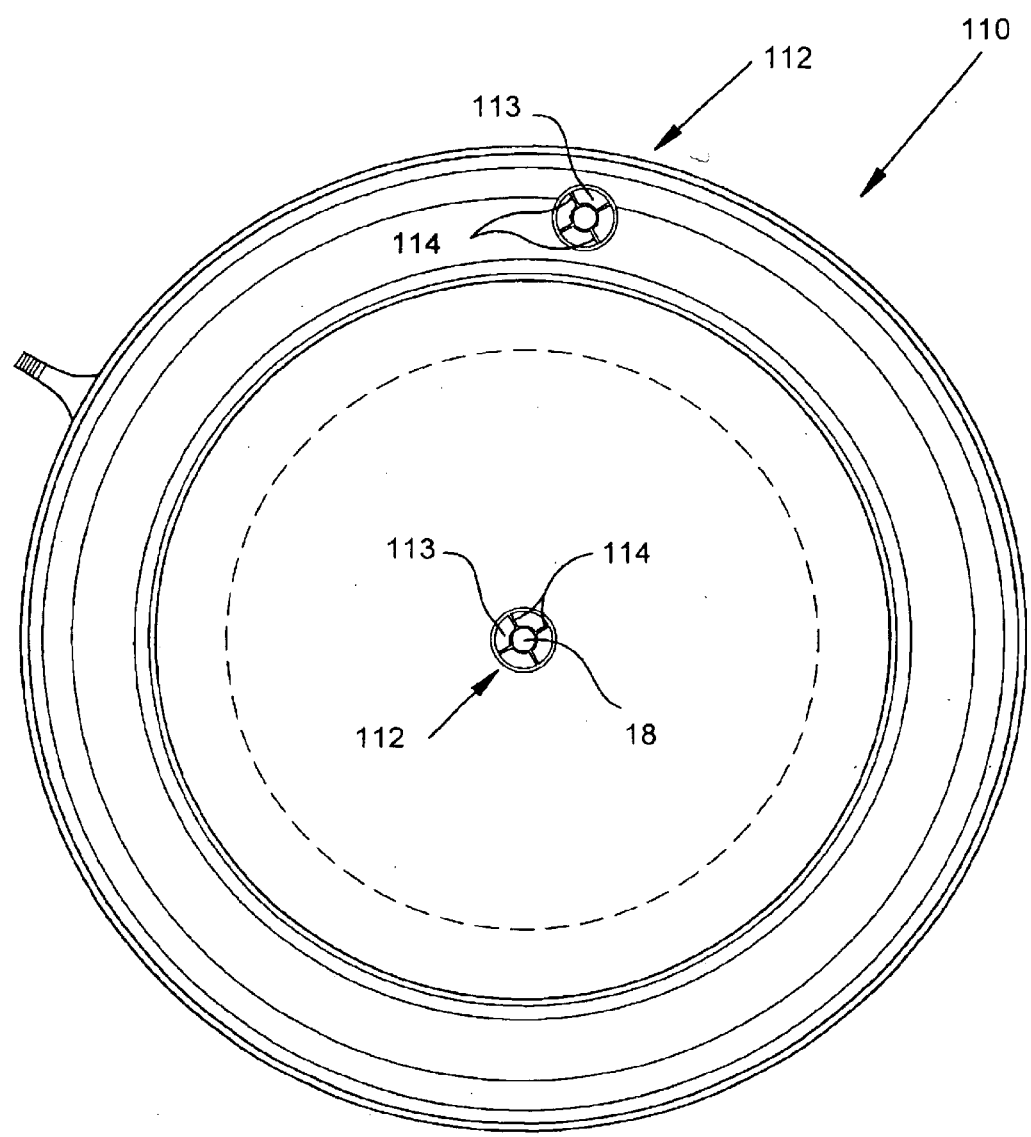
FIG. 19 is a schematic top plan view of the first embodiment device modified with two pairs of optional cross-hair configured visual alignment elements, which facilitate aligning the device with an electromagnetic source and/or target: one pair is centered in the reflective membranes surrounding their centered valves, the second pair is located in the support ring.

FIG. 19 illustrates a first embodiment device 10 modified to form apparatus 110 by adding optional cross-hair configured visual alignment elements 112, which function in pairs to aid in the alignment of the apparatus 110 with an electromagnetic source and/or target. Each visual alignment element 112 consists of a transparent patch 113 having a cross-hair configured member 114. A first functional pair of alignment elements 112 is shown centered in the reflective membranes 14, 16, one element per membrane. A second functional pair of visual alignment elements 112 is incorporated into the toroid 12. It should be noted that such alignment elements can be integrated into the perimeter or mounting flange of any suitably positioned elements, such as a pair of inflation valves 18 centered in reflective membranes 14, 16, as shown.

Figure 20:
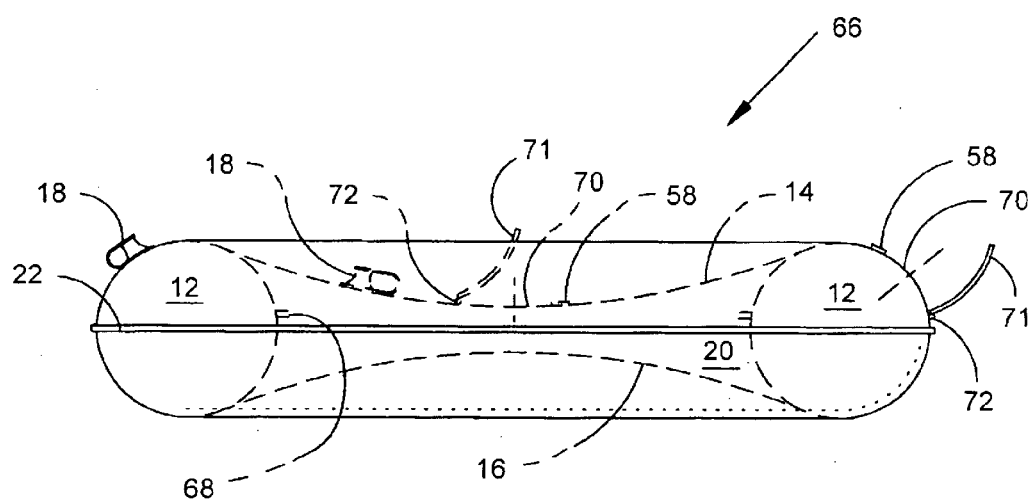
FIG. 20 is a schematic side elevational cross-sectional view of the first embodiment device employing optional access ports with fluid-tight covers, which allow or enhance access to the interior of the reflector chamber and support ring for such purposes as adding, removing, or storing materials, accessing internal equipment, and/or repairing, cleaning, or otherwise maintaining interior components of the apparatus.

FIG. 20 shows a first embodiment apparatus 10 modified to form apparatus 66 by adding two internal valved ports 68 and two external covered access ports 70. The valved internal ports 68 in the toroid 12 abutting the reflector chamber 20 allow fluid to flow (or be pumped) between the toroid 12 and the reflector chamber 20. The larger covered access ports 70, which may be shaped either as a square, rectangle, circle, or any other useful shape, on the toroid 12 and on the upper membrane 14 have removable or openable fluid-tight covers 71 optionally hinged at 72 (or otherwise optionally secured), and fastened shut by peripheral hook-and-loop fasteners 58 (or any other type of fastening means). The covered access ports 70 enhance access to the interior of the toroid 12 and the reflector chamber 20 for purposes such as adding, removing, or transferring stored materials (as one example of a means for internally storing materials and/or equipment), accessing internal features or equipment of the apparatus 66, and to allow repair, cleaning, or other maintenance of the apparatus 66. The internal valved ports 68 and external covered access ports 70 can be incorporated into the first embodiment device in any useful quantity, location, and combination thereof.

Figure 21:
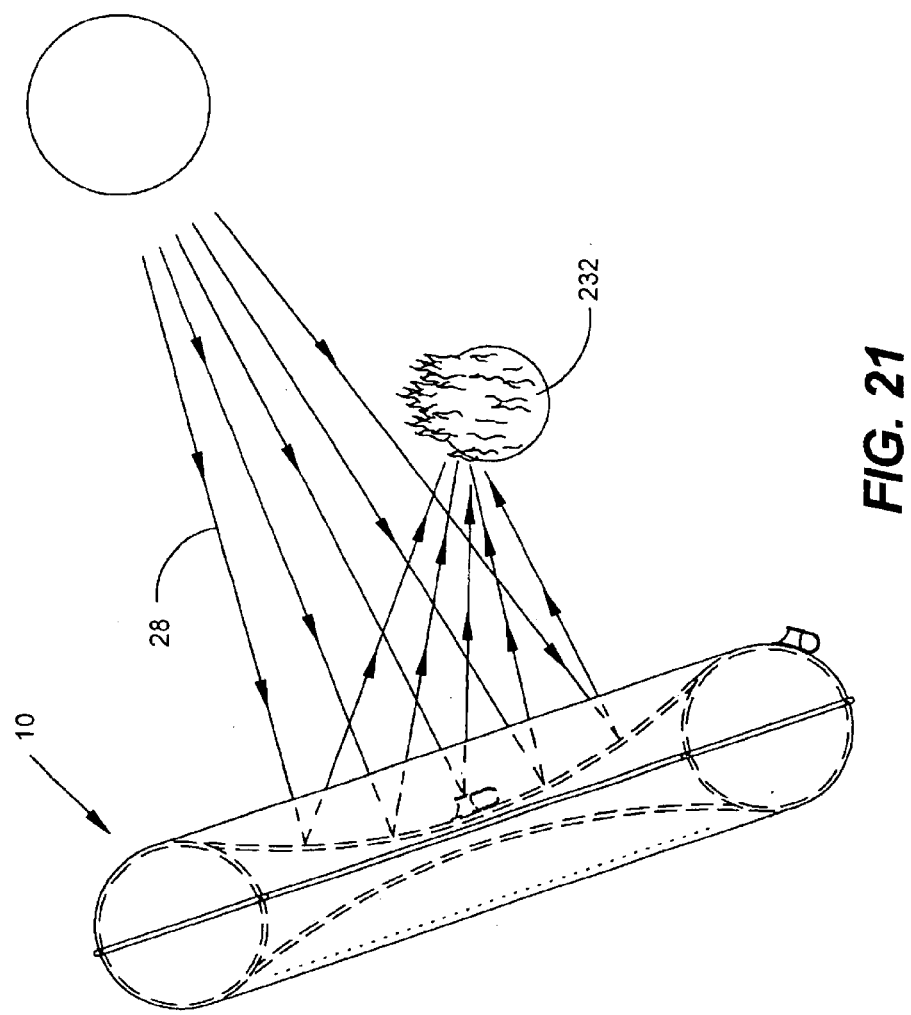
FIG. 21 is a schematic elevational cross-sectional view of the first embodiment device utilized to ignite, heat, or cook solid materials by method of direct impingement of concentrated solar radiation.

FIGS. 21–28—Description and Operation as a Broad-Spectrum Solar Concentrator FIG. 21 illustrates the use of the first embodiment device 10 to cook or heat a solid material 232 independently supported at the focal point and directly exposed to concentrated solar radiation 28. The device can also be used to ignite combustible materials such as paper, wood, and the like by directly exposing such materials to concentrated solar radiation 28. It should be noted that the instant invention also contemplates various portable apparatus which facilitate the heating or cooking of materials via direct exposure to concentrated solar radiation, such as the rotisserie apparatus as previously shown in FIG. 14. Further, it is clearly evident that a variety of other useful portable apparatus can be configured for this purpose by judiciously combining the basic first embodiment device 10 (or any suitable alternate configuration described herein) with any suitable focal point support apparatus, such as shown in FIGS. 13–16, and any common heating accoutrements or cooking utensils that allow the items to be heated or cooked to be directly exposed to concentrated solar radiation, such as a rotisserie and the like. Such apparatus may also optionally incorporate any suitable supporting, orienting, and leveling apparatus, such as shown in FIGS. 10–12, and/or any other useful accessory elements described herein.

Figure 22:
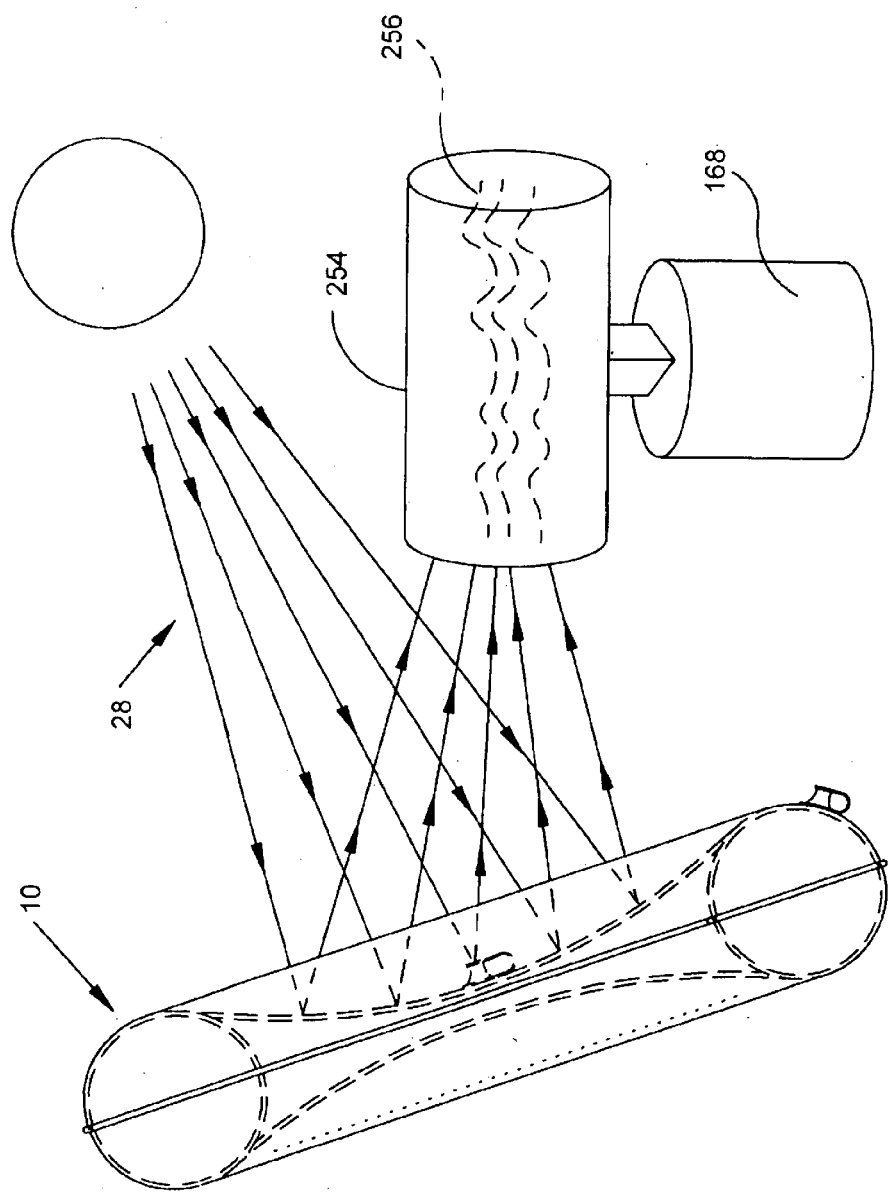
FIG. 22 is a schematic elevational cross-sectional view of the first embodiment device utilizing solar radiation to indirectly heat or cook materials contained in an energy-absorbing, generally externally blackened, thermal reaction vessel.

FIG. 22 shows a first embodiment device 10 being used to indirectly cook or heat materials by concentrating solar radiation 28 onto an energy-absorbing accoutrement, such as an externally blackened thermal reaction vessel 254, which contains the materials 256 to be cooked, heated, or otherwise processed. The reaction vessel 254 is shown independently supported at a distance on a truss support 168. It is noted that the device can be used to process materials in a batch or a continuous mode. Optional piping (not shown) for transporting the materials to be processed may be incorporated into the apparatus. It should be noted that the instant invention also contemplates various portable apparatus which facilitate cooking, heating, or processing materials by indirect exposure to concentrated solar radiation. Once again, it is clearly evident that a variety of useful portable apparatus can be configured for this purpose by combining the basic first embodiment device 10 (or any suitable alternate configuration described herein) with any suitable focal point support apparatus, such as shown in FIGS. 13–16, and any solar energy absorbing heating, cooking, or processing accoutrements, which allow the materials contained therein to be indirectly heated, cooked, or processed by concentrated solar radiation, such as a kettle, oven, autoclave, and the like. Such portable apparatus may also optionally incorporate any suitable supporting, orienting, and leveling apparatus, such as shown in FIGS. 10–12, any common material transport or process control mechanisms to allow either batch or continuous processing, and/or any other useful accessory elements described herein.

Figure 23:
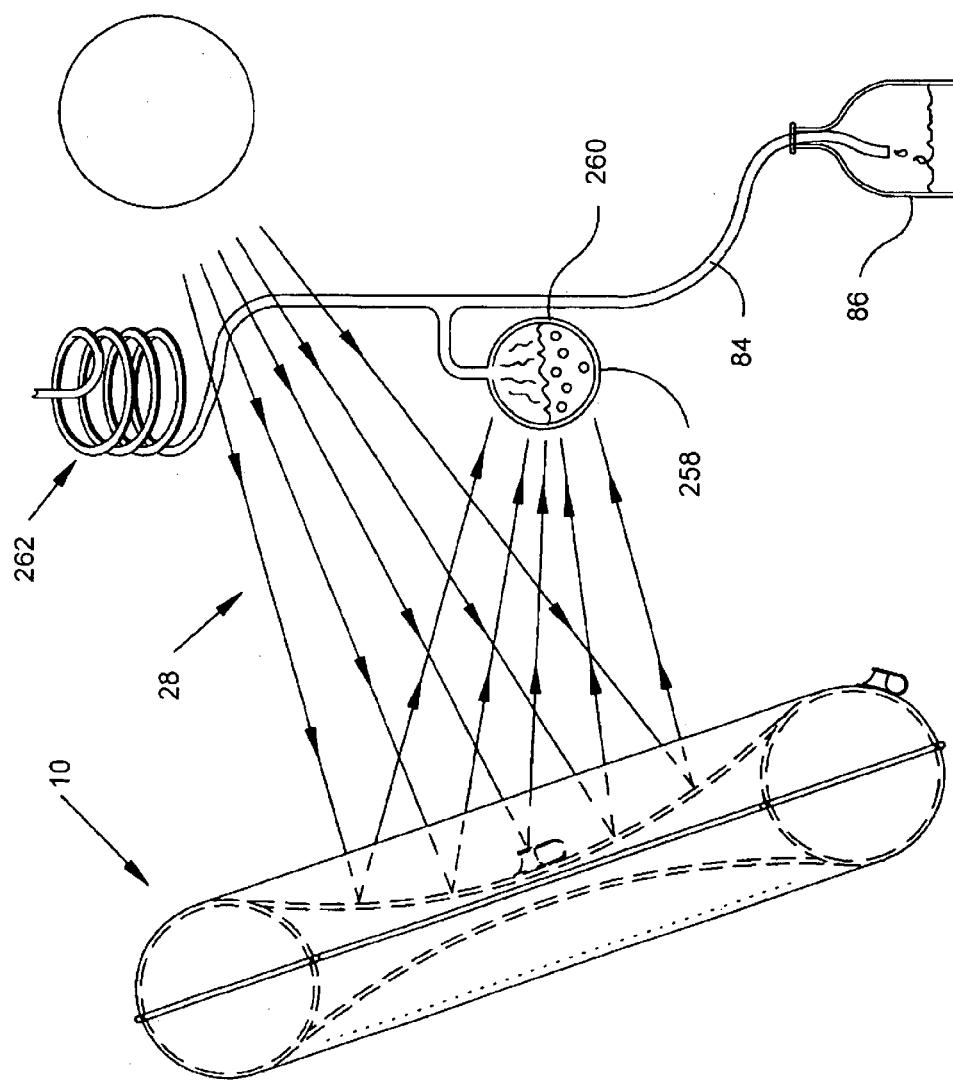
FIG. 23 is a schematic elevational cross-sectional view of the first embodiment device utilizing solar radiation to distill liquids by employing an energy-absorbing, generally externally blackened, pressure vessel, which contains the starting liquid, and which is connected by a conduit to a condensation coil and to a distillate collection vessel.

FIG. 23 depicts a first embodiment device 10 utilizing solar radiation 28 to distill liquids 258. The liquid containing vessel 260 is attached to a coiled distillation column 262, which is open on top and deposits the condensate (i.e., condensed liquid) via conduit 84 into a collection container 86. It is noted that the device can be used to distill, desalinate, or otherwise process materials in batch or continuous mode. Optional piping (not shown) and other common devices for transporting the materials to be processed may be incorporated into the apparatus. It is noted that the instant invention also contemplates portable apparatus which facilitate distillation and/or desalination by solar radiation. Again, it is clearly evident that useful portable apparatus can be configured for these purposes by combining the basic first embodiment device 10 (or any suitable alternate configuration described herein) with any suitable focal point support apparatus, such as shown in FIGS. 13–16, and any suitable solar energy absorbing distillation, desalination, or evaporator apparatus, such as noted above. Such portable apparatus may also optionally incorporate any suitable supporting, orienting, and leveling apparatus, such as shown in FIGS. 10–12, any common material transport mechanisms to allow either batch or continuous processing, and/or any other useful accessory elements described herein.

Figure 24:
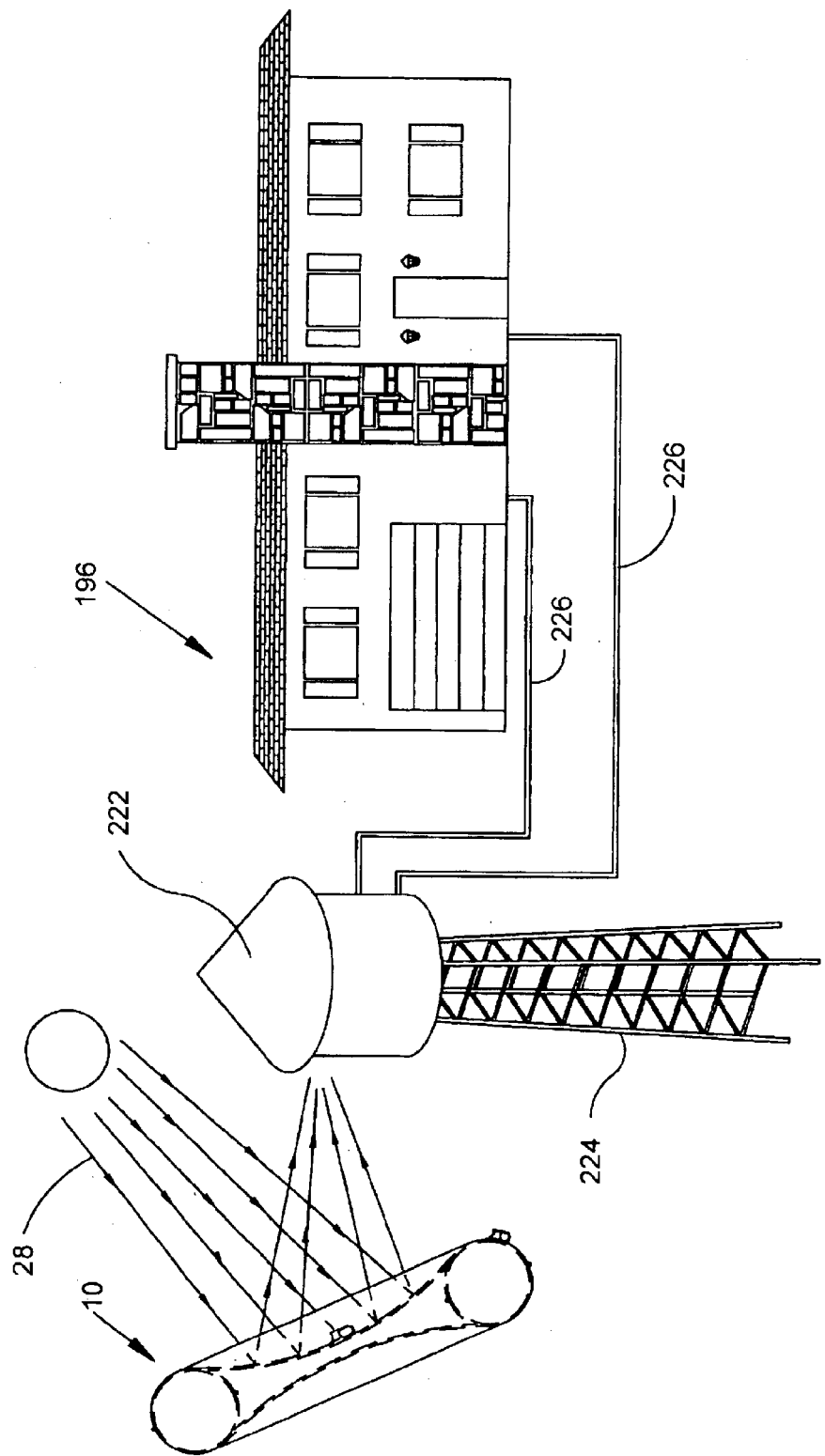
FIG. 24 is a schematic elevational cross-sectional view of the first embodiment device utilizing solar radiation to heat an elevated and blackened water tank to provide heat and/or hot water to a building.

FIG. 24 illustrates the use of the first embodiment device 10 to provide thermal heat to a building or factory 196 by focusing solar radiation 28 onto a generally blackened tank 222 elevated on a tower 224 and containing a working fluid, e.g., water, air, or steam, which passes through a conduit 226 after being heated to deliver thermal heat to the building, and then returns to the tower for reheating. It is noted that the thermal energy delivered to the building or factory may be used for general heating of the building/factory and/or for various industrial purposes (i.e., process heat). It is also noted that the apparatus can be used in a non-cyclical (i.e., open cycle) manner to provide, for example, hot water. It is further noted that the instant invention also contemplates various portable apparatus for providing heat or heated fluids. Again, it is clearly evident that useful portable apparatus can be configured for this purpose by combining the basic first embodiment device 10 (or any suitable alternate configuration described herein) with any suitable focal point support apparatus, such as shown in FIGS. 13–16, and any suitable solar energy absorbing heating vessel having any common fluid transport mechanisms to allow either open-cycle or closed-cycle operation. Such portable apparatus may also optionally incorporate any suitable supporting, orienting, and leveling apparatus, such as shown in FIGS. 10–12, and/or any other useful accessory elements described herein.

Figure 25:
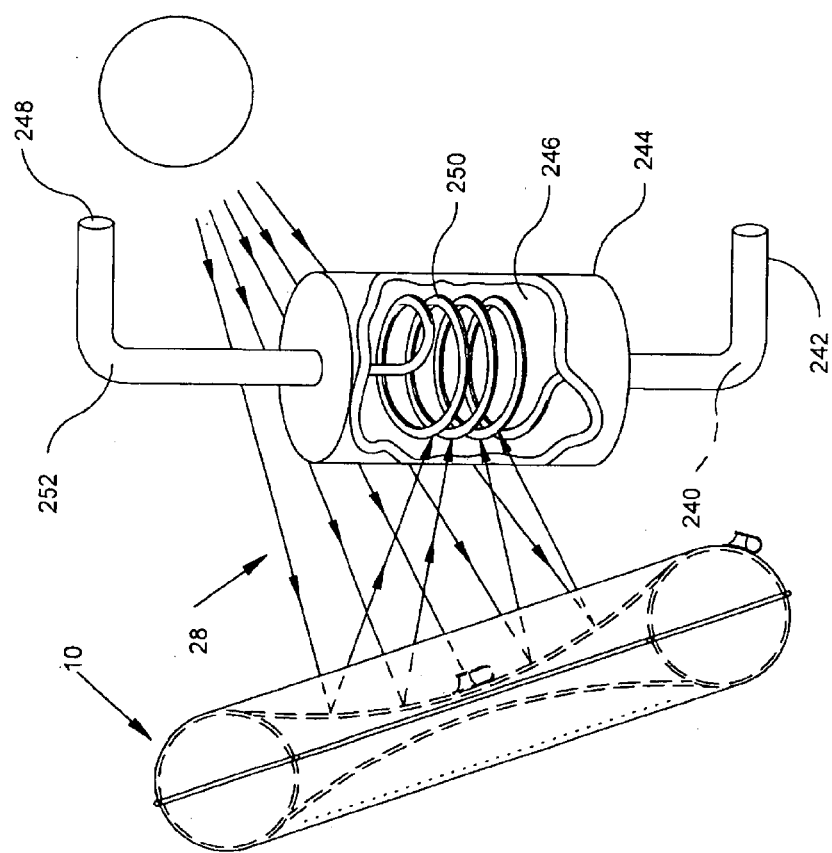
FIG. 25 is a schematic elevational cross-sectional view of the first embodiment device utilizing solar radiation to heat a liquid such as water in a blackened tank to form steam from a water influent to energize a proximate steam turbine (not shown) or provide heat for industry.

FIG. 25 illustrates the use of the first embodiment device 10 to heat by solar radiation 28 an influent liquid. 240 such as water from a pipe 242 in a blackened tank 244 having a heating liquid medium 246 to create effluent steam 248 in the coil 250 for passage through an effluent pipe 252 to a proximate turbine (not shown) to create electrical power. It should be noted that the instant invention also contemplates various portable apparatus for providing steam or other heated, high-pressure gas streams. Again, it is clearly evident that useful portable apparatus can be configured for this purpose by combining the basic first embodiment device 10 (or any suitable alternate configuration described herein) with any suitable focal point support apparatus, such as shown in FIGS. 13–16, and any suitable solar energy absorbing steam or gas generator apparatus including any common fluid transport mechanisms to allow either open-cycle or closed-cycle operation. Such portable apparatus may also optionally incorporate any suitable supporting, orienting, and leveling apparatus, such as shown in FIGS. 10–12, and/or any other useful accessory elements described herein.

Figure 26:
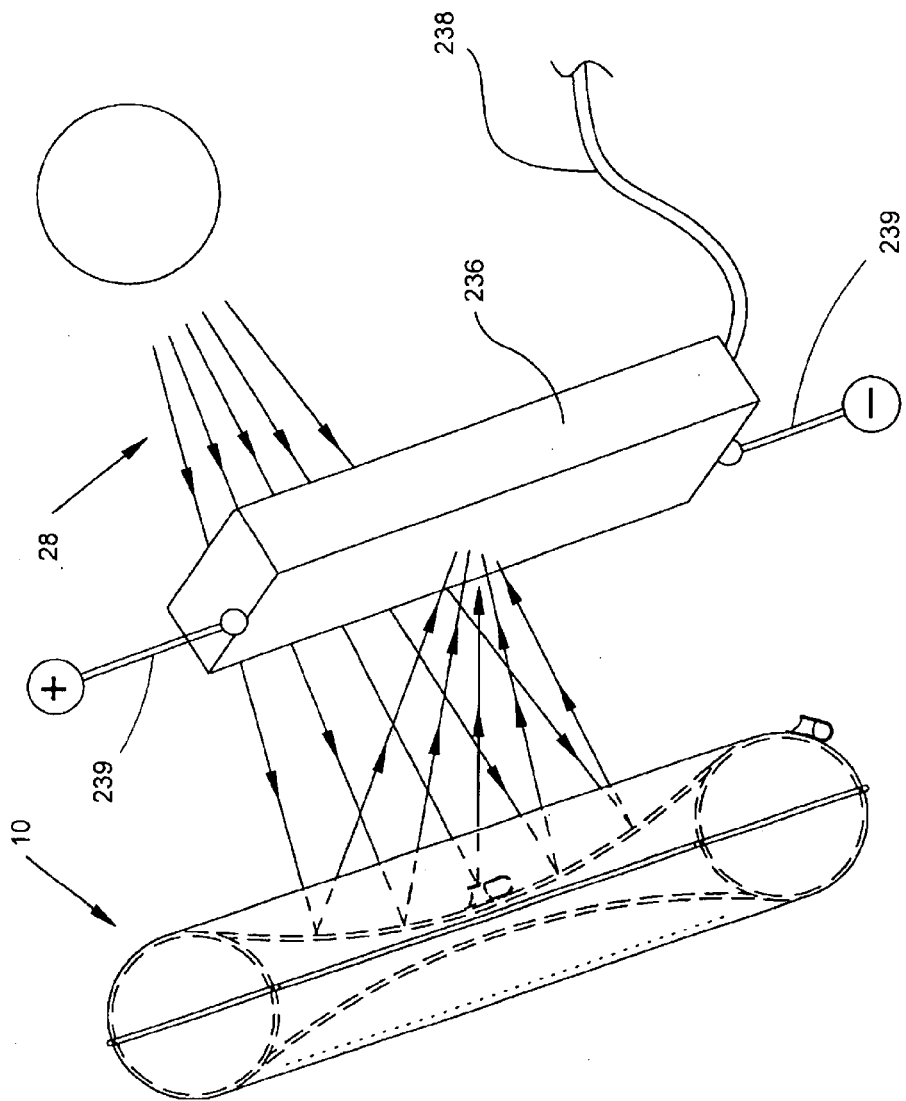
FIG. 26 is a schematic elevational cross-sectional view of the first embodiment device utilizing solar radiation to energize a thermoelectric cell device to generate electrical power.

FIG. 26 illustrates the use of the first embodiment device 10 to generate electrical power by concentrating solar radiation 28 onto a thermoelectric cell device 236 located at or near the focal point of the device 10. Wire conductors 239 conduct the electricity to any device requiring power. An optional tube or pipe 238 provides coolant to the thermoelectric cell device 236 to maintain the required internal temperature gradient.

Figure 27:
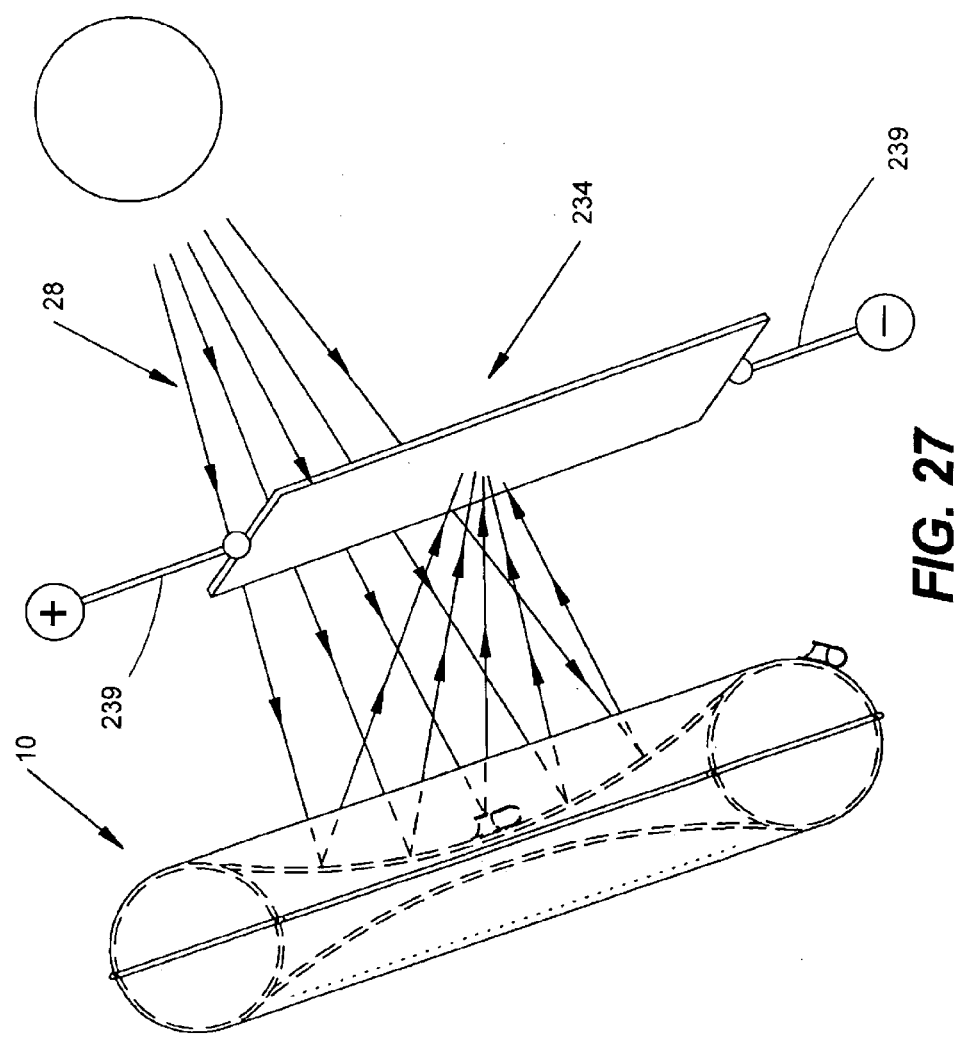
FIG. 27 is a schematic elevational cross-sectional view of the first embodiment device utilizing solar radiation to energize a photovoltaic cell device to generate electrical power.

FIG. 27 illustrates the use of the first embodiment device 10 to generate electrical power by concentrating solar radiation 28 onto a photovoltaic cell device 234 located at or near the focal point of the device 10. Wire conductors 239 conduct the electricity to any device requiring power. It should be noted that the instant invention also contemplates various portable apparatus for generating electrical power, wherein one or more photovoltaic and/or thermoelectric cell devices are mounted on any suitable focal point support apparatus, such as shown in FIGS. 13–16. Such portable apparatus may also optionally incorporate any suitable supporting, orienting, and leveling apparatus, such as shown in FIGS. 10–12, and/or any other useful accessory elements described herein.

Figure 28:
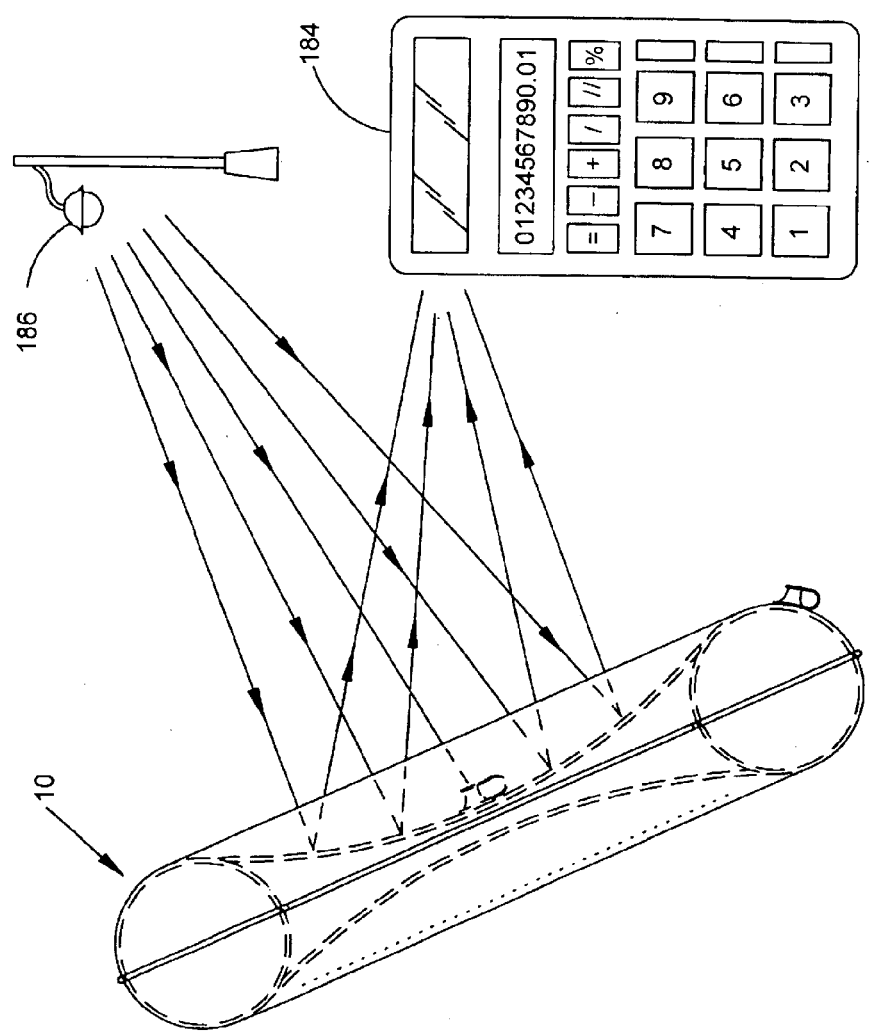
FIG. 28 is a schematic elevational cross-sectional view of the first embodiment device utilized to concentrate the light emitted from a sodium vapor street lamp to operate or recharge a low-power photo-electric device such as a calculator.

FIG. 28 illustrates the use of the first embodiment apparatus 10 to concentrate energy radiated from a distant sodium vapor street lamp 186 to energize and/or recharge a low-power photoelectric device such as a handheld calculator 184. The photovoltaic cell of the calculator 184 is placed at the focal point of the apparatus 10. It is noted that any suitable focal point support apparatus, such as shown in FIGS. 13–16, any suitable supporting, orienting, and leveling apparatus, such as shown in FIGS. 10–12, and/or any other useful accessory elements of the present invention may optionally be incorporated into the apparatus to facilitate this application.

Figure 29:
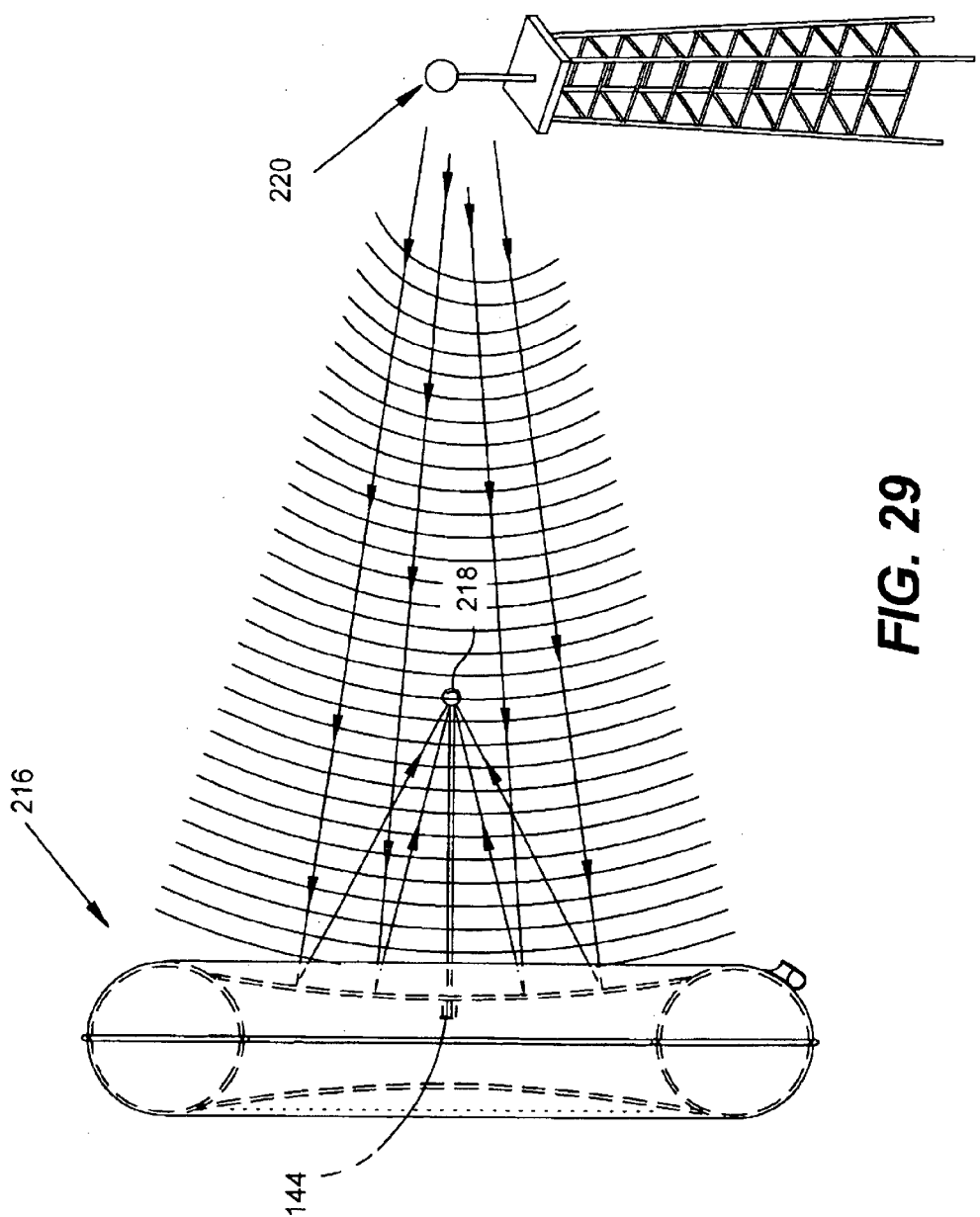
FIG. 29 is a schematic elevational cross-sectional view of the first embodiment device utilized in sub-ambient mode as part of a high-gain parabolic antenna apparatus to receive signals from a transmitter station.
Figure 30:
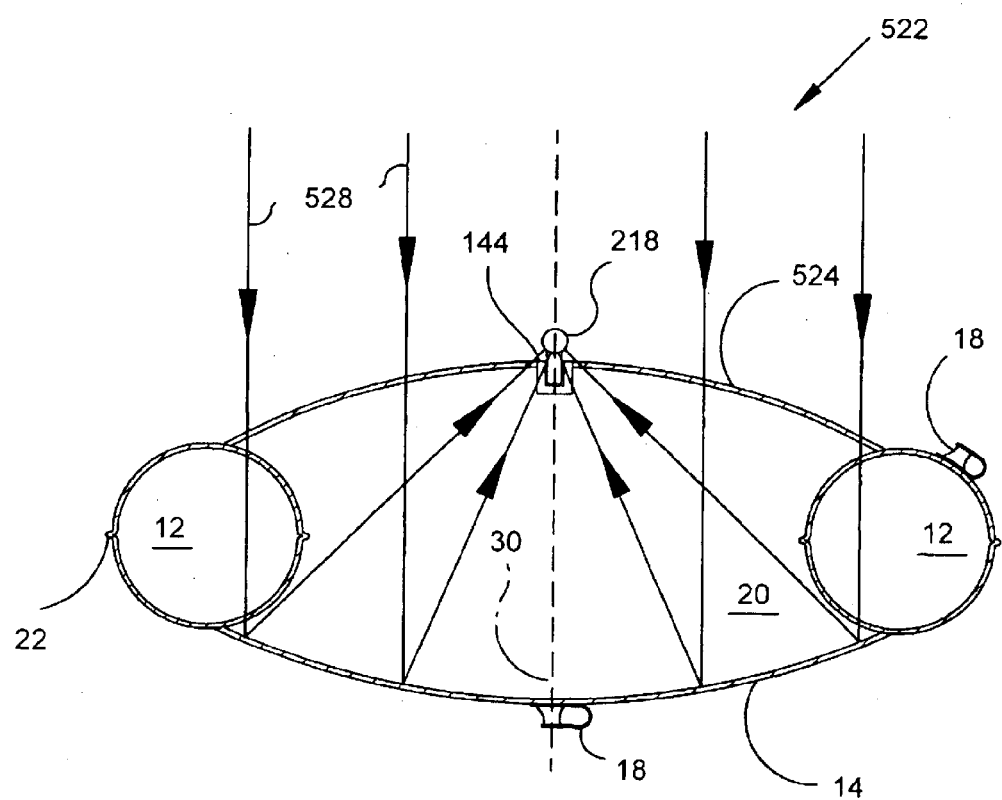
FIG. 30 is a schematic elevational cross-sectional view of a modified first embodiment device utilized in super-ambient mode as part of a high-gain parabolic antenna apparatus to enhance radio communications.

FIGS. 29–30—Description and Operation as a High-Gain Parabolic Antenna

FIG. 29 illustrates the modification of the first embodiment apparatus 10 to form a parabolic radio frequency or a microwave receiver device 216 by adding a centered antenna 218 secured in a centered pocket 144 in the membrane 14 along the focal axis of the apparatus 10 to receive signals from a transmitter station 220 normally out of range. The device can also be used to extend the range of radio transmission and/or to otherwise enhance radio communications, generally by placing a non-directional antenna, transmitter, and/or receiver device at the focal point as shown.

FIG. 30 depicts a modified first embodiment device 10 deployed in super-ambient mode forming apparatus 522 having an optionally non-reflective alternate pressure-deformable front central membrane 524, which is thus transparent to radio frequency radiation 528, and which supports an optional antenna 218 (or an antenna-containing device) in a centered socket 144 (or by other means) to enable or enhance radio communications. As shown in FIG. 30, a modified first embodiment apparatus 522 operating in super-ambient mode can incorporate a reflective membrane 14 having a very large diameter relative to the overall size of the device, especially if constructed with an oversized reflective membrane as shown, for example, in FIG. 48C; however, the toroidal support ring 12 must be constructed of materials (such as the previously specified vinyl and Mylar®), which are largely transparent to the frequency of radiation being concentrated (or projected) by the device. As noted above, a conductive mesh can be used to provide the reflective surface of the reflective membrane 14, which enables the device to selectively reflect and concentrate only longer wavelengths of electromagnetic radiation. The use of a conductive mesh for the reflector can be very beneficial in that it can prevent the device from concentrating broad-spectrum solar radiation (or other short-wavelength, high-energy electromagnetic radiation) that could prove damaging to the transparent membrane (or any attached accessory elements) located at or near the focal point.

In addition to facilitating terrestrial radio communications, the ability to deploy the modified first embodiment device 522 in super-ambient mode allows it to be operated in the vacuum of outer space for numerous electromagnetic applications including power generation, radio communications, radio telescopy, and others. However, it should be noted that the modified first embodiment device 522 can still be operated in sub-ambient mode and, as such, can also perform all of the functions of the basic first embodiment device 10. Accordingly, the modified first embodiment device 522 is significantly more versatile than a basic first embodiment device 10 as previously described. However, it should be emphasized that apparatus 10 is arbitrarily (i.e., optionally) configured with two reflective membranes for purposes of redundancy, whereas the basic first embodiment requires that only one of the membranes be reflective, thus effectively yielding apparatus 522.

It is noted that any suitable focal point support apparatus, such as shown in FIGS. 13–16, any suitable supporting, orienting, and leveling apparatus, such as shown in FIGS. 10–12, and/or any other useful elements of the present invention may optionally be incorporated into the apparatuses depicted in FIGS. 29 and 30 to facilitate such radio frequency (RF) applications.

Figure 31:
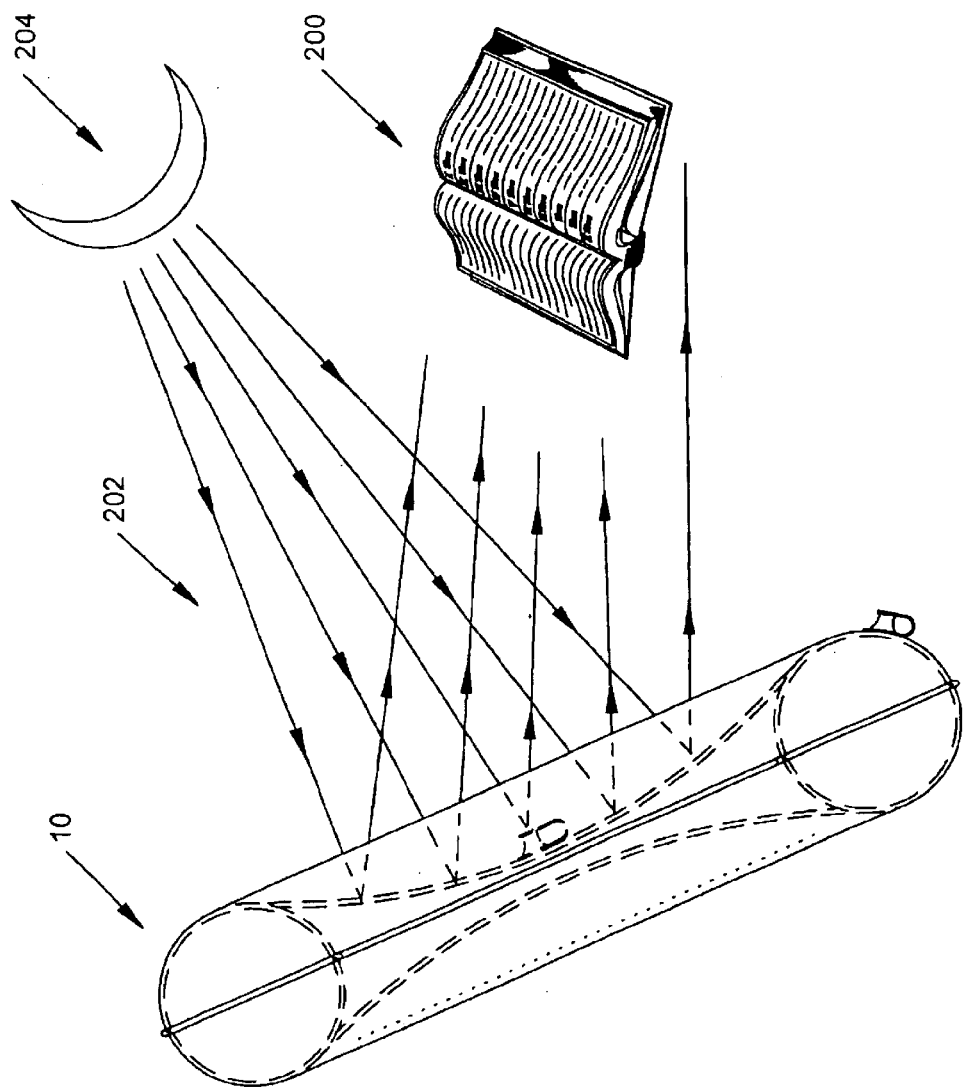
FIG. 31 is a schematic elevational cross-sectional view of the first embodiment device utilized to capture and concentrate lunar radiation to read a book or view other items such as compass or a map.

FIGS. 31–37—Description and Operation as an Illumination and Optical Signaling Apparatus FIG. 31 shows the first embodiment device 10 enabling a book 200 to be read by concentrating visible lunar light 202 radiating from the crescent moon 204. A compass, map, and/or other items also can be read or seen by this method. It is noted that light radiating from other dim or distant sources, such as a distant street lamp or a close grouping of city lights, also can be concentrated in this manner to provide adequate illumination for reading and other activities. Again, this application can be facilitated by incorporating into the apparatus any suitable focal point support apparatus, such as shown in FIGS. 13–16, to hold the object to be viewed at the focal point, any suitable supporting, orienting, and leveling apparatus, such as shown in FIGS. 10–12, and/or any other useful elements of the present invention.

Figure 32:
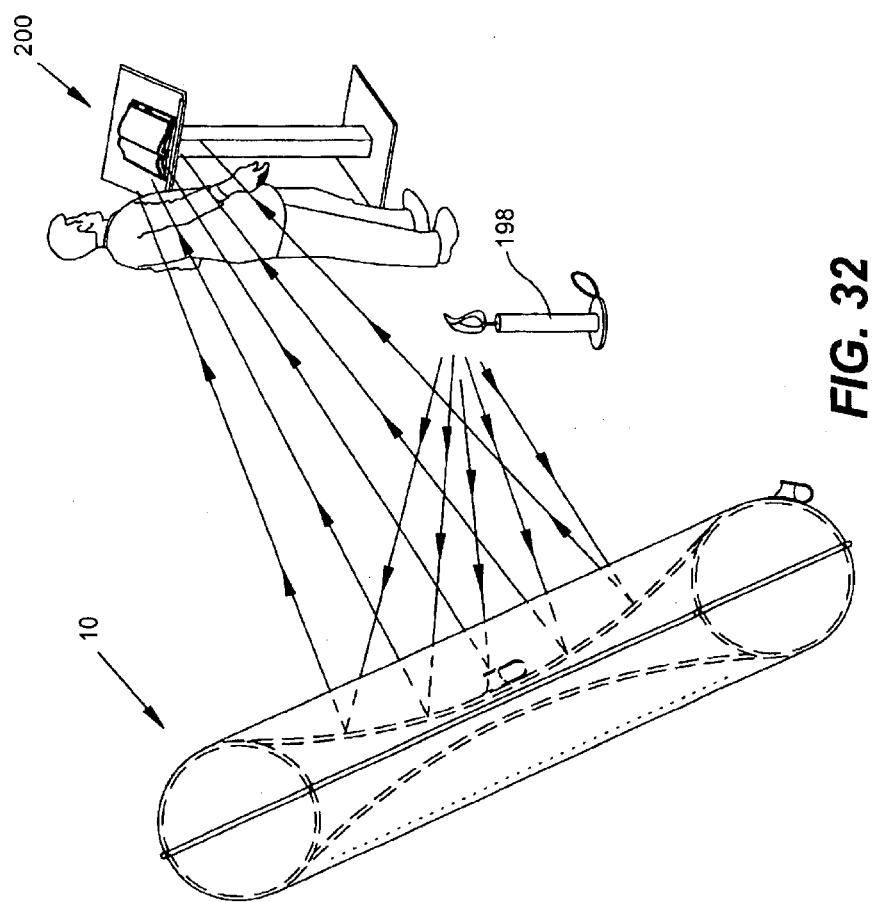
FIG. 32 is a schematic elevational cross-sectional view of the first embodiment device utilized with a burning candle at its focal point to illuminate a distant object or area in a dark environment for purposes such as reading a book.

FIG. 32 illustrates the use of the first embodiment apparatus 10 to project and focus the illumination from a lit candle 198 to read a book 200 located approximately 15 meters away in the dark. It is noted that other non-collimated sources of illumination can be used for this application including, for example, a light bulb, match, cigarette lighter, lantern, torch, phosphorescent glow stick, and the like. Additionally, it should be noted that the device can also be used to project light for other practical as well as artistic applications. It is further noted that these applications can be facilitated by incorporating into the apparatus any suitable focal point support apparatus, such as shown in FIGS. 13–16, to hold the light source at the focal point, any suitable supporting, orienting, and leveling apparatus, such as shown in FIGS. 10–12, and/or any other useful elements of the present invention.

Figure 33:
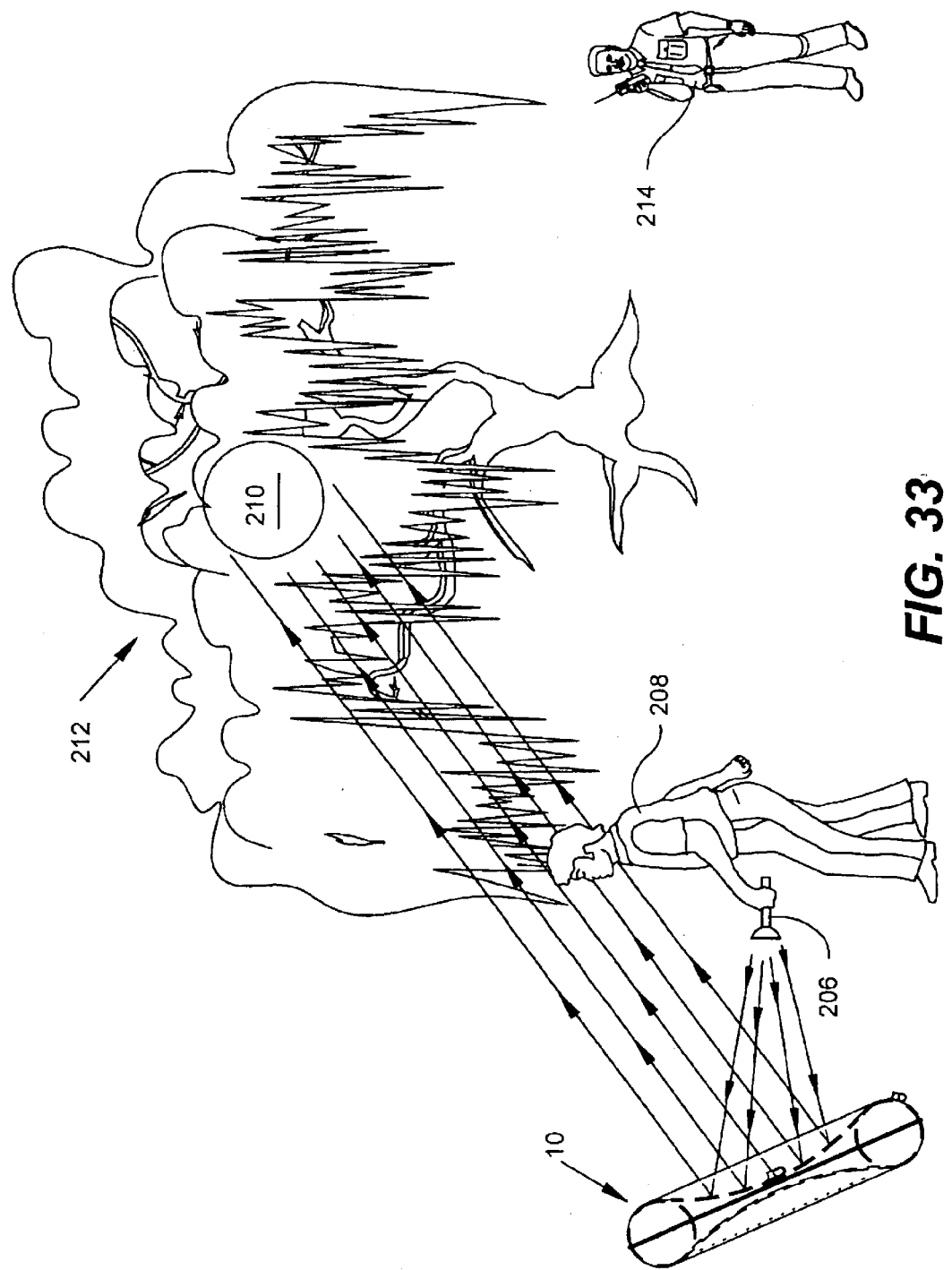
FIG. 33 is a schematic elevational cross-sectional view of the first embodiment device utilized with a non-collimated light source such as a flashlight or lantern to communicate by bursts of light signals focused on a distant tree observed by another person.

FIG. 33 depicts the use of the first embodiment device 10 for the transmission of light signals from a flashlight 206 or other non-collimated light source manipulated by a first person 208 to project a light image 210 on a distant tree 212 or the like opaque object observed by a second person 214 with knowledge of Morse code. Other light sources such as a lantern, a candle, a match, and a cigarette lighter can be substituted by intermittently covering the light source to transmit signals. Once again, this application can be facilitated by incorporating into the apparatus any suitable focal point support apparatus, such as shown in FIGS. 13–16, to hold the light source at the focal point, any suitable supporting, orienting, and leveling apparatus, such as shown in FIGS. 10–12, and/or any other useful elements of the present invention.

Figure 34:
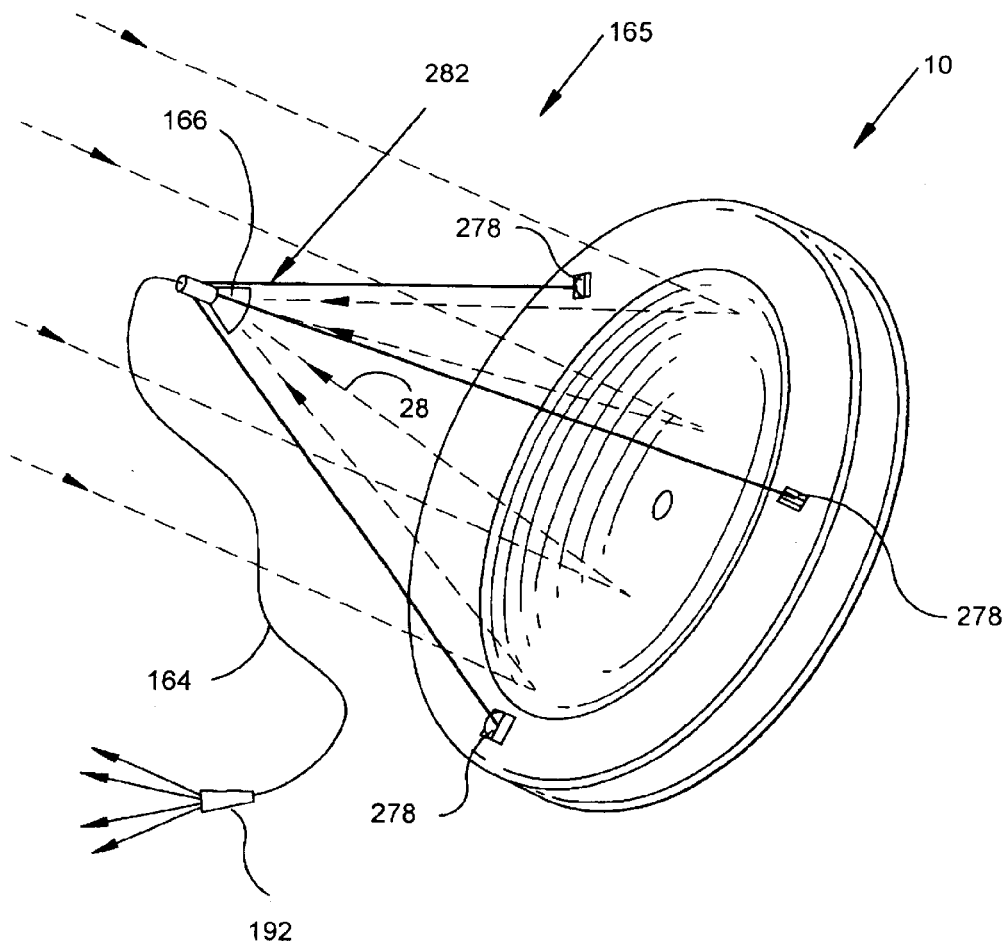
FIG. 34 is a schematic perspective view of the first embodiment device utilized as a component of a portable waveguide illumination apparatus.

FIG. 34 shows first embodiment device 10 incorporated into a portable waveguide illumination apparatus 165 wherein a truss support, such as the tripod or multi-leg support apparatus 282 as shown in FIG. 13, is attached to the device 10 at devises 278 and supports a wave guide intake device 166 which funnels concentrated solar radiation 28 into a fiber optic cable 164 (or other type of optical waveguide), for transmission to a lamp/diffuser 192. It is noted that various other accessory elements of the present invention, such as any one of the other focal point support apparatuses as shown in FIGS. 14–16, any one of the supporting, orienting, and leveling apparatus as shown in FIGS. 10–12, and/or any other useful accessory elements of the present invention may optionally be incorporated into the apparatus to facilitate use as a portable waveguide illumination apparatus as depicted below in FIGS. 35 to 37.

Figure 35:
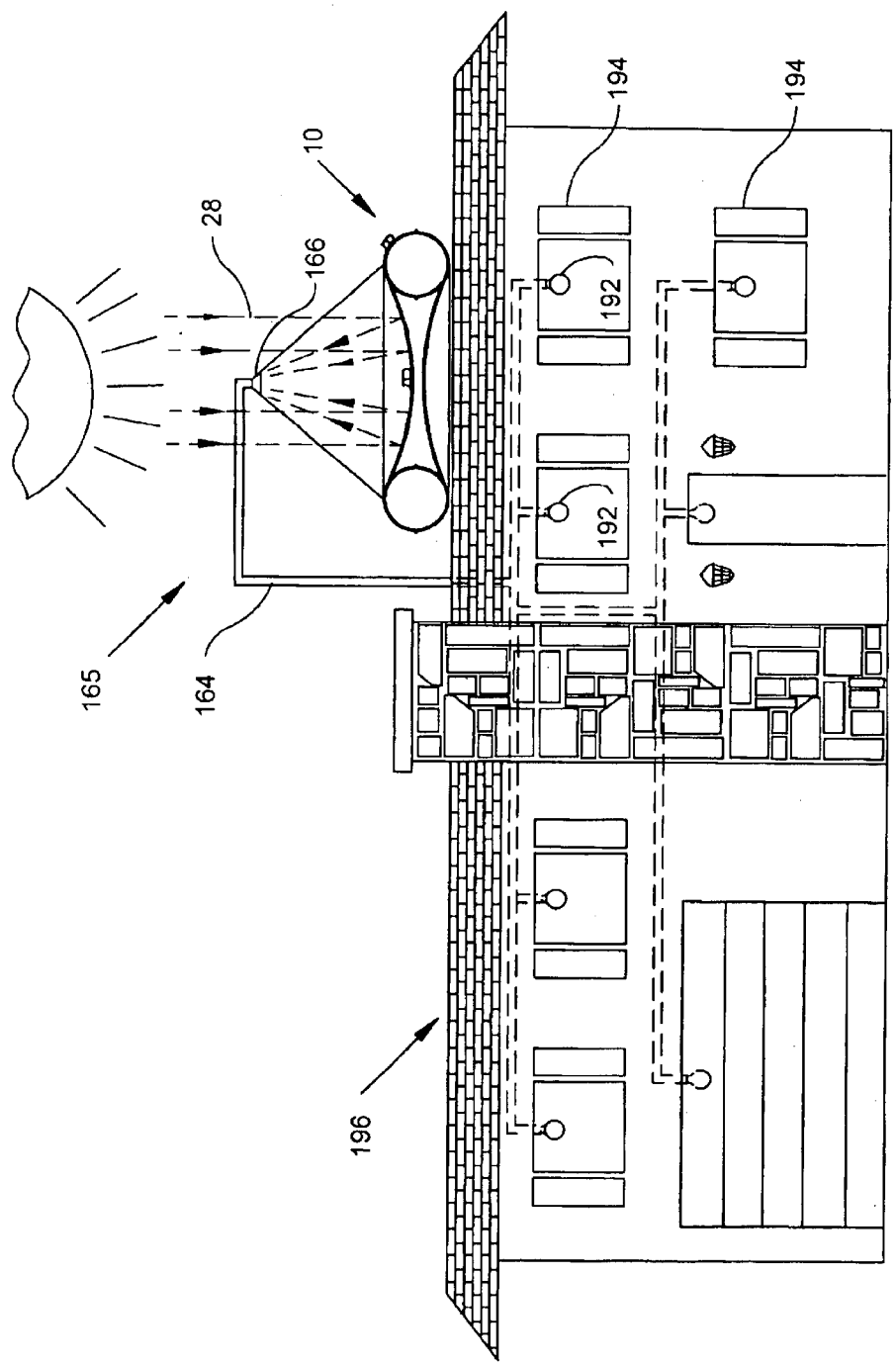
FIG. 35 is a schematic elevational cross-sectional view of the first embodiment device employed as part of a portable waveguide illumination apparatus utilizing solar radiation to illuminate the interior of a building.

FIG. 35 shows the portable waveguide apparatus 165 using solar radiation 28 or lunar radiation to provide illumination for rooms 194 in a multi-story building 196 using individual lamps 192. It should be noted that this system can also be used to illuminate various subterranean environments, for example, underground shelters, caves, tunnels, mines, wells, and the like, and/or other darkened environments.

Figure 36:
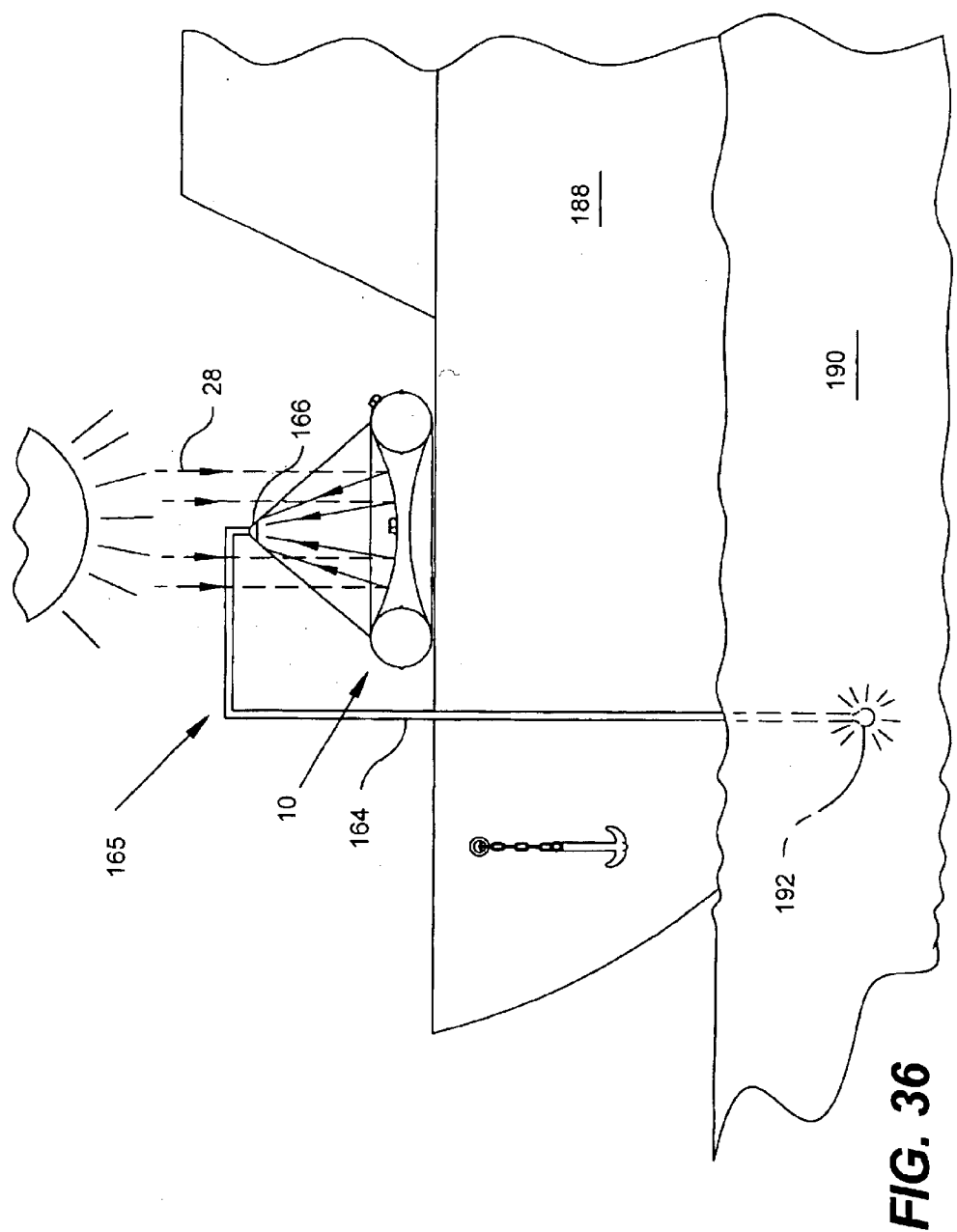
FIG. 36 is a schematic elevational cross-sectional view of the first embodiment device employed as part of a portable waveguide illumination apparatus utilizing solar radiation to produce underwater illumination in the form of panchromatic light for divers.

FIG. 36 shows the portable waveguide apparatus 165 on a ship 188 at sea 190 using solar radiation 28 or lunar radiation to provide pan-chromatic illumination to an underwater lamp 192 for use by a diver (not shown). It should be noted that the inflatable and, thus, floating support ring 118 and hemispherical support 120 of FIG. 10 can be employed to permit the apparatus 165, as many of the other apparatus of the present invention, to be supported, oriented, and used on water without the aid of a ship or other waterborne platform.

Figure 37:
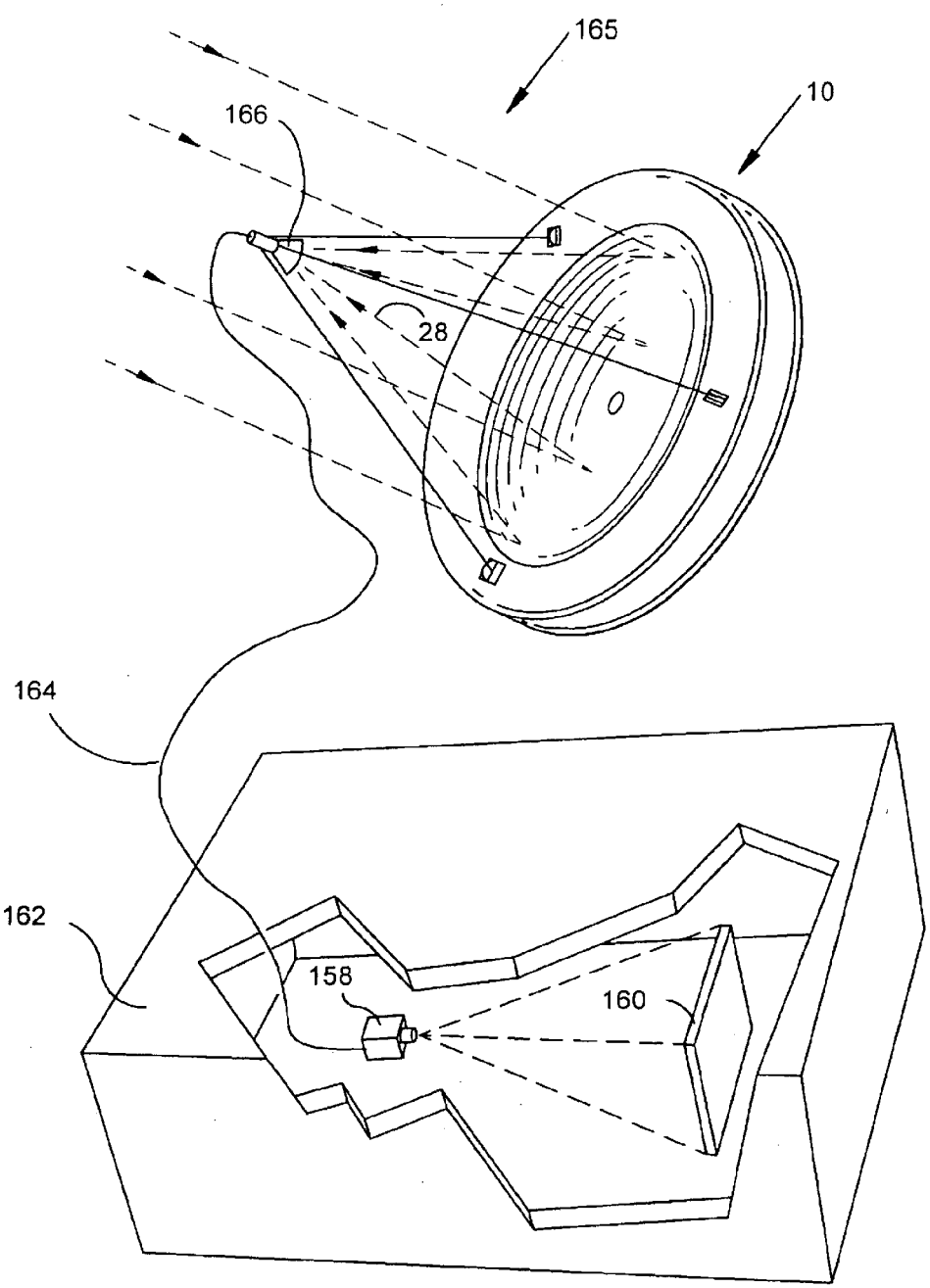
FIG. 37 is a schematic perspective view of the first embodiment device employed as part of a portable waveguide illumination apparatus utilizing solar radiation to provide illumination for an optical image projector.

FIG. 37 shows the portable waveguide apparatus 165 using solar radiation 28 or lunar radiation to provide illumination for an optical image projector 158 to project images onto a projection screen 160 inside a building 162.

Overall, FIGS. 21–37 illustrate several user-selectable focused electromagnetic functions or applications of the present invention, performed either by a basic apparatus or the apparatus in concert with one or more accessory elements. However, it is again emphasized that the present invention possesses various means (wherein such means comprise one or more components or elements of the basic apparatus, a specific arrangement of such components or elements, and/or one or more accessory elements) for performing one or more functions not involving concentrating, focusing, and/or beaming radiant electromagnetic energy (e.g., means for performing non-focused electromagnetic functions and/or means for performing non-electromagnetic functions) including, for example, the various means as illustrated below in FIGS. 38–47.

Figure 38:
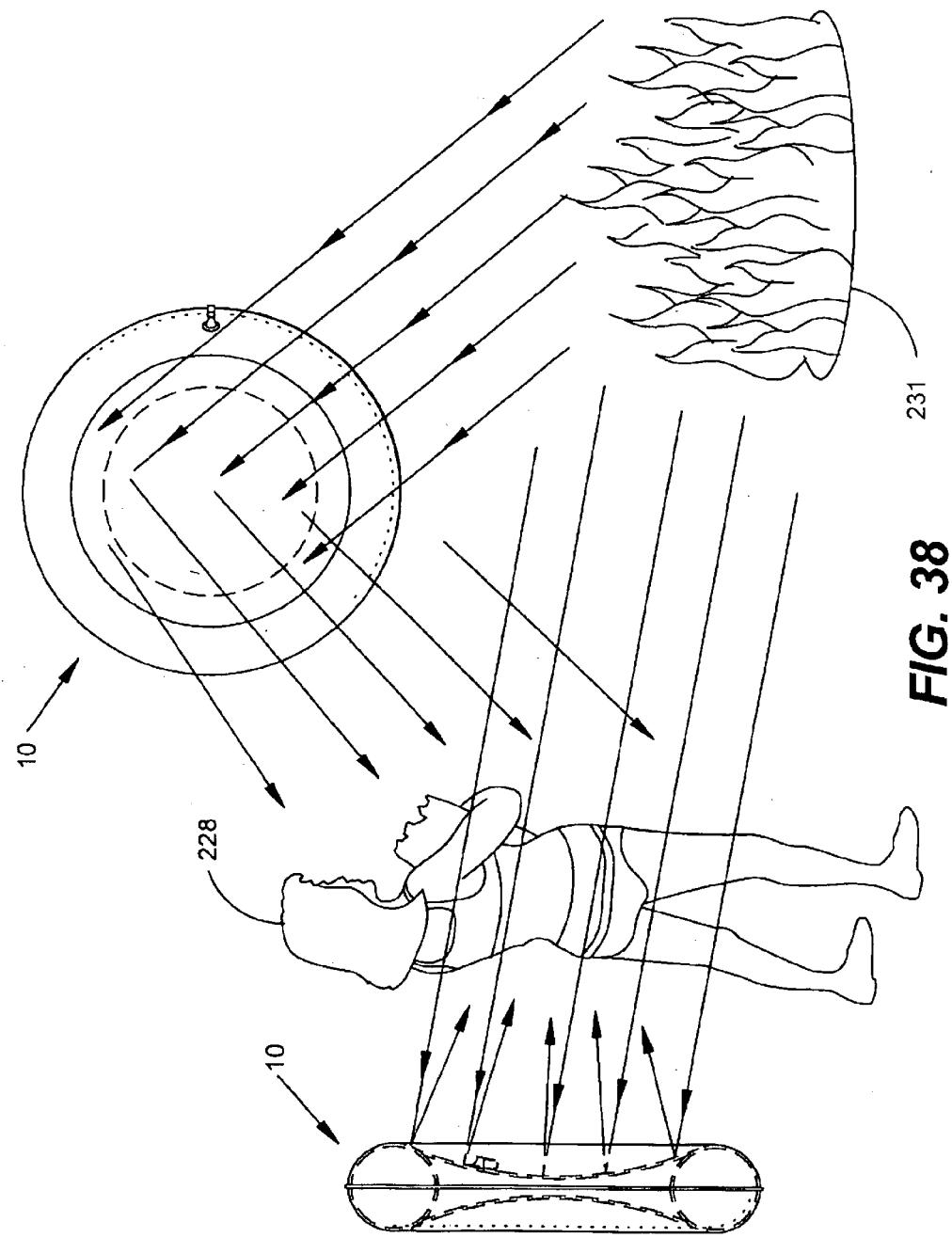
FIG. 38 is a schematic elevational cross-sectional view of two first embodiment devices utilized to reflect radiant energy from a campfire onto a person for warmth or survival during cold weather.
Figure 39:
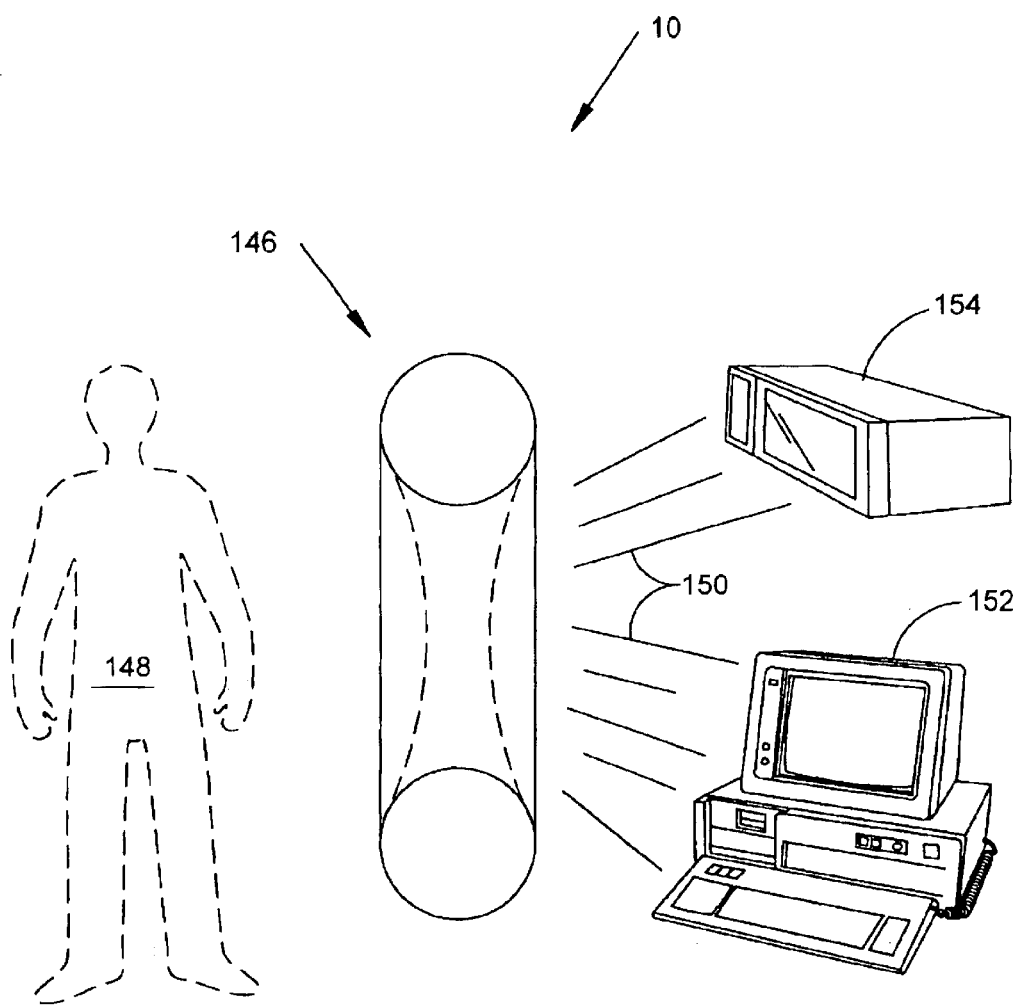
FIG. 39 is a schematic elevational cross-sectional view of the first embodiment device utilized as an electromagnetic energy shield for protection from either a leaking microwave oven or from an improperly shielded cathode ray tube device.
Figure 40:
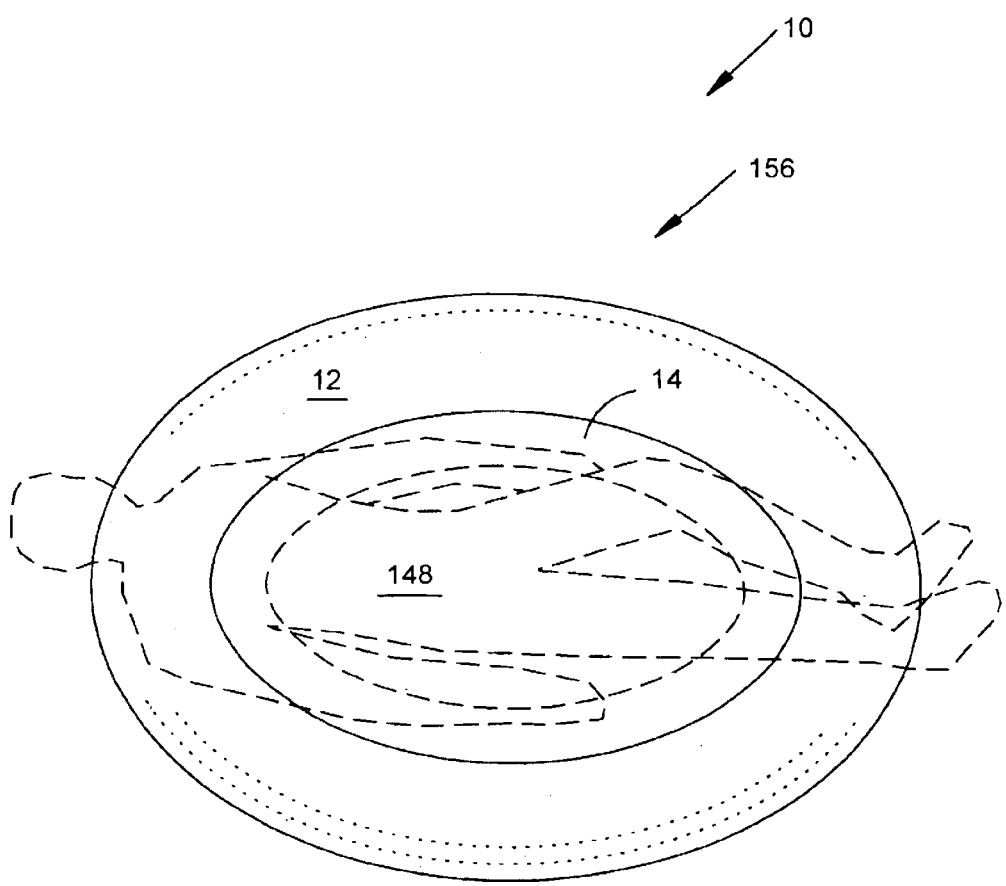
FIG. 40 is a schematic perspective view of the first embodiment device utilized as an emergency thermal bed or blanket.

FIGS. 38–40—Description and Operation as a Non-focusing Electromagnetic Reflector or Insulator FIG. 38 depicts the use of the first embodiment device 10, either alone or in concert with a second device 10, to warm a bather 228 from heat radiated from a camp fire 231 during cold weather. It is noted that the device need not be fully deployed to achieve this function; however, inflating the device may enable it to be free-standing or otherwise self-supporting as shown.

FIG. 39 depicts a first embodiment device 10 utilized as an electromagnetic energy shield 146 to protect a person 148 (shown in shadow) forced to be in proximity to the dangerous electromagnetic rays 150 escaping from an improperly or otherwise not fully shielded cathode ray tube containing device such as a computer 152 or a leaking microwave oven 154. This protection is provided regardless of whether the device is inflated; however, inflating the device may enable it to be free-standing or otherwise self-supporting as shown.

It is noted that oversized reflective membranes as depicted below in, for example, FIG. 48C may be used to enhance shielding.

FIG. 40 illustrates the first embodiment device 10 employed as a multi-layer emergency thermal bed or blanket 156 by a person 148 for heating oneself by reflected body heat, thus, conserving body energy. The device also can be used to protect persons or objects from excessive heating as well as cooling, and/or from electrostatic shock. For these applications, the device 156 can be placed under (for use as a bed), draped over or wrapped around (for use as a blanket), or otherwise deployed to insulate or shield the person 148 or object. Again, it is noted that oversized reflective membranes as depicted below in, for example, FIG. 48C may be used to enhance insulation and/or shielding, and that the achievement of these functions does not require that the device be inflated. However, inflation may once again enable the device to be free-standing. Also, the device may be inflated to serve as a soft, compliant support, bed, or cradle for comfortably and/or safely holding persons or objects. It is further noted that the device can be used as a gurney (or stretcher) or as an inflatable cast to support injured persons or animals. Note that an inflatable cast is generally deployed by loosely wrapping and securing the cast around a broken or otherwise injured limb, then inflating to immobilize the injured limb. Additionally, it should be noted that this device in an inflated state, as many of the other devices of the instant invention, can be used as a flotation device or a water boat, or for sliding down a snow-covered slope (not shown).

Accordingly, the present invention (or elements and/or arrangements of elements thereof) as depicted in FIGS. 38–40 (or as otherwise depicted herein) and/or as described in the associated text serves as an effective means for performing at least one non-focused electromagnetic and/or non-electromagnetic function or application including, for example, a means for providing waterborne flotation, a means for providing snowborne transportation, a means for providing a compliant support, a means for immobilizing a broken limb, a means for providing electrostatic insulation, a means for providing thermal insulation, and/or a means for providing electromagnetic insulation.

Figure 41:
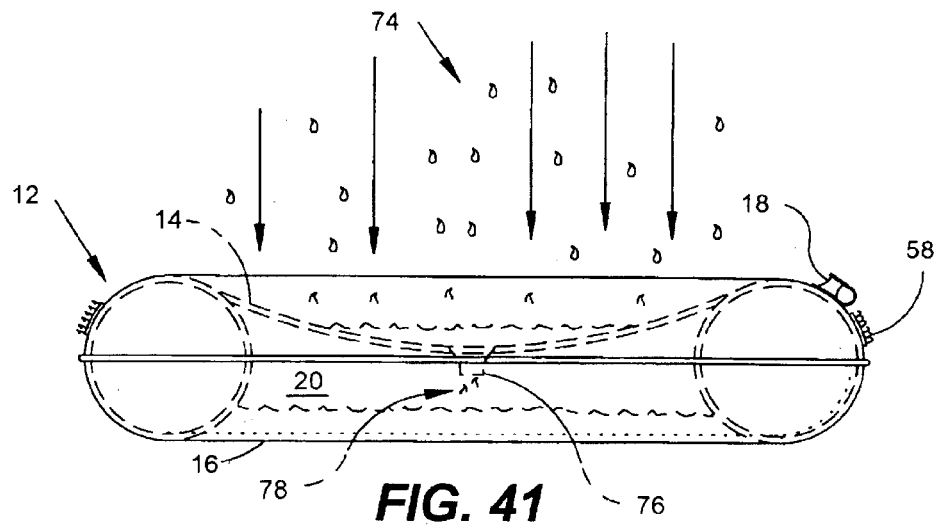
FIG. 41 is a schematic side elevational cross-sectional view of the first embodiment device modified with a funnel centered in the upper membrane to collect falling materials, such as rain water, which collect within the cavity between the membranes.

FIGS. 41–46—Description and Operation as a Water Collection, Storage, and Processing Apparatus FIG. 41 depicts a liquid (e.g., rain) collecting and storage apparatus 74 having a centered outlet duct 76, i.e., a modified valve and/or membrane shaped like a funnel to facilitate draining, in the upper membrane 14 passing water effluent 79 to the reflector chamber 20. In addition to collecting and storing a variety of liquid materials including water, oil, chemical solutions, and other liquids, the apparatus 74 can also be used to collect and store dry materials, such as grain or other granular materials, which are substantially fluidic on a macroscopic basis. It should be noted that the basic first embodiment device 10 (or other embodiments of the invention) can also serve in this application; however, the optional funnel-shaped outlet duct 76 improves the ability to transfer materials to the reflector chamber 20. It should also be noted that one or more additional valved outlet ducts 76 may be incorporated into the apparatus at other useful locations, such as centered within the lower reflective membrane 16, to facilitate draining of liquids or other materials from the reflector chamber 20. It is further noted that the device can be used as a simple water collection and holding basin, for which the liquid is not transferred to the reflector chamber.

Figure 42:
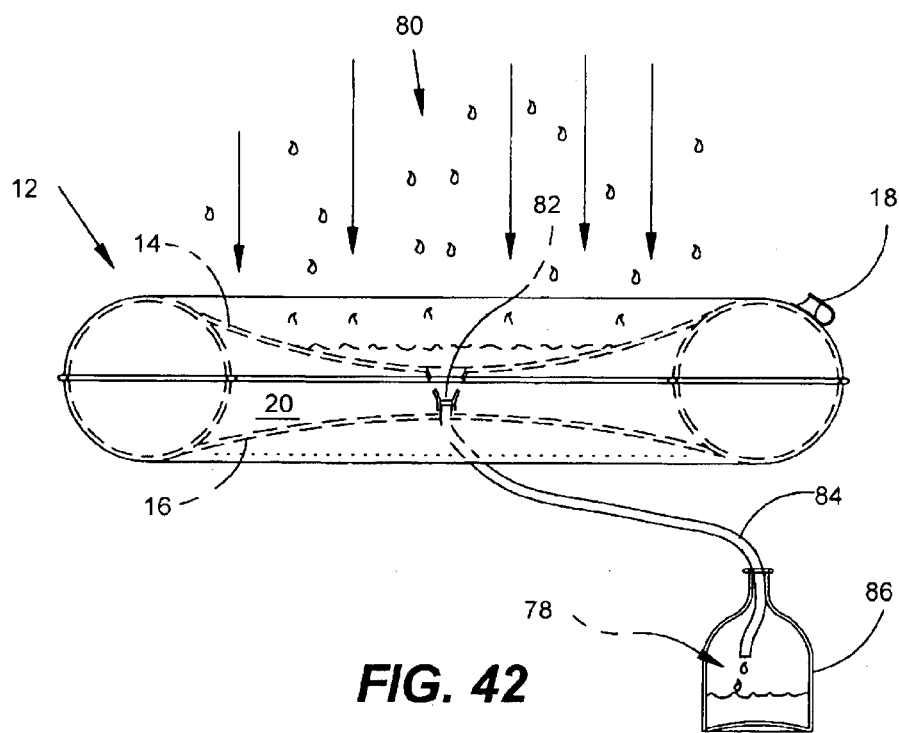
FIG. 42 is a schematic side elevational cross-sectional view of a modified first embodiment device for collecting and distributing falling materials, such as rainwater, including a collecting funnel, a drainage tube, and a collection vessel.

FIG. 42 shows a modified liquid collecting apparatus 80, wherein the centered funnel 82 passes through the lower membrane 16 to a conduit 84 and a collection container 86. This configuration allows the device to be rapidly converted between various modes of operation, e.g., between rain collecting and cooking. It should be noted that this configuration can be implemented by the user by connecting an opposing pair of funnels/valves contained in the opposing reflective membranes 14 and 16.

Figure 43:
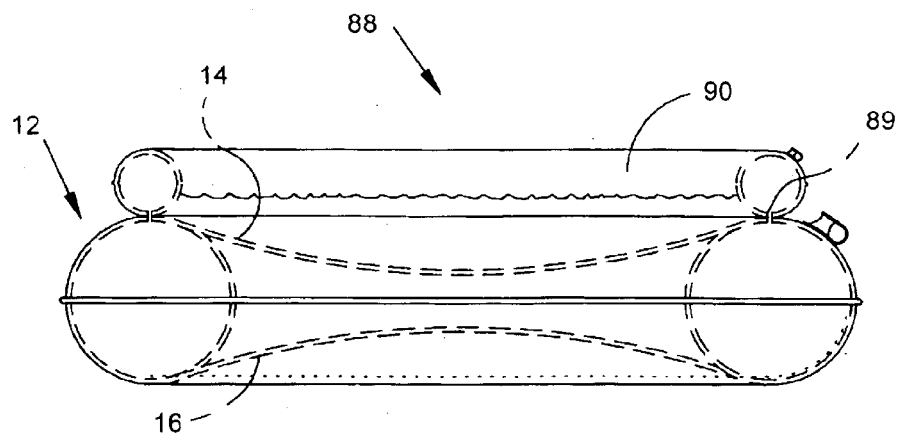
FIG. 43 is a schematic side elevational cross-sectional view of a first embodiment device modified with an additional inflatable ring to enhance the collection and holding of materials, such as water, and for other purposes.

FIG. 43 illustrates the collection of rain water or other liquids in the apparatus 88, which has an additional inflated toroidal collection or catchment ring 90 attached on top of the toroid 12 with optional air passage ports 89 between the ring 90 and the toroid 12 to permit simultaneous inflation. The ring 90 increases the water collection volume of the apparatus 88. The ring 90 also reduces losses due to impact splatter, and it reduces spillage, especially if the apparatus 88 is positioned on an inclined surface, such as a hill, or on a moving surface, such as the deck of a rocking boat. The collection ring 90 has a generally, but not necessarily, smaller minor (i.e., tube) diameter. The major (i.e., ring) diameter of the collection ring 90 can be enlarged to increase the effective capture area. In the event it is necessary to increase the external volume or height of the apparatus for liquid collecting (or any other purpose described in the instant application, such as supporting an item at the focal point on a rod diametrically spanning the ring 90 as shown in FIG. 15), additional collection rings 90 may be attached to the device to increase the height of the walls. In the event it is necessary to increase the internal volume of the apparatus for liquid storage or other purposes, additional toroidal support rings 12 may be incorporated into the device between the reflective membranes 14, 16.

Figure 44:
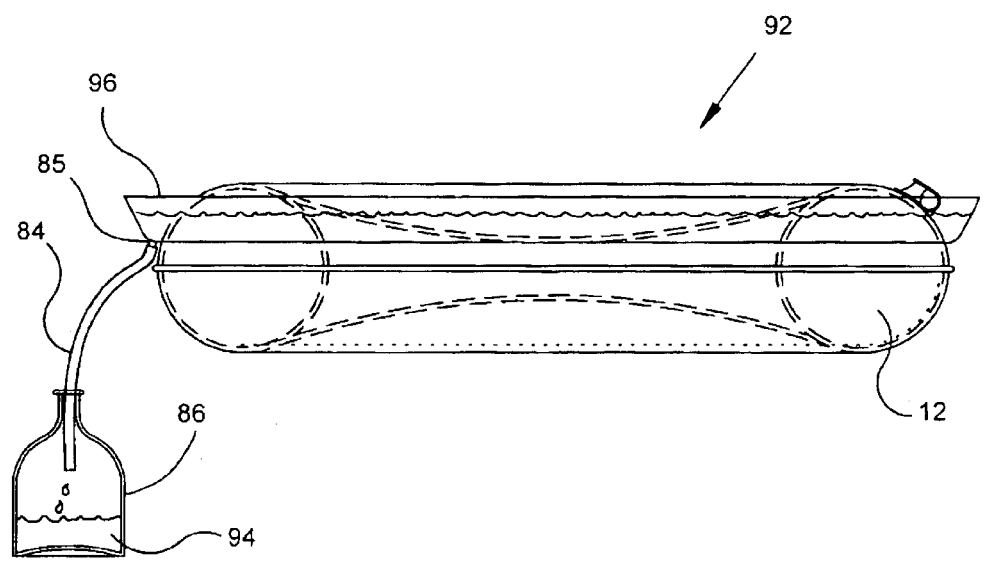
FIG. 44 is a schematic side elevational cross-sectional view of the first embodiment device modified with a peripheral gutter and drain port used in conjunction with a tube and water collection tank to enhance the collection of precipitation or condensed water.

FIG. 44 shows the apparatus 92 collecting water 94 in a peripheral gutter 96 and draining the water into an optional collection container 86 via an optional drain port 85 and an optional conduit 84. It should be noted that the peripheral gutter 96 can be located at the outer edge of the toroid 12, and that it can be fabricated from extensions of the membranes comprising the toroid 12.

Figure 45:
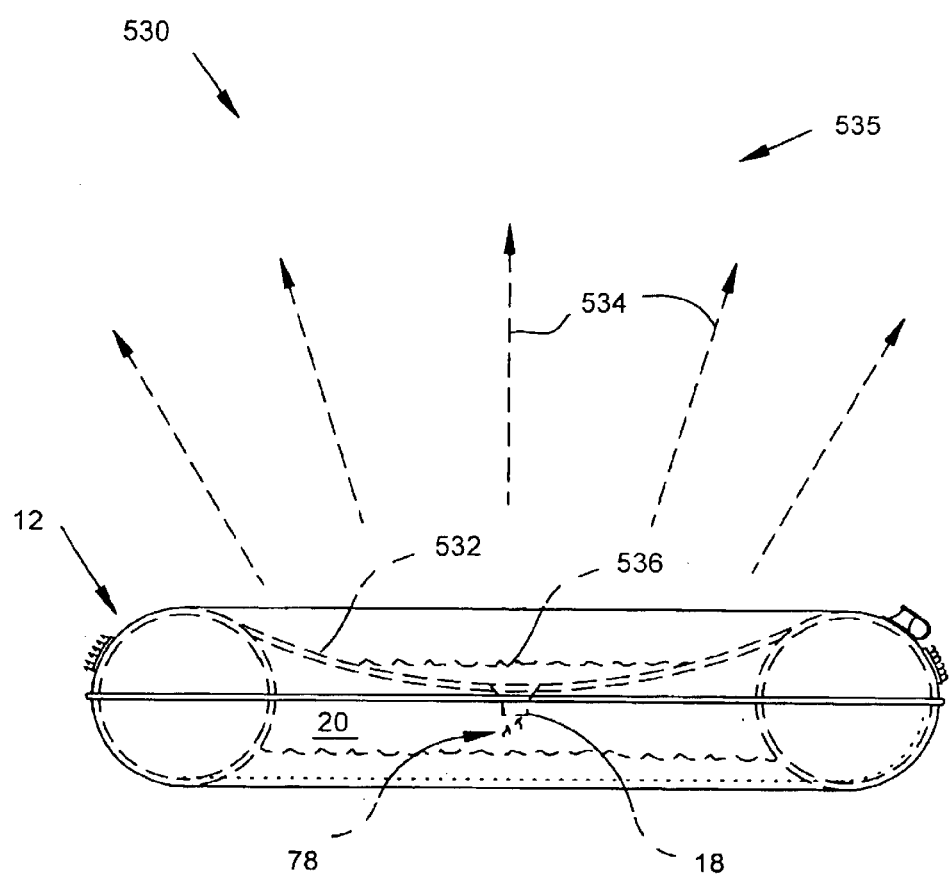
FIG. 45 is a schematic side elevational cross-sectional view of the first embodiment device modified with an upper, matte black, high-emissivity surface enabling water collection at night by way of radiative condensation processes.

FIG. 45 shows an apparatus 530 for collecting water by radiative condensation processes wherein a predetermined portion of the apparatus 530 has a high-emissivity (e.g., matte black) outer surface 532, which radiates energy 534 to a darkened sky 535 at night causing the high-emissivity surface 532 to cool to the dew point, thus enabling water vapor to condense out of the surrounding atmosphere as dew or frost 536. Effluent 78 (i.e., dew or melted frost) may be transferred via valve 18 to the reflector chamber 20 for storage.

Figure 46:
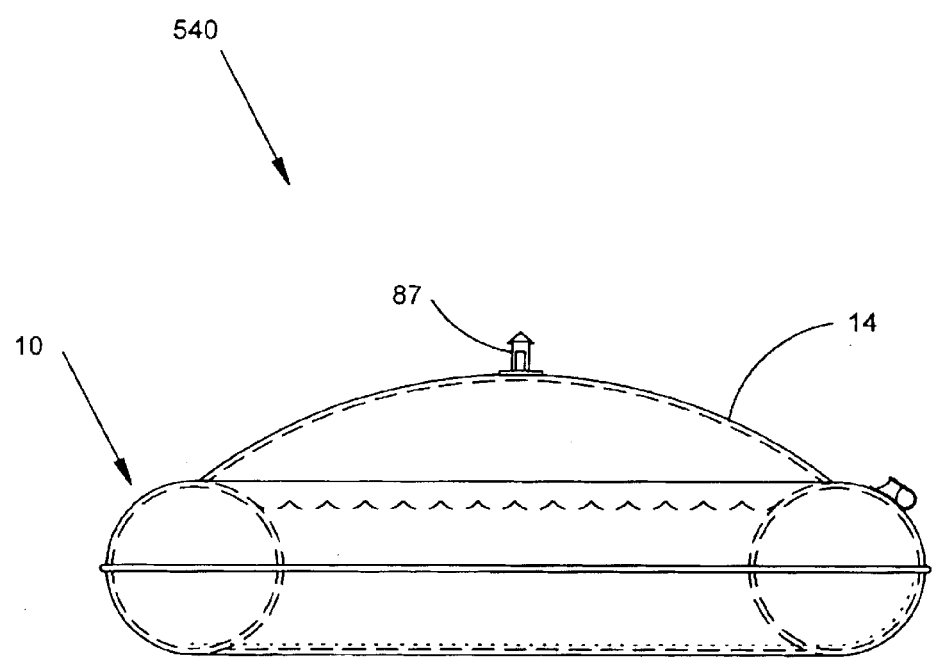
FIG. 46 is a schematic elevational cross-sectional view of the first embodiment device used as a portable fermentor apparatus.

FIG. 46 depicts the first embodiment device 10 being used as a portable fermentor apparatus 540 by attaching a removable or integral pressure relief valve or anaerobic air lock 87 to the upper central membrane 14. It is noted that this portable fermentor apparatus 540 can be used with (or converted to) the portable distillation apparatus shown in FIG. 23 to produce high-grade spirits in the field for a variety of purposes including, for example, use as a fuel, beverage, or medicine, or for other various medical or industrial applications.

Figure 47:
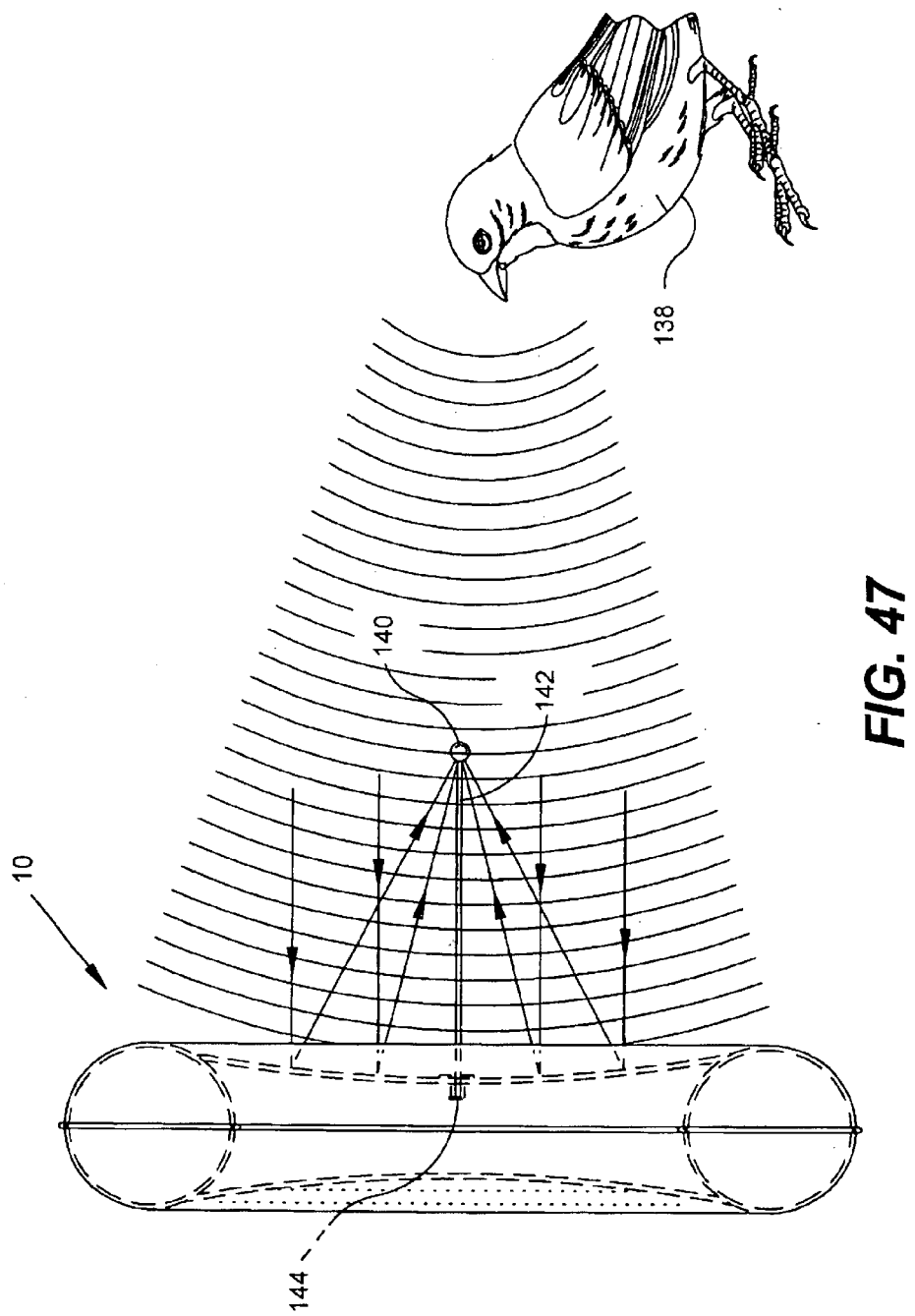
FIG. 47 is a schematic elevational cross-sectional view of the first embodiment device utilized to concentrate an auditory chirp made by a bird with the aid of an optional microphone system or by the naked ear.

FIG. 47—Description and Operation as a Directional Sound Concentrating Apparatus FIG. 47 shows a first embodiment device 10 utilized to hear a distant sound such a chirping bird 138 by placing one's ear (not shown) at the focal point or having a microphone 140 on a shaft 142 seated in a socket 144 centered in the frontal reflective membrane 14.

Accordingly, the present invention (or elements and/or arrangements of elements thereof) as depicted in FIGS. 41–47 (or otherwise depicted herein) and/or as described in the associated text serves as an effective means for performing at least one non-electromagnetic function or application including, for example, a means for collecting and/or holding fluids (e.g., liquids or other substantially fluidic materials), a means for internally storing fluids, a means for distributing fluids, a means for processing fluids, a means for fermenting materials, a means for internally storing materials, and/or a means for concentrating sound.

Figure 48A:
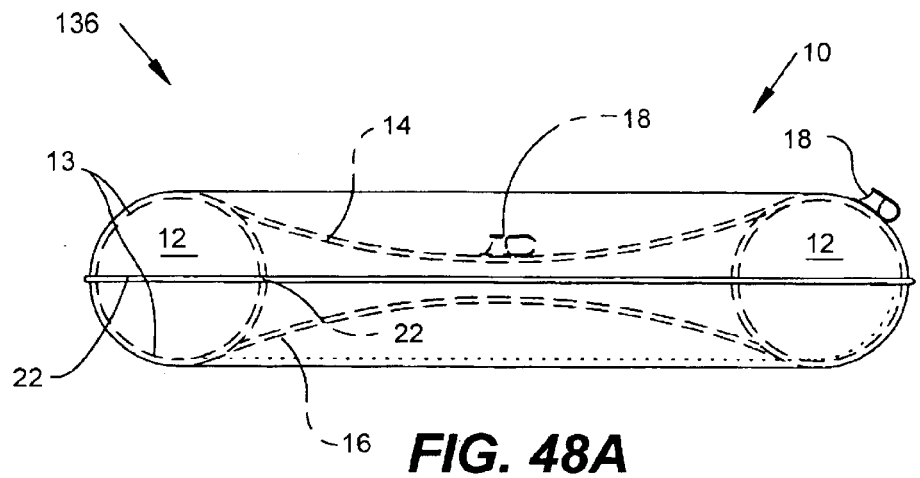
FIG. 48A is a schematic side elevational cross-sectional view of the first species of the first embodiment device in an inflated condition having two pre-formed reflective membranes, a simple inflatable support ring made in a flat pattern from two annular sheets of high-strain material, and two valves.
Figure 48B:
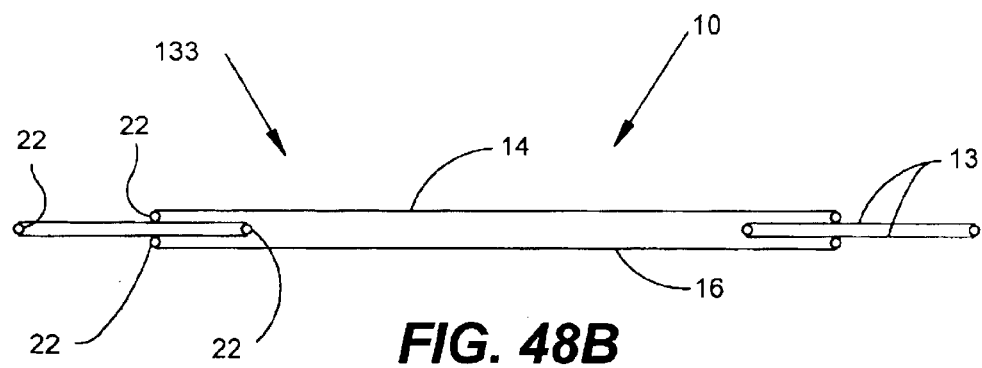
FIG. 48B is a schematic cross-sectional view of the FIG. 48A first species in a first subspecies manufacturing flat pattern showing the un-inflated condition and preferred bonding locations. Note that for this and other manufacturing flat patterns depicted herein, the valves are omitted from the figures for clarity, and the pre-formed reflective membranes are shown as planar for simplicity.
Figure 48C:
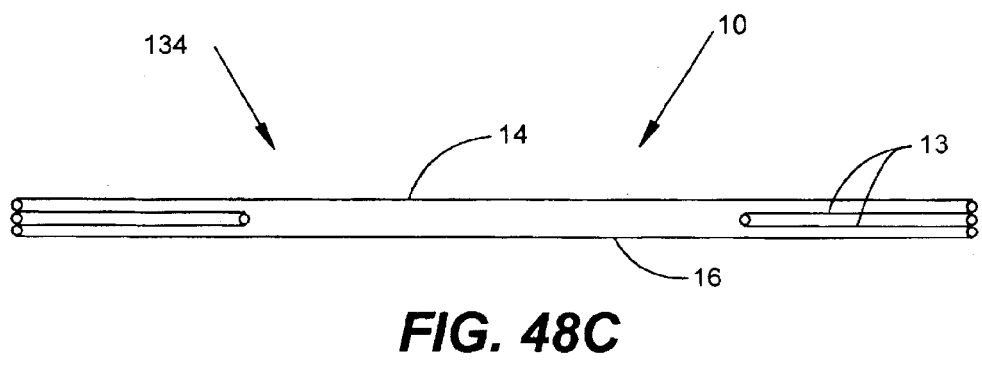
FIG. 48C is a schematic cross-sectional view of the FIG. 48A first species in a second subspecies flat pattern utilizing oversized reflective membranes, which fully encompass the inflatable support ring.

FIGS. 48A–56—Methods of Manufacturing Preferred and Alternate Configurations of the First Main Embodiment FIGS. 48A–C illustrate methods of manufacturing the basic first main embodiment device 10 as shown in FIGS. 1 and 2 in a preferred first species configuration 136 having a simple toroidal support ring 12 fabricated in flat pattern from two annular sheets 13 of high-strain (i.e., high-strength and low-elastic-modulus) material, such as vinyl, where the circles represent the seams or bonds 22. FIG. 48A depicts the inflated condition of two distinct subspecies, which are shown schematically in FIGS. 48B and 48C in a non-inflated, as-manufactured condition.

FIG. 48B illustrates the first subspecies 133 of the inflated apparatus 136 for which nominally sized reflective membranes 14, 16 are bonded to the annular sheets 13, which form the toroid 12, generally at or near the locations which will become circular lines of tangency between the parabolic reflective membranes 14, 16 and the toroidal support ring 12 upon inflation. (Note that reflective membranes which are sized to match the diameter of this circular line of tangency are considered herein to be "nominally" sized.)

FIG. 48C illustrates a second subspecies 134 of the inflated apparatus 136 having oversized reflective membranes 14, 16, which overlap and fully encapsulate the toroid 12. It is noted that such oversized reflective membranes can be used to facilitate manufacturing, protect the toroid 12, provide a larger reflector when deployed in super-ambient mode such as shown in FIG. 30, and/or to improve performance when deployed as an electromagnetic shield or thermal blanket such as shown in FIGS. 39 and 40.

As noted previously, the circular reflecting membranes 14, 16 are typically made of a thin plastic material, such as Mylar®, coated with aluminum, gold and the like reflective material; however, any of the alternate configurations of the central membranes 14, 16 as previously noted may be incorporated into this first species 136 as well as any of the following species and subspecies of the device 10. It should also be noted that the reflective membranes 14, 16, although typically pre-formed, are shown as planar within these and subsequent flat pattern schematic views for simplicity. It is further noted that the necessary valves will be installed for inflation; however, valves have also been omitted from these and subsequent schematic figures for simplicity.

The primary benefit of this first species 136 is simplicity of construction of the toroid, which translates to low cost of manufacturing. This simplicity of construction is made feasible by utilizing low-elastic-modulus, high-strength materials to form the toroid (recall that such materials have the ability to strain, i.e., stretch, sufficiently so as not to impede the full inflation of a toroid fabricated in flat pattern from two flat annular sheets). Another benefit of this first species 136 is that all but the outermost portions of the toroid are largely free of buckling when inflated, thus providing a highly smooth ring structure upon which to mount the reflective membranes. However, the rigidity of the toroid is limited due to the low elastic modulus of the high-strain-capable material (e.g., vinyl) used to form the toroid and, thus, can cause distortions in the reflective membranes, thereby reducing performance. Furthermore, high-strain materials, such as vinyl, are generally not as strong as other commercially available membranous materials, such as Mylar®, and thus do not yield devices of the lowest possible weight.

Figure 49A:
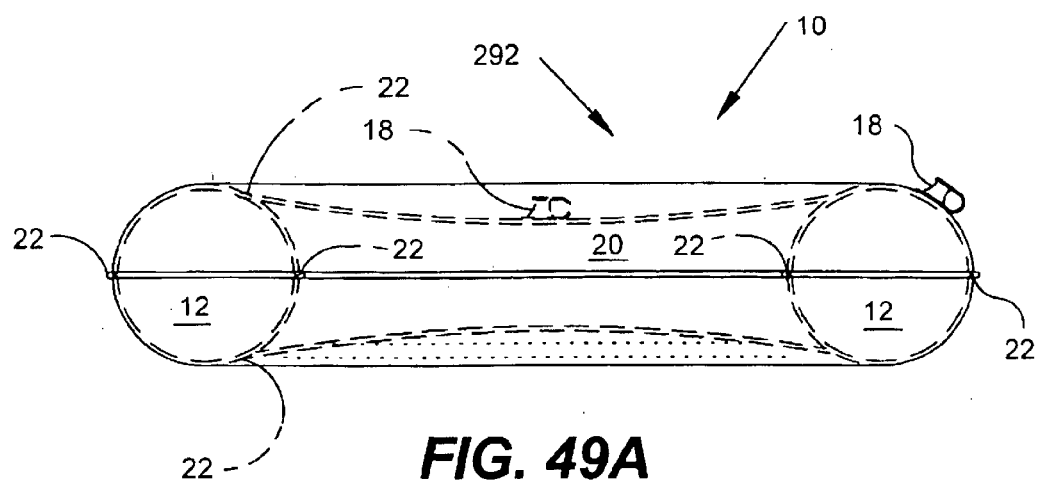
FIG. 49A is a schematic side elevational cross-sectional view of a second species of the first embodiment device in an inflated condition having an alternate support ring made in flat pattern from four annular sheets of two dissimilar materials including two outer sheets made of high-strength, high-elastic-modulus material and two inner sheets made of high-strain material.
Figure 49B:
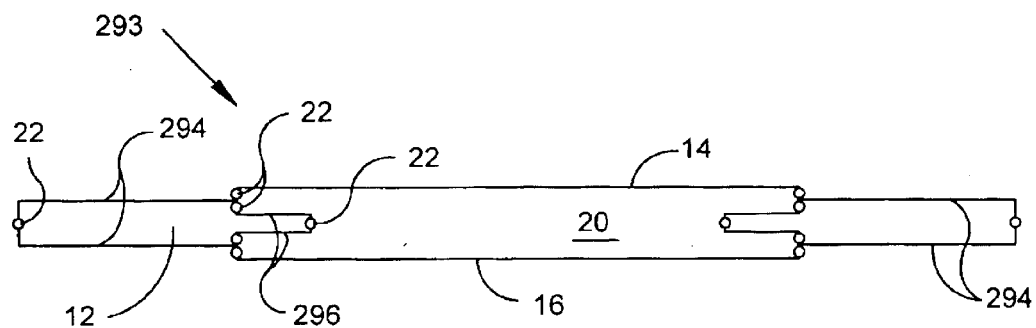
FIG. 49B is a schematic cross-sectional view of the FIG. 49A second species in a first subspecies flat pattern, wherein two separate pre-formed reflective membranes (shown flat) are bonded to the four-sheet support ring.
Figure 49C:
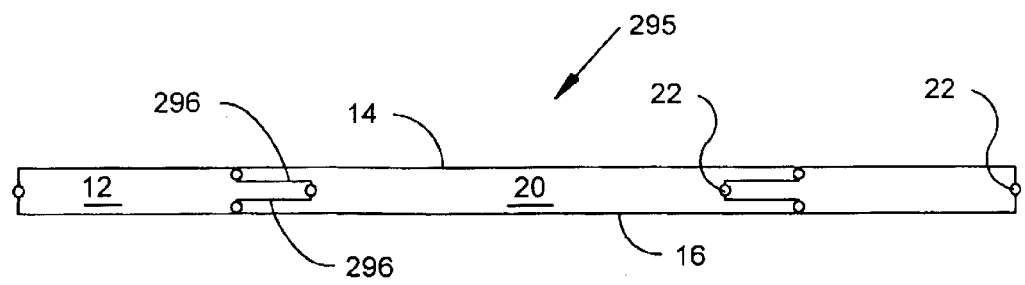
FIG. 49C is a schematic cross-sectional view of the FIG. 49A second species in a second subspecies flat pattern, wherein the outer layers of the support ring are extensions of the reflective membranes.

FIGS. 49A–C depict a second species 292 of the first embodiment device 10 modified to have an alternate toroid support structure 12 fabricated in a flat pattern from four sheets, two each of two different plastic materials, where the circles represent the seams or bonds 22. FIG. 49A depicts the inflated condition of two distinct subspecies, which are shown schematically in FIGS. 49B and 49C in a non-inflated, as-manufactured condition. In the first subspecies 293 of FIG. 49B, the toroid 12 is formed from two outer annular sheets 294 made of a high-strength, high-elastic-modulus material, such as Mylar®, and two inner annular sheets 296, which are positioned when flat inside the reflector chamber 20 (extending radially inboard from the perimeter of the reflective membranes 14, 16), and formed from a high-strain (i.e., high-strength, low-elastic-modulus) material, such as vinyl. As noted previously, low-elastic-modulus, high-strength materials have the ability to strain (i.e., stretch) sufficiently so as not to impede the full inflation of the toroid; however, such high-strain materials are required only for the inner portion of the toroid. The seams 22 attaching the outer and inner sheets 294, 296 of the toroid 12 are located at or near what will become circular lines of tangency between the parabolic reflective membranes 14, 16 and the toroidal support ring 12 upon inflation. Nominally sized, pre-formed circular reflective membranes 14, 16 are bonded to the toroid at or near the seams 22 attaching the inner and outer portions or the toroid. In the second subspecies 295 of FIG. 49C, the reflective membranes 14, 16 are enlarged in size to also form the outer part of the toroid 12, thereby reducing the total number of elements and bonds required to fabricate the device and, thus, facilitating manufacture as well as improving reliability.

The main benefits of this second species relative to the first species are improved stability and reduced weight. These benefits result from the use of lightweight, high-strength, high-modulus material, such as Mylar®, to fabricate the outer portion of the toroid. Note that within this second species, both the inner portion of the toroid and the inner part of the outer portion of the toroid are largely free of buckling when inflated and; thus, provide a smooth surface for supporting the reflective membranes. However, the rigidity of the toroid, although improved over the first species, is still limited due to use of the low-elastic-modulus material to form the inner portion of the toroid.

Figure 50A:
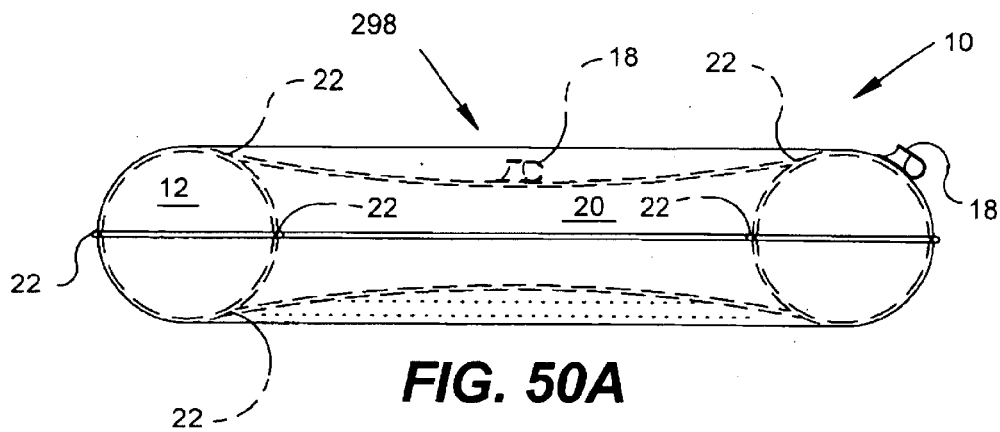
FIG. 50A is a schematic side elevational cross-sectional view of a third species of the first embodiment device in an inflated condition having an alternate support ring made in flat pattern from four annular sheets, all of which are preferably made of high-strength, high-elastic-modulus material, including two outer sheets and two nested inner sheets.
Figure 50B:
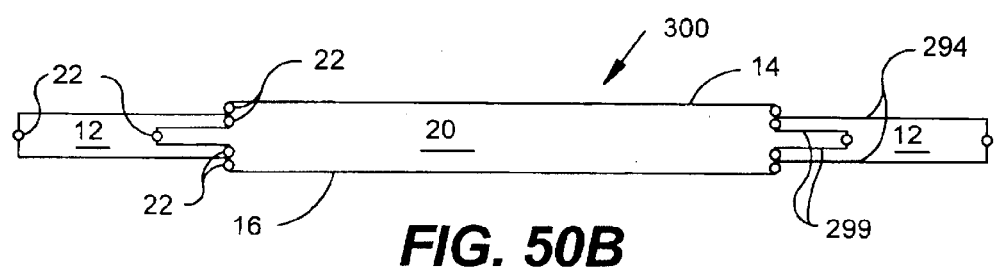
FIG. 50B is a schematic cross-sectional view of the FIG. 50A third species in a first subspecies flat pattern, wherein two separate pre-formed reflective membranes (shown flat) are bonded to the four-sheet support ring.
Figure 50C:
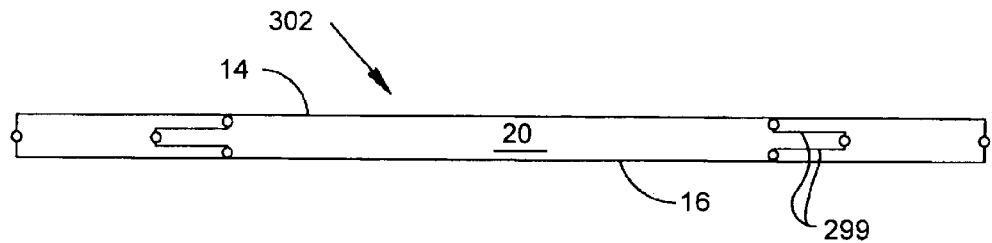
Figure 50D:
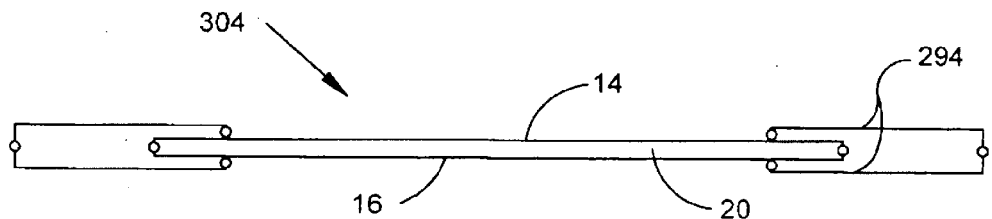
FIG. 50D is a schematic cross-sectional view of the FIG. 50A third species in a third subspecies flat pattern, wherein the inner nested layers of the support ring are extensions of the reflective membranes.

FIGS. 50A–D depict a third species 298 of the first embodiment device 10 employing an alternate toroid support ring 12 fabricated in a flat pattern from four sheets of a high-strength, high-elastic-modulus material where the circles represent the seams or bonds 22. FIG. 50A depicts the inflated condition of three distinct subspecies, which are shown schematically in FIGS. 50B–50D in a non-inflated, as-manufactured condition. In the first subspecies 300 of FIG. 50B, the toroid 12 is formed from two outer annular, sheets 294 and two inner annular sheets 299, which are positioned inside (i.e., nested between) the outer annular sheets 294 of the toroid 12 (extending radially outboard from the perimeter of the reflective membranes 14 and 16). All four annular sheets are made of a high-strength, high-elastic-modulus material such as Mylar®. Again, the seams 22 attaching the inner and outer sheets 299, 294 of the toroid 12 are located at or near what will become circular lines of tangency between the parabolic reflective membranes 14, 16 and the toroidal support ring 12 upon inflation. Nominally sized, pre-formed circular reflective membranes 14, 16 are bonded to the toroid 12 at or near the seams 22 attaching the inner and outer sheets 299, 294 to the toroid 12. In the second subspecies 302 of FIG. 50C, the reflective membranes 14, 16 are enlarged in size to also form the outer part of the toroid 12, thereby once again reducing the total number of elements and bonds required to fabricate the device. In the third subspecies 304 of FIG. 50D, the reflective membranes 14, 16 are enlarged in size (but not to the extent shown for the second subspecies of FIG. 50C) to now also form the inner part of the toroid 12.

The primary benefit of this third species relative to the first and second species is reduced weight, which results from the use of high-strength, high-modulus material, such as Mylar®, to fabricate both the inner and outer portions of the toroid. It should be noted that for this third species, only the portions of the toroid surrounding the reflective membranes are free of buckling upon inflation. Although this configuration can provide an adequately smooth surface for supporting the reflective membranes, potentially significant buckling occurs along the inner and outer portions of the toroid. Such buckling limits the rigidity of the toroid and can cause unintentional adverse rippling in the perimeter of the reflective membranes in certain geometric cases (due primarily to the buckling along the inner portion of the toroid), thus hindering performance. Another benefit of this configuration is that all membranes can be made from a single type of high-elastic-modulus material, thereby facilitating manufacturing.

Figure 51A:
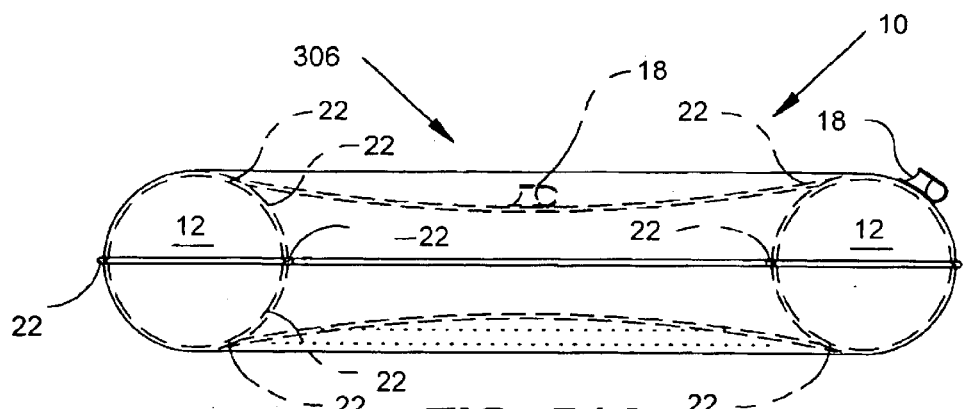
FIG. 51A is a schematic side elevational cross-sectional view of a fourth species of the first embodiment device in an inflated condition having an alternate support ring made in flat pattern from six annular sheets of preferably high-strength, high-elastic-modulus material including two outer, two middle, and two inner sheets.
Figure 51B:
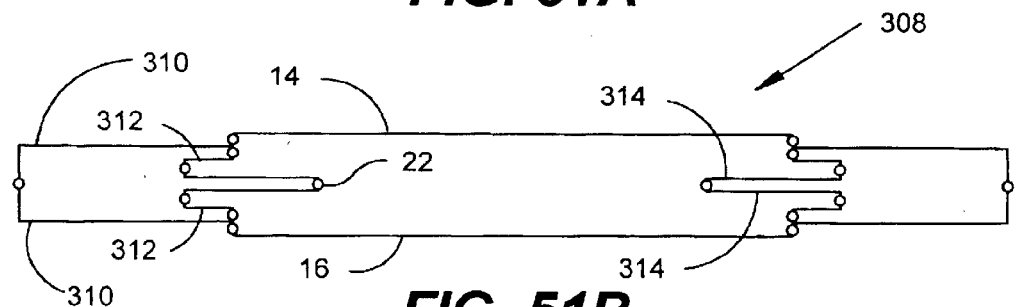
FIG. 51B is a schematic cross-sectional view of the FIG. 51A fourth species in a first subspecies flat pattern, wherein two separate pre-formed reflective membranes (shown flat) are bonded to the six-sheet support ring.
Figure 51C:
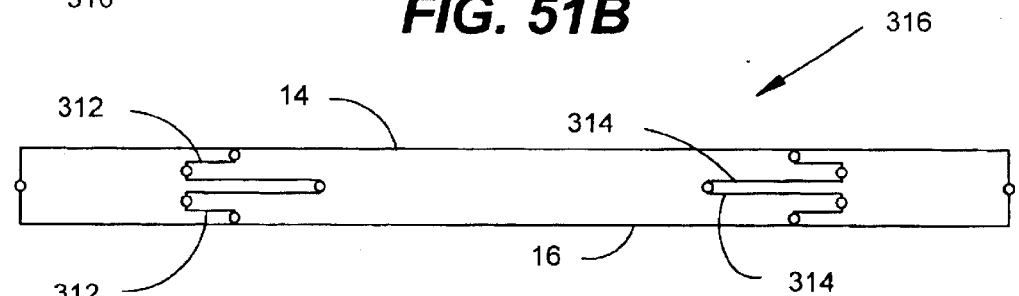
FIG. 51C is a schematic cross-sectional view of the FIG. 51A fourth species in a second subspecies flat pattern, wherein the outer layers of the support ring are extensions of the reflective membranes.
Figure 51D:
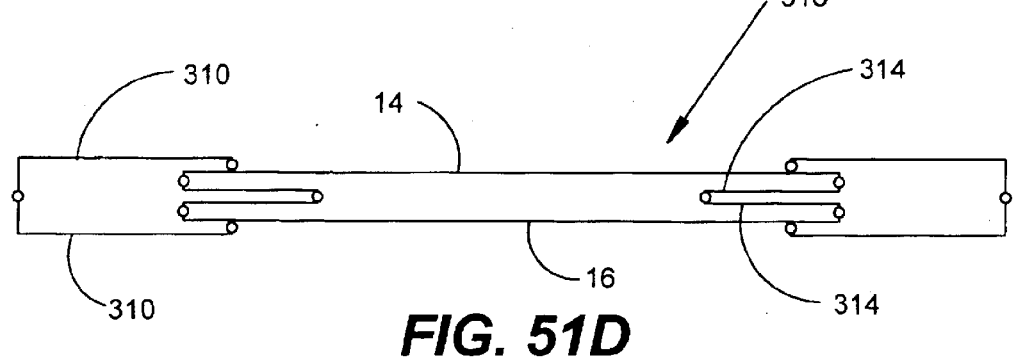
FIG. 51D is a schematic cross-sectional view of the FIG. 51A fourth species in a third subspecies flat pattern, wherein the middle layers of the support ring are extensions of the reflective membranes.

FIGS. 51A–D depict a fourth species 306 of the first embodiment device 10 employing an alternate toroidal support structure 12 fabricated in a flat pattern from six sheets of high-strength, high-elastic-modulus material where the circles represent the seams or bonds 22. FIG. 51A depicts the inflated condition of three distinct subspecies, which are shown schematically in FIGS. 51B–51D in a non-inflated, as-manufactured condition. In the first subspecies 308 of FIG. 51B, the toroid 12 is formed from two outer annular sheets 310, two middle annular sheets 312, and two inner annular sheets 314, all of which are made of a high-strength, high-elastic-modulus material, such as Mylar®. The seams 22 attaching the middle and outer sheets 312, 310 of the toroid 12 are located at or near what will become circular lines of tangency between the parabolic reflective membranes 14, 16 and the toroidal support ring 12 upon inflation. Nominally sized, pre-formed circular reflective membranes 14, 16 are bonded to the toroid 12 at or near the seams 22 attaching the middle and outer sheets 312, 310 of the toroid 12. In the second subspecies 316 of FIG. 51C, the reflective membranes 14, 16 are enlarged in diameter to also form the outer part of the toroid 12. In the third subspecies 318 of FIG. 51D, the reflective membranes 14, 16 are enlarged in size to also form the middle part of the toroid 12.

The primary benefit of this fourth species is reduced buckling of the inner portion of the toroidal support ring relative to the third species, thereby resulting in greater stability and improved performance. Note that within this fourth species, the inner edge of the toroid as well as the portions of the toroid surrounding the reflective membranes are free of buckling upon inflation and, thus, yield a smoother and more stable structure. Significant buckling now occurs only along the outer portions of the toroid. Although such buckling along the outer portions of the toroid has a more limited effect on the shape of the reflective membranes than buckling along the inner edge, buckling along the outer portions can still prove detrimental in certain geometric cases. Another benefit of this fourth species is a further reduction in weight relative to the first, second, and third species.

Figure 52A:
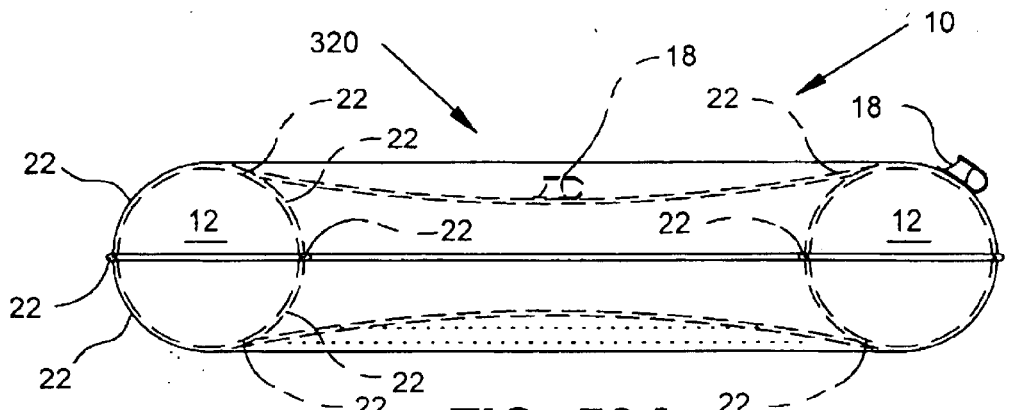
FIG. 52A is a schematic side elevational cross-sectional view of a fifth species of the first embodiment device in an inflated condition having an alternate support ring made in flat pattern from eight annular sheets of preferably high-strength, high-elastic-modulus material including two outer, two nested outer, two middle, and two inner sheets.
Figure 52B:
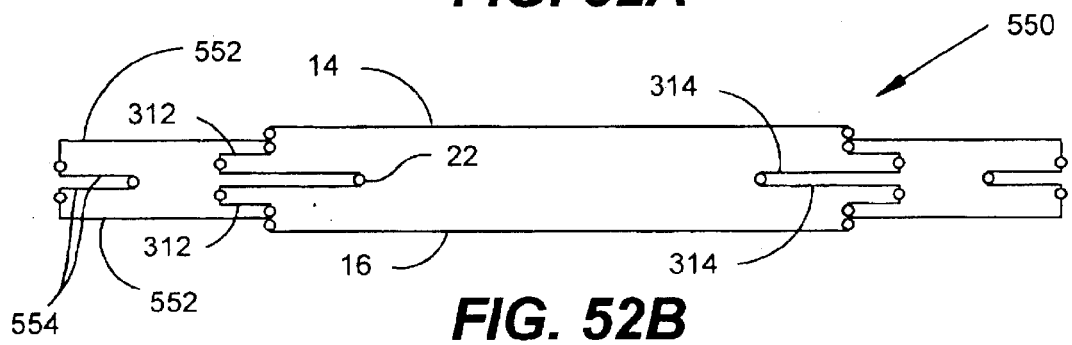
FIG. 52B is a schematic cross-sectional view of the FIG. 52A fifth species in a first subspecies flat pattern, wherein two separate pre-formed reflective membranes (shown flat) are bonded to the eight-sheet support ring.
Figure 52C:
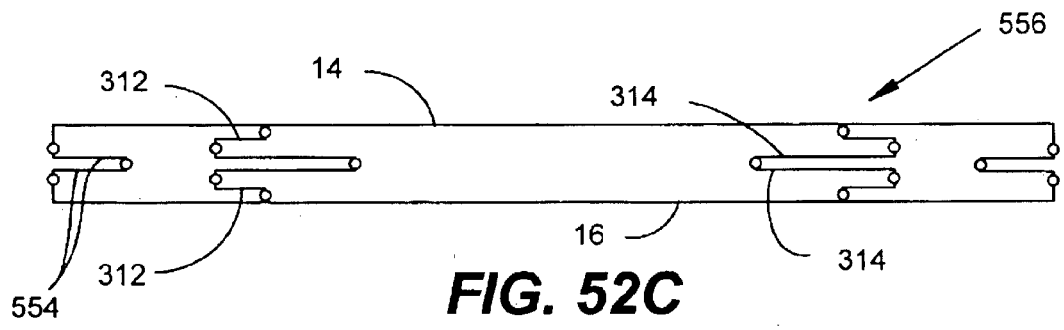
FIG. 52C is a schematic cross-sectional view of the FIG. 52A fifth species in a second subspecies flat pattern, wherein the outer layers of the support ring are extensions of the reflective membranes.
Figure 52D:
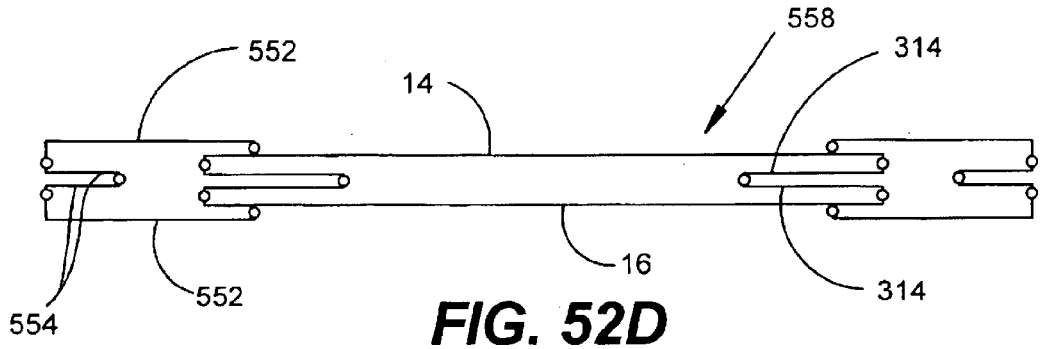
FIG. 52D is a schematic cross-sectional view of the FIG. 52A fifth species in a third subspecies flat pattern, wherein the middle layers of the support ring are extensions of the reflective membranes.

FIGS. 52A–D depict a fifth species 320 of the first embodiment device 10 employing an alternate toroidal support ring 12 fabricated in a flat pattern from eight sheets of high-strength, high-elastic-modulus material where the circles represent the seams or bonds 22. FIG. 52A depicts the inflated condition of three distinct subspecies, which are shown schematically in FIGS. 52B–52D in a non-inflated, as-manufactured condition. In the first subspecies 550 of FIG. 52B, the toroid 12 is formed from two outer annular sheets 552, two nested outer annular sheets 554, two middle annular sheets 312, and two inner annular sheets 314, all of which are made of a high-strength, high-elastic-modulus material, such as Mylar®. Again, seams 22 attaching the middle and outer sheets 312, 552 of the toroid 12 are located at or near what will become circular lines of tangency between the parabolic reflective membranes 14, 16 and the toroid 12 upon inflation. Nominally sized, pre-formed circular reflective membranes 14, 16 are bonded to the toroid 12 at or near the seams 22 attaching the middle and outer sheets 312, 552 of the toroid 12. In the second subspecies 556 of FIG. 52C, the reflective membranes 14, 16 are enlarged in diameter to also form the outer part of the toroid 12. In the third subspecies 558 of FIG. 52D, the reflective membranes 14, 16 are enlarged in size to also form the middle part of the toroid 12. It should be noted that such nested outer sheets may also be incorporated into any of the previously described flat pattern species to reduce buckling in the outer portion of the toroid.

The primary benefit of this fifth species is reduced buckling of the outer portion of the support ring relative to all previous flat pattern species, thereby further enhancing stability and performance. Note that within this fifth species, the inner and outer edge of the toroid as well as the portions of the toroid surrounding the reflective membranes are free of buckling upon inflation and, thus, yield a very smooth and stable structure. No significant buckling occurs in any critical portion of the toroid, thus providing a nearly ideal support for the reflective membranes. Another benefit of this fifth species is a further reduction in weight, thus yielding the lowest weight of any of the five species manufactured from flat patterns of material.

Figure 53A:
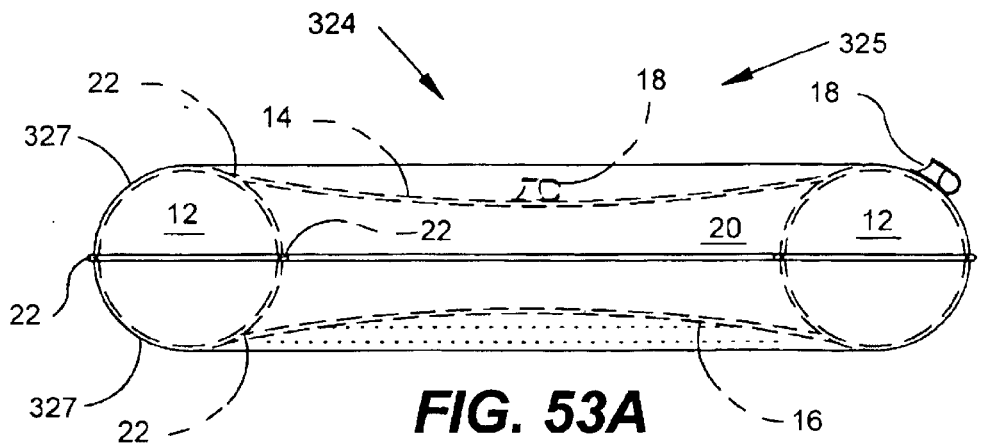
FIG. 53A is a schematic elevational cross-sectional view of a sixth species of the first embodiment device in an inflated condition having an alternate support ring made from two fully or partially pre-formed sheets.
Figure 53B:
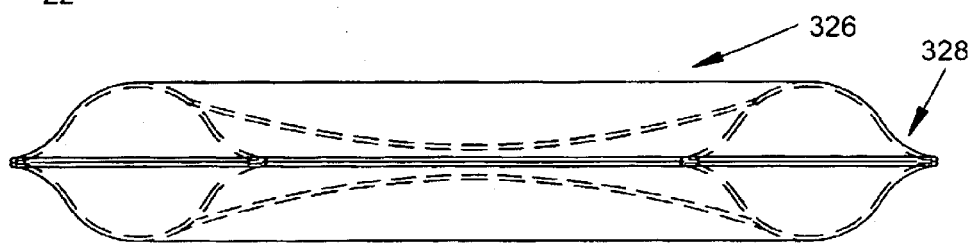
FIG. 53B is a schematic elevational cross-sectional view of the FIG. 53A sixth species in a second subspecies as-manufactured configuration, wherein the support ring is made from two uniformly partially pre-formed sheets, which are shown in their as-manufactured shape.
Figure 53C:
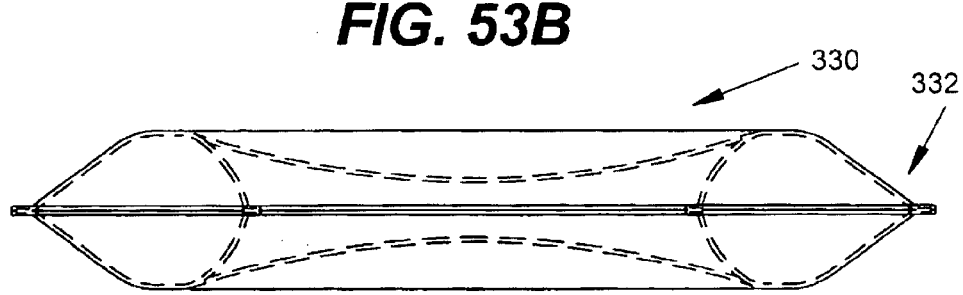
FIG. 53C is a schematic elevational cross-sectional view of the FIG. 53A sixth species in a third subspecies as-manufactured configuration, wherein the support ring is made from biased or non-uniformly pre-formed sheets such that the inner portion is fully pre-formed and the outer portion is only partially pre-formed.
Figure 53D:
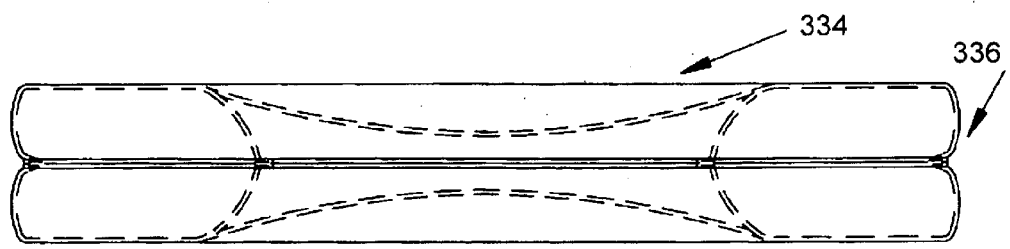
FIG. 53D is a schematic elevational cross-sectional view of the FIG. 53A sixth species in a fourth subspecies as-manufactured configuration, wherein the support ring is made from locally pre-formed sheets such that only the inner portion is pre-formed.

FIGS. 53A–D depict a sixth species 324 of the first main embodiment device 10 employing an alternate toroid 12 made from fully or partially pre-formed sheets of thermally or otherwise formable, high-strength, high-elastic-modulus material where the circles represent seams or bonds 22. FIG. 53A depicts the inflated condition of four distinct subspecies, of which the latter three are shown in FIGS. 53B–53D in a partially inflated, as-manufactured, pre-formed condition. In the first subspecies 325 of FIG. 53A, the toroid 12 is formed from two fully pre-formed sheets 327, each substantially having the shape of a half toroid, which are bonded at the inner and outer edges. It should be noted that the fully pre-formed, as-manufactured shape of this first subspecies is generally indistinguishable from its pressurized (i.e., inflated) shape, thereby completely eliminating any adverse buckling and, thus, providing an ideal support for the reflective membranes 14, 16. Nominally sized reflective membranes 14, 16 are bonded to the toroid 12 generally at or near the circular lines of tangency between the parabolic reflective membranes 14, 16 and the toroidal support ring 12. In the second subspecies 326 of FIG. 53B, the toroid 12 is formed from two partially pre-formed sheets 328. Such partial pre-forming can allow a toroid fabricated from two sheets of material having limited elastic strain capability to fully inflate without significant buckling. It should be noted that partial pre-forming is also of value when fabricating devices from low-strain materials having limited formability, i.e., materials which cannot be fully pre-formed, thermally or otherwise. In the third subspecies 330 of FIG. 53C, the toroid 12 is formed from two partially pre-formed sheets 332, each having an inner portion fully pre-formed into the shape of the inner portion of the toroid 12, and an outer portion formed into the shape of a cone. Although similar to the second subspecies 326 above, this third subspecies eliminates all buckling along the inner portion of the toroid, but only moderately reduces buckling in the outer portion of the toroid. In the fourth subspecies 334 of FIG. 53D, the toroid 12 is formed from two partially pre-formed sheets 336, each having an inner portion fully pre-formed into the shape of the inner portion of the toroid 12, and a non-pre-formed or flattened external end. This configuration eliminates all buckling along the inner portion of the toroid but does not mitigate buckling in the outer portion of the toroid.

FIGS. 54A–L depict a seventh species 337 of the first embodiment device 10 employing an alternate toroid 12 having various three-dimensional alternate constructions made preferably from high-strength, high-elastic-modulus materials. In FIGS. 54A–L, twelve distinct subspecies are schematically shown in a partially inflated, as-manufactured condition, where the small rectangular bars represent seams or bonds 22. The three-dimensional constructions of this seventh species provide methods of producing very lightweight toroidal support structures that are also largely, if not completely, free of adverse buckling, but without need to plastically pre-form (thermally or otherwise) any of the sheets comprising the toroid. Thus, this seventh species is ideally suited for producing highly optimized devices from high-performance, non-formable materials. However, any suitably flexible materials may be used within these three-dimensional constructions. It should be noted that within these schematic representations, horizontal lines indicate annular sheets, vertical lines indicate cylindrical sheets, and inclined lines represent conical sheets.

Figure 54A:
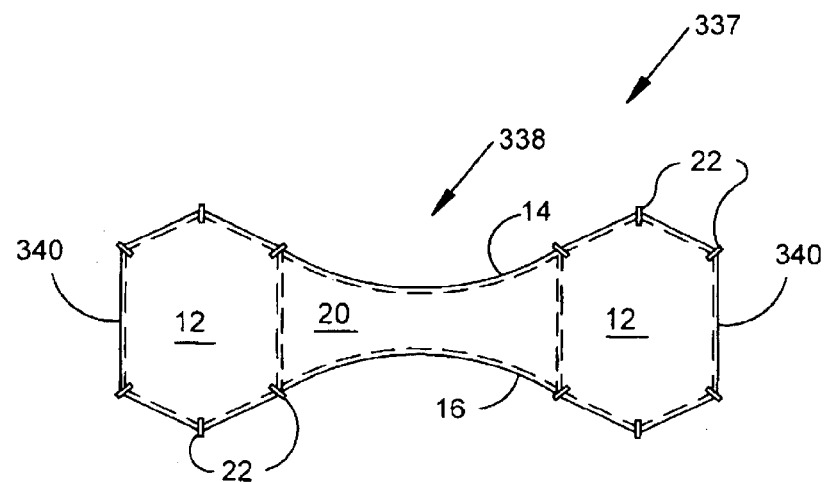
FIG. 54A is a schematic cross-sectional view of a seventh species, first subspecies, of the first embodiment device in an as-manufactured condition, wherein the seventh species represents devices having an alternate support ring fabricated in a three-dimensional layout pattern, and the first subspecies is a device with a support ring made from six sheets forming, in cross-section, a vertically oriented hexagon.

FIG. 54A is a first subspecies 338 illustrating the three-dimensional alternate construction of the first main embodiment device 10 with eight sheets, six of which form the toroidal support ring 12 having a vertically oriented hexagonal cross-section 340. Within this and the following subspecies, two nominally sized reflective membranes 14, 16 are bonded to the toroid 12 generally at or near what will become circular lines of tangency between the parabolic reflective membranes 14, 16 and the toroidal support ring 12 upon inflation.

Figure 54B:
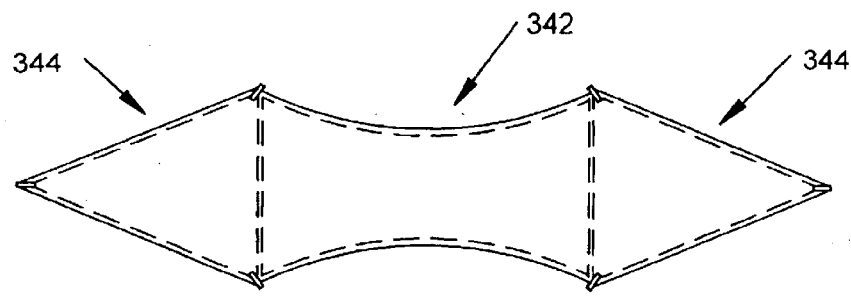
FIG. 54B is a schematic cross-sectional view of a second subspecies of the seventh (three-dimensional) species with a support ring made from three sheets forming, in cross-section, an outwardly pointing triangle.

FIG. 54B is a second subspecies 342 illustrating the three-dimensional alternate construction of the first embodiment device 10 with five sheets, three of which form a support ring 12 having an outwardly pointing triangular cross-section 344.

Figure 54C:
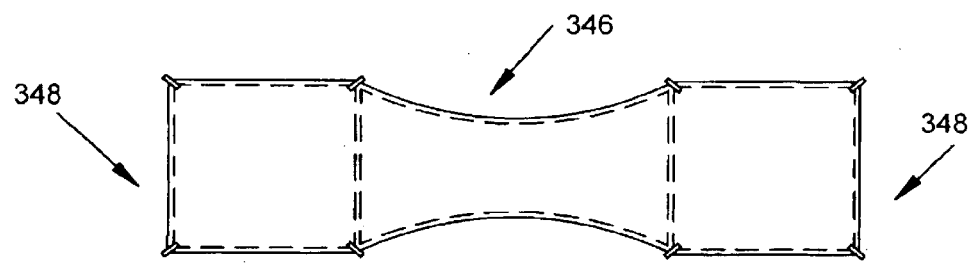
FIG. 54C is a schematic cross-sectional view of a third subspecies of the seventh (three-dimensional) species with a support ring made from four sheets forming, in cross-section, a rectangle.

FIG. 54C is a third subspecies 346 illustrating the three-dimensional alternate construction of the first embodiment device 10 with six sheets, four of which form a support ring 12 with a square or rectangular cross-section 348.

Figure 54D:
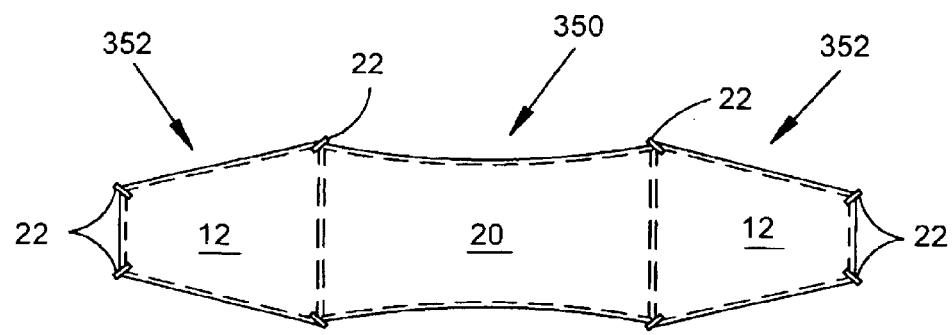
FIG. 54D is a schematic cross-sectional view of a fourth subspecies of the seventh (three-dimensional) species with a support ring made from four sheets forming, in cross-section, a trapezoid.

FIG. 54D is a fourth subspecies 350 illustrating the three-dimensional alternate construction of the first embodiment device 10 with six sheets, four of which form a support ring 12 having a trapezoidal cross-section 352 with equal length inclined top and bottom sides, and an external side vertical and parallel to a longer internal side.

Figure 54E:
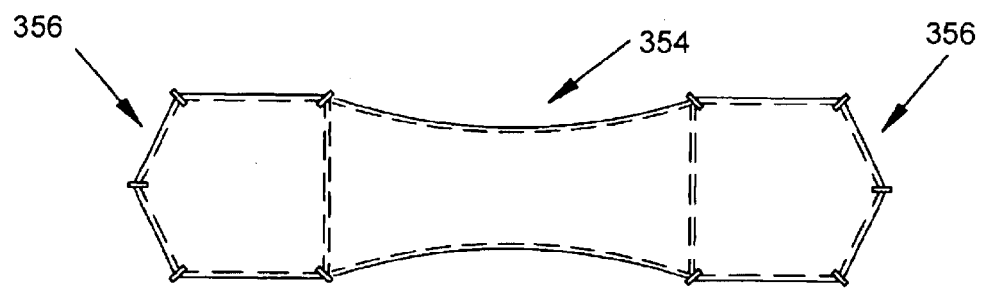
FIG. 54E is a schematic cross-sectional view of a fifth subspecies of the seventh (three-dimensional) species with a support ring made from five sheets forming, in cross-section, an outwardly pointing pentagon.

FIG. 54E is a fifth subspecies 354 illustrating the three-dimensional alternate construction of the first embodiment device 10 with seven sheets, five of which form a support ring 12 having an outwardly pointing pentagonal cross-section 356 with two equal length inclined outside sheets attached to two horizontal and parallel sheets which are attached to a vertical inner sheet.

Figure 54F:
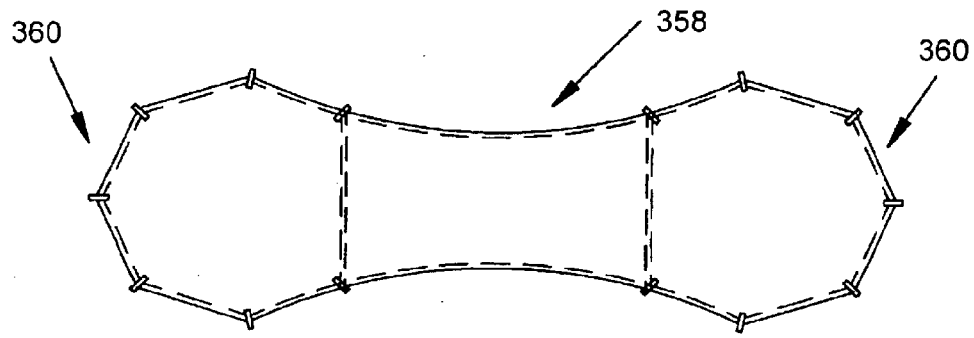
FIG. 54F is a schematic cross-sectional view of a sixth subspecies of the seventh (three-dimensional) species with a support ring made from seven sheets forming, in cross-section, an outwardly pointing heptagon.

FIG. 54F is a sixth subspecies 358 illustrating the three-dimensional alternate construction of the first embodiment device 10 with nine sheets, seven of which form a support ring 12 with an outwardly pointing heptagonal cross-section 360.

Figure 54G:
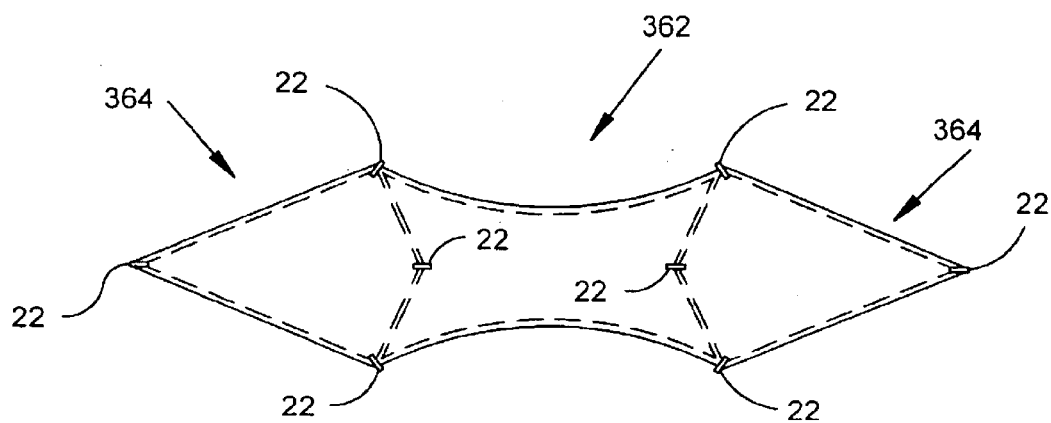
FIG. 54G is a schematic cross-sectional view of a seventh subspecies of the seventh (three-dimensional) species with a support ring made from four sheets forming, in cross-section, an asymmetrical diamond.

FIG. 54G is a seventh subspecies 362 illustrating the three-dimensional alternate construction of the first embodiment device 10 with six sheets, four of which form a support ring 12 having a four-sided polygonal (outwardly skewed diamond-shaped) cross-section 364.

Figure 54H:
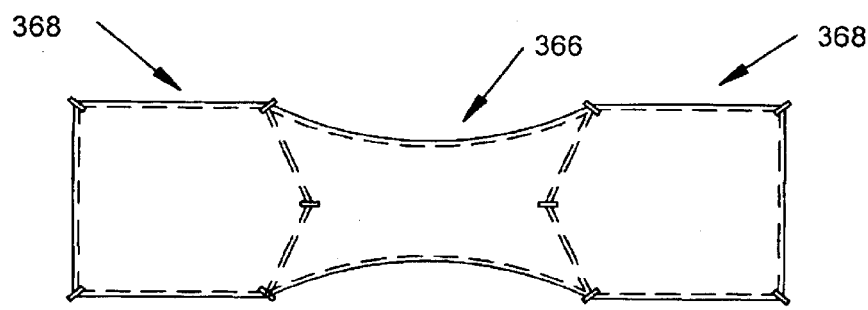
FIG. 54H is a schematic cross-sectional view of an eighth subspecies of the seventh (three-dimensional) species with a support ring made from five sheets forming, in cross-section, an inwardly pointing pentagon.

FIG. 54H is an eighth subspecies 366 illustrating the three-dimensional alternate construction of the first embodiment device 10 having seven sheets, five of which form a support ring 12 having an inwardly pointing pentagonal cross-section 368 with the inside portion being triangular and the outside sheet being perpendicular to the horizontal and parallel top and bottom sheets.

Figure 54I:
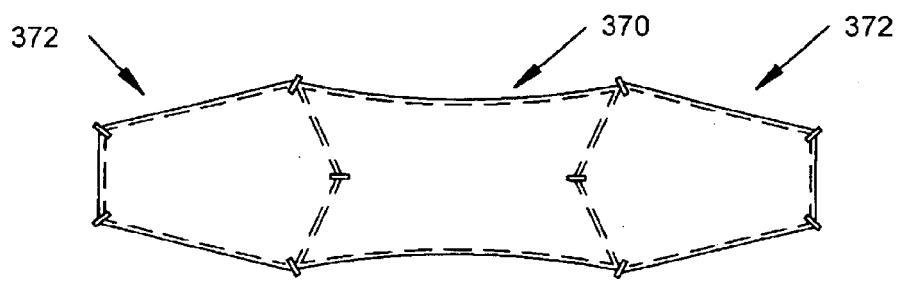
FIG. 54I is a schematic cross-sectional view of a ninth subspecies of the seventh (three-dimensional) species with a support ring made from five sheets forming, in cross-section, an inwardly pointing, outwardly tapered pentagon.

FIG. 54I is a ninth subspecies 370 illustrating the three-dimensional alternate construction of the first embodiment device 10 having seven sheets, five of which form a support ring 12 having an inwardly pointing, outwardly tapered pentagonal cross-section 372 with the upper and lower sheets inclined to connect to a short vertical outside sheet and to two inner inclined sheets.

Figure 54J:
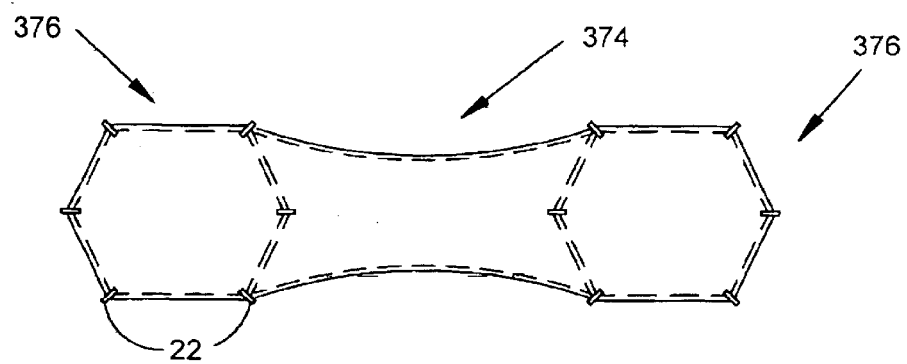
FIG. 54J is a schematic cross-sectional view of a tenth subspecies of the seventh (three-dimensional) species with a support ring made from six sheets forming, in cross-section, a horizontally oriented hexagon.

FIG. 54J is a tenth subspecies 374 illustrating the three-dimensional alternate construction of the first embodiment device 10 having eight sheets, six of which form a support ring 12 having a horizontally oriented hexagonal cross-section 376 with, optionally, equal sides.

Figure 54K:
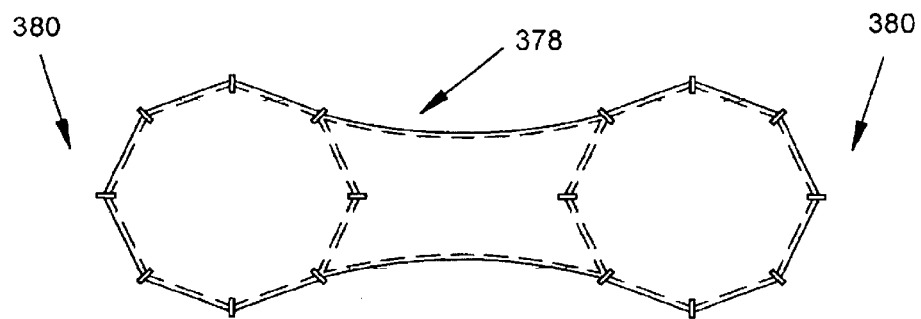
FIG. 54K is a schematic cross-sectional view of an eleventh subspecies of the seventh (three-dimensional) species with a support ring made from eight sheets forming, in cross-section, a rotated octagon.

FIG. 54K is an eleventh subspecies 378 illustrating the three-dimensional alternate construction of the first embodiment device 10 having ten sheets, eight of which form a support ring 12 having a rotated octagonal cross-section 380 with the diametrically opposed outside and inside sheets forming a point.

Figure 54L:
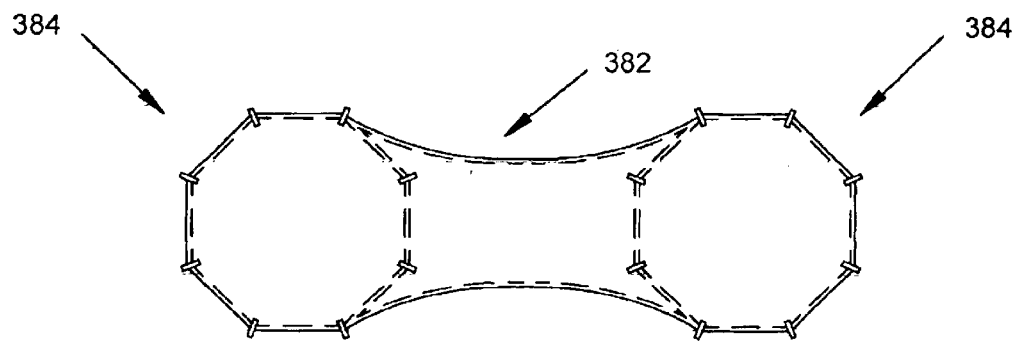
FIG. 54L is a schematic cross-sectional view of a twelfth subspecies of the seventh (three-dimensional) species with a support ring made from eight sheets forming, in cross-section, a normally oriented octagon.

FIG. 54L is a twelfth subspecies 382 illustrating the three-dimensional alternate construction of the first embodiment device 10 having ten sheets, eight of which form a support ring 12 having a normally oriented octagonal cross-section 384 with the diametrically opposed outside and inside sheets being vertical and parallel.

Figure 55:
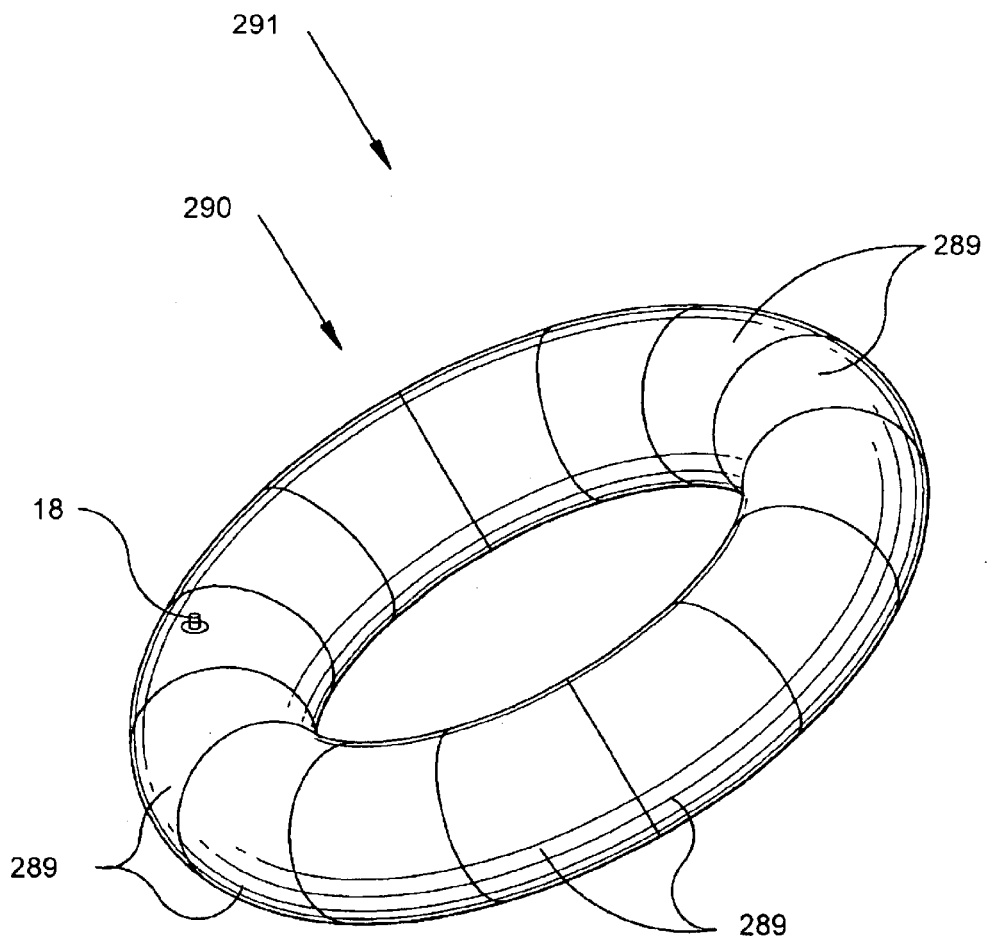
FIG. 55 is a schematic perspective view of an eighth species of the first embodiment device in an inflated condition having an alternate support ring made from tapered gores which are heat-welded or adhesively bonded together. The reflective membranes have been omitted from the figure for clarity.

FIG. 55 shows an eighth species 291 of the first embodiment device 10 incorporating an alternate toroid 290 made from a plurality of gores (i.e., segments of material) 289, which are generally heat-welded or adhesively bonded together. The central reflective membranes are omitted from the figure for clarity. The reflective membranes may also be made from multiple gores. Fabricating the device from multiple gores facilitates the production of devices which are larger and/or more structurally stable. Such fabrication methods also allow the device to be formed from less flexible and/or non-formable membrane materials. Note that this fabrication method also allows deeply pre-formed reflective membranes to be produced with little or no thermal forming, a process which can damage the reflective coating.

FIG. 56 shows a ninth species 560 of the first main embodiment having two reflective outer membranes 14, 16 and a non-reflective inner-disposed membrane 15 serving to form a redundant reflector chamber 20. It is noted that the inner-disposed membrane 15 may only be incorporated into devices having one of the alternate toroidal support ring configurations for which the inner edge of the toroid 12 does not move appreciably upon inflation (otherwise, the inner-disposed membrane 15 may restrict full inflation of the toroid 12).

Figure 57:
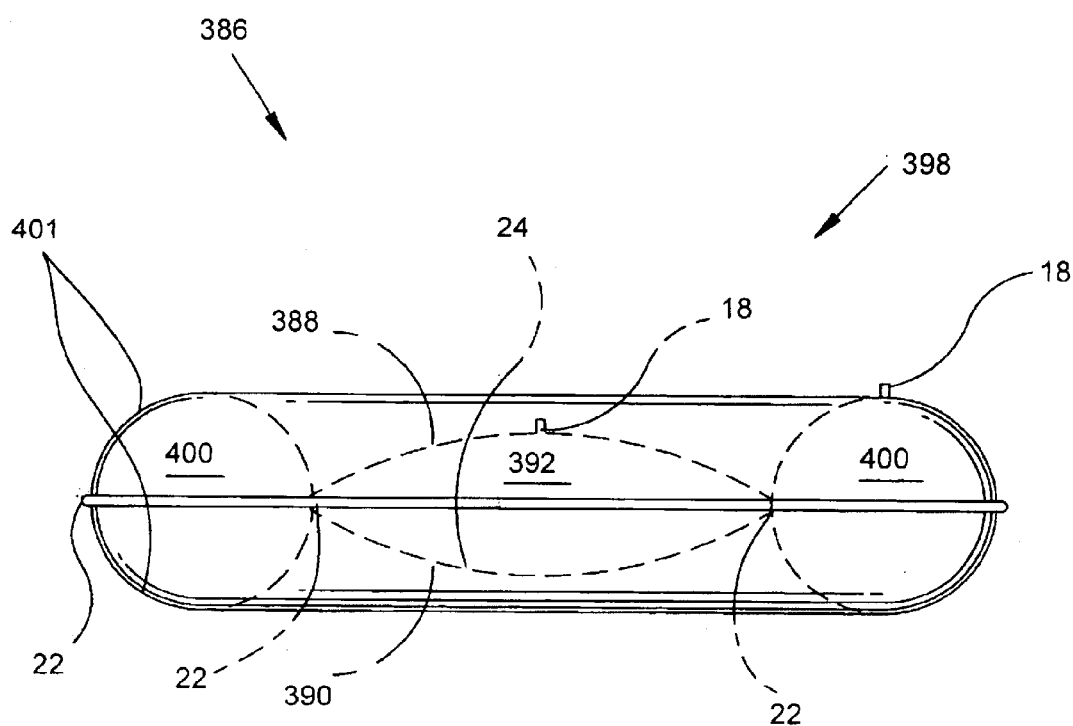
FIG. 57 is a schematic side elevational cross-sectional view of the first species of the super-ambient second embodiment device having an inflatable support ring to which two central pressure-deformable membranes are bonded including one lower reflective membrane and one upper transparent membrane.
Figure 58A:
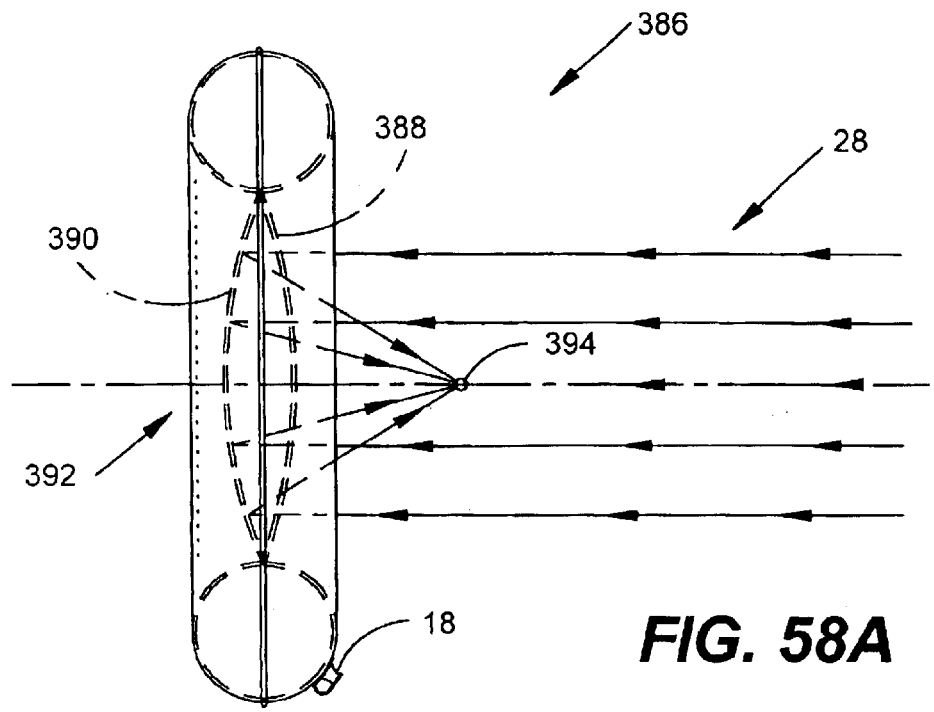
FIG. 58A is a schematic elevational cross-sectional view of the super-ambient second main embodiment in ray concentrating mode.
Figure 58B:
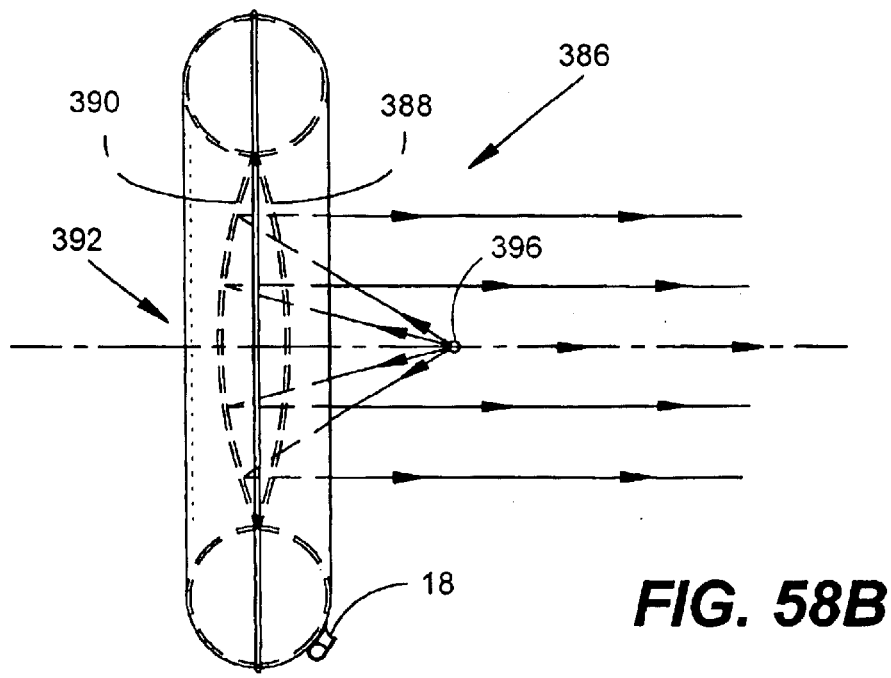
FIG. 58B is a schematic elevational cross-sectional view of the super-ambient second main embodiment in ray projecting mode.
Figure 59:
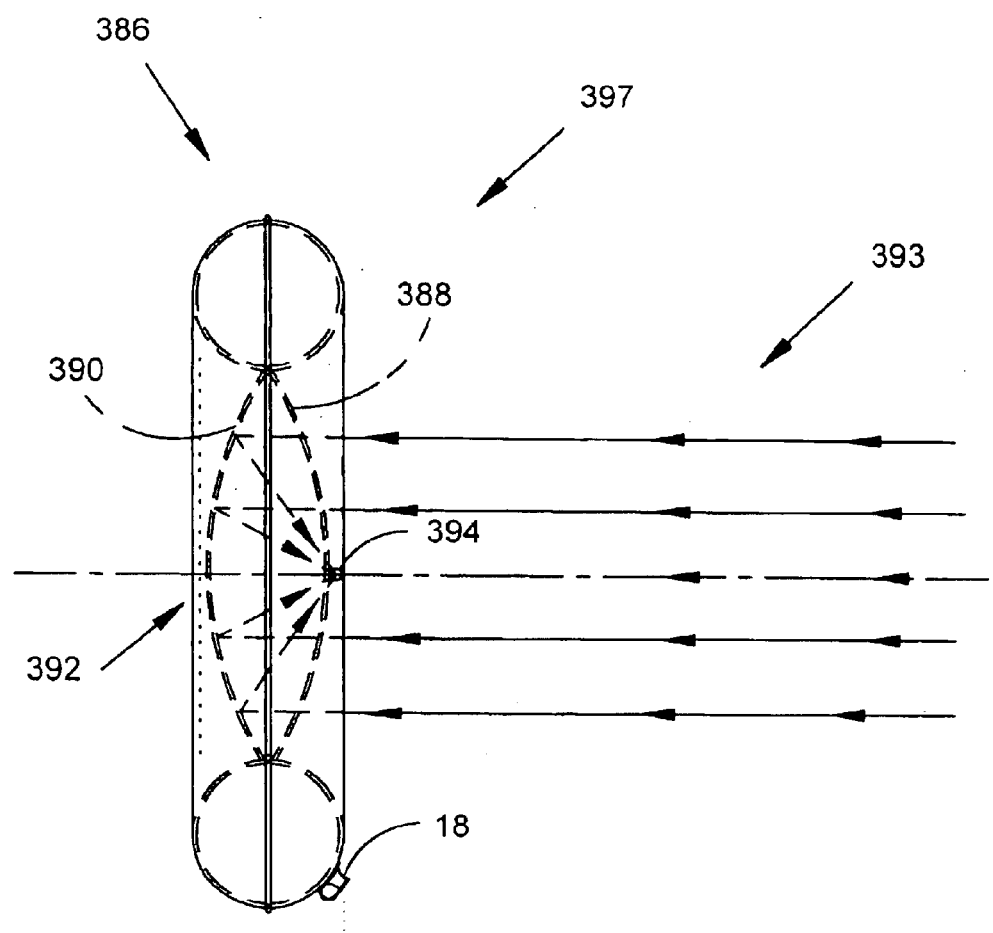
FIG. 59 is a schematic elevational cross-sectional view of the second embodiment device utilized as part of a high-gain antenna apparatus to enhance radio communications.

FIGS. 57–59—Description and Operation of Second Main Embodiment

In FIG. 57, the second main embodiment device 386 is illustrated as an inflated toroid or support ring 400 supporting an upper elastic transparent membrane 388 and a lower elastic reflective membrane 390. The transparent membrane 388 and reflective membrane 390 provide a central reflector chamber (i.e., pressure envelope) 392 with a double parabolic convex-convex lens configuration when inflated to a super-ambient pressure. The transparent membrane 388 has a centered inflation valve 18 for inflating the reflector chamber 392; however, it is noted that the inflation valve 18 may alternatively be located at any other useful location such as in the reflective membrane 390. The inflatable toroidal support ring 400 also has a valve 18 for inflation to form a rigid ring. Two valves are shown for separate inflation of the support ring 400 and the reflector chamber 392; however, it is noted that the two pressure envelopes (the toroid 400 and the reflector chamber 392) can be interconnected, thereby allowing both super-ambient pressure envelopes to be inflated with a single valve 18.

The toroidal support ring 400 is fabricated from two thin sheets 401 of material, each of which is fully pre-formed into the shape of a half toroid and adhesively or thermally bonded to each other along continuous seams 22 at their inner and outer periphery, as one example of forming the toroid. The two sheets 401 comprising the toroid 400 are made of a flexible, high-strength material capable of being thermally or otherwise pre-formed, such as vinyl.

The transparent membrane 388 is made from a thin circular sheet of transparent, high-strength, flexible material such as Mylar®. The reflective membrane 390 is also made from a thin circular sheet of high-strength, flexible material such as Mylar®; however, a reflective surface 24 is provided by coating the inner side (preferred, but not necessary if the uncoated membrane material is otherwise transparent) of the membrane 390 with vapor deposited aluminum and the like reflective material. The reflective membrane 390 is pre-formed during fabrication substantially into the shape of a paraboloid to provide a substantially fixed, short focal length for safety purposes, and to reduce the differential pressure required to fully deform and smooth the reflective membranes 390 to facilitate deployment. The transparent membrane 388 is optionally also pre-formed, primarily to reduce loads imparted on the support ring; however, the transparent membrane 388 also can be pre-formed for other purposes, such as to facilitate supporting an accessory element in close proximity to the focal point as will be shown below. However, the transparent membrane need not be pre-formed (or it can be pre-formed to a different extent than the reflective membrane), thus yielding an asymmetrical reflector chamber. Seams 22 are shown for adhesively or thermally bonding the outer periphery Of the transparent and reflective membranes 388, 390 to the inner edge of the toroid 400. This basic, four-sheet, fully pre-formed construction represents a first species 398 of the second main embodiment device 386.

Similar to the first embodiment, it should be noted that several alternate toroid, central membrane, and valve configurations can be incorporated (i.e., substituted) into the basic second embodiment device as described above. In addition to having alternate plan forms, the simple two-sheet toroidal support ring 400 as described above may be replaced with alternate support rings offering greater performance and/or stability, but generally at the expense of somewhat greater complexity. However, such alternate support ring configurations for the second embodiment are limited to those particular configurations wherein the portion of the support ring to which the reflector chamber is bonded does not move appreciably in the radial direction upon inflation. Otherwise, either the reflector chamber will generally restrict proper inflation of the toroid resulting in a buckled ring structure, or the inflated ring will not properly tension the perimeter of the reflective membrane. Numerous alternate membrane configurations can be incorporated (i.e., substituted) into the basic second embodiment device as described above including membranes having any of the alternate shapes, functional characteristics, optical properties, constructions, and materials as noted for the first embodiment. The many optional valves available for the first embodiment are also available for the second embodiment.

FIG. 58A depicts the second main embodiment 386 in an electromagnetic radiant ray concentrating mode having the transparent membrane 388 facing the sun (not shown). The radiant solar rays 28 are illustrated as passing through the transparent membrane 388 to the reflective membrane 390, which then reflects the rays back through the transparent membrane 388 to focus on an energy-absorbing object 394 placed at the focal point of the device 386. Although the figure shows the focal point to be outside of the reflector chamber, it should be noted that the reflective and transparent membranes can each be pre-formed or otherwise deformed to any predetermined shape or extent (e.g., deeply pre-formed, moderately pre-formed, non-pre-formed, etc.) such that the focal point alternatively is located inside the reflective chamber, or at the surface of the transparent membrane. However, the reader is cautioned that the latter case should be restricted to low-power applications to prevent the possibility of thermally or otherwise damaging the transparent membrane and/or any integral or removable elements attached to the surface of the transparent membrane at or near the focal point.

FIG. 58B depicts a second main embodiment 386 in a radiant ray projecting mode with the same reflector structure 392, but projecting the electromagnetic rays from a non-collimated light source 396 such as a light bulb, flashlight, or lamp placed at the focal point to a distant object. It should be noted that the selection of the concentrating or projection mode depends on the position of the light source relative to the focal point.

FIG. 59 illustrates the use of the second embodiment device 386 as part of a radio communications apparatus 397. Similar to the first embodiment apparatuses of FIGS. 29 and 30, an electromagnetic accessory device 394, such as an antenna, may be mounted in an optional socket centered in the frontal transparent membrane 388 for receiving concentrated radio frequency (RF) radiation 393. It is noted that this apparatus may also be used to transmit radio communications, or serve many of the other applications as shown hereinabove for the first embodiment device. It should also be noted that this super-ambient second-embodiment apparatus, like the first embodiment when operated in super-ambient mode, is highly amenable to use in the vacuum of outer space, where it may prove especially valuable as part of a low-mass solar energy concentrator, communications apparatus, and/or radio telescope.

FIGS. 60–64—Alternate Configurations of the Second Embodiment

Figure 60:
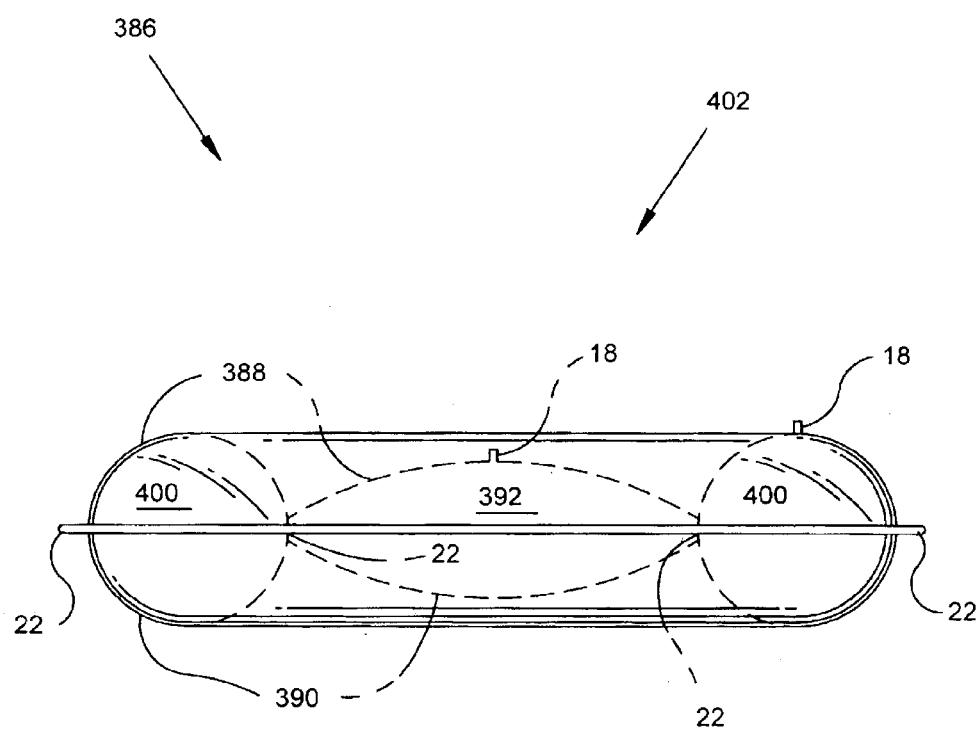
FIG. 60 is a schematic side elevational cross-sectional view of a second species of the second main embodiment device constructed entirely from one upper transparent membrane, one lower reflective membrane, and two valves.

FIG. 60 depicts a second species 402 of the second main (super-ambient) embodiment 386 for which the entire device is made from only two sheets of material and two valves. A fully pre-formed upper transparent membrane 388 and a fully pre-formed lower reflective membrane 390 are attached and sealed at the inner and outer periphery of the support ring 400 to form both the reflector chamber 392 and the support ring 400. Two valves 18 are shown for separate inflation of the reflector chamber 392 and the support ring 400. It is noted that the fewer the pieces required translates into a lower cost to produce.

Figure 61:
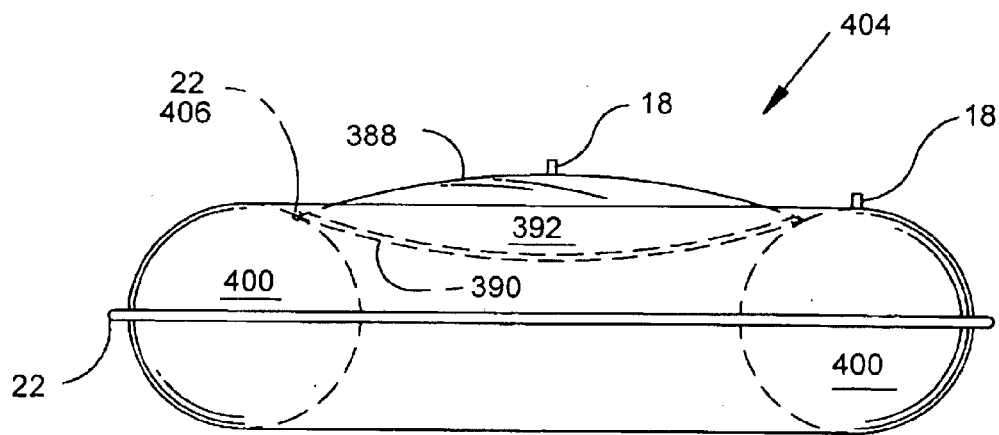
FIG. 61 is a schematic side elevational cross-sectional view of a third species of the second main embodiment having an offset reflector chamber.

FIG. 61 depicts a third species 404 of the second main (super-ambient) embodiment 386 made from four sheets as in the first species 398, but with an offset attachment 406 of the super-ambient reflector chamber 392 relative to the support ring 400 to enlarge the reflector 390 facing the radiant source.

Figure 62:
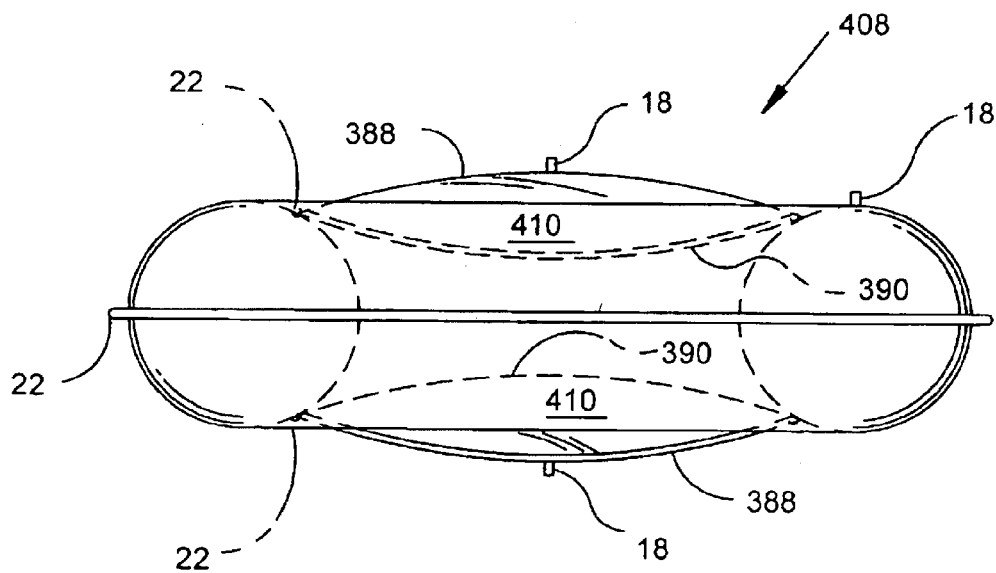
FIG. 62 is a schematic side elevational cross-sectional view of a fourth species of the second main embodiment having redundant offset reflector chambers.

FIG. 62 depicts a fourth species 408 of the second main embodiment 386 having two independent super-ambient reflector chambers 410 with the reflective membranes 390 of each chamber located in the interior. The bottom reflector chamber 410 is considered a redundant chamber, which would be useful in the event of impairment of the upper chamber.

Figure 63:
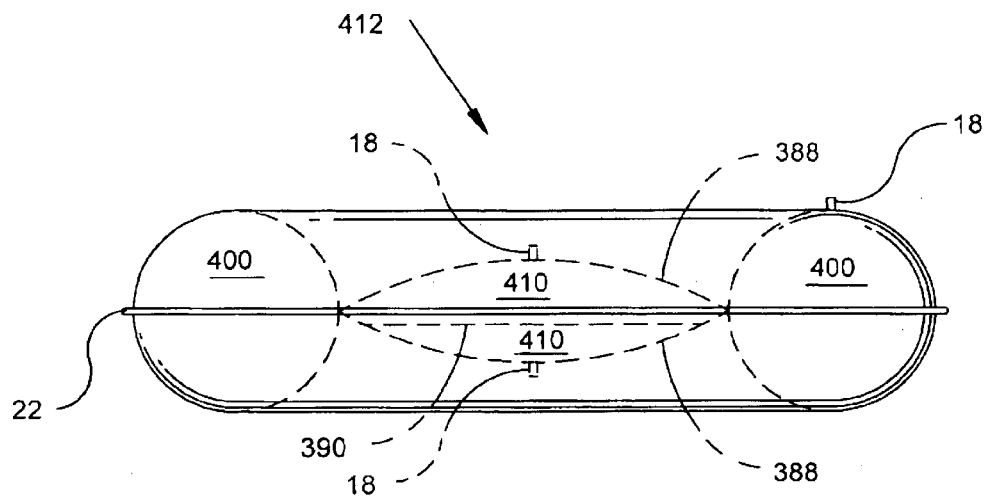
FIG. 63 is a schematic side elevational cross-sectional view of a fifth species of the second main embodiment having an inner-disposed reflective membrane between two outer transparent membranes providing a redundant super-ambient reflector chamber.

FIG. 63 depicts a fifth species 412 of the second main embodiment 386 having two outside transparent membranes 388, 388, which in conjunction with an inner-disposed reflective membrane 390 (shown dashed), form two valved reflector chambers 410, 410. The bottom reflector chamber 410 is considered a redundant chamber, which would be useful in the event of impairment of the upper transparent membrane.

Figure 64:
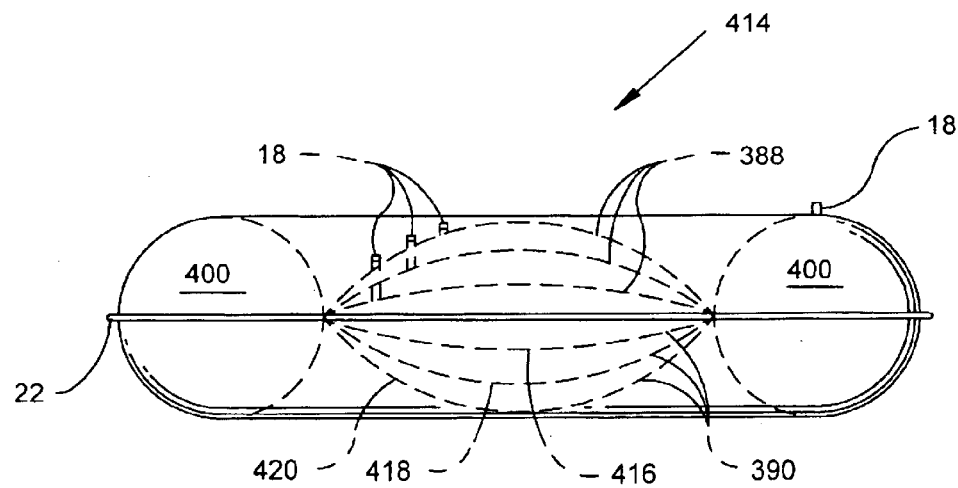
FIG. 64 is a schematic side elevational cross-sectional view of a sixth species of the second main embodiment having multiple nested reflector chambers.

FIG. 64 depicts a sixth species 414 of the second main embodiment 386 having a plurality (e.g., three) of nested reflector chambers 416, 418 and 420, each having an individual inflation valve 18 (or other means for inflating the reflector chamber) and supported by the toroid 400. The upper three membranes 388 are transparent and the lower three membranes 390 are reflective on one or both sides.

It is noted that all species of the second embodiment can optionally be composed of most or all of the morphological, structural, and material varieties (including those for the pressure-deformable membranes, toroidal support ring, valves, and optional elements) as specified for the first embodiment. In addition, the second embodiment of the device can include or be incorporated into most of the portable specialized apparatus shown or otherwise specified for the first embodiment. Furthermore, all of the utilities for the first embodiment apply to the second embodiment except directional sound amplification.

Finally, to facilitate many of the applications of the first and second main embodiments of the instant invention as described herein, it should be noted that various common electronic and/or mechanical accessory devices or apparatus can be integrally or removably incorporated into any apparatus of the instant invention in any useful quantity, location, and combination thereof. Such optional electrical and/or mechanical accessory devices include, but are not limited to, pumps, fans, drive motors, timers, thermostats, flow controllers, photovoltaic cells, movable louvers or iris apparatus (for controlling flow or radiation), and other useful elements. To further enhance the collection, storage, processing, and distribution of water or other liquids, it should be noted that various common liquid handling and processing devices can also be integrally or removably incorporated into any apparatus of the instant invention in any useful quantity, location, and combination including, but not limited to, liquid pumps, pipes, tubes, valves, pressure gauges, flow meters, flow controllers, filters, and other useful elements.

Accordingly, both main embodiments of the present invention and the many alternate configurations thereof generally provide a plurality of effective means for performing one or more focused electromagnetic functions, one or more non-focused electromagnetic functions, and/or one or more non-electromagnetic functions.

Thus, the extensive applicability of the fundamental inflatable, multi-purpose, multifunction apparatus as generally optimized for use as a radiant electromagnetic energy concentration, focusing, and beaming apparatus and field-deployable multifunction tool has been disclosed.

We claim:

1. A portable, multi-function apparatus for use principally as a portable solar cooking, heating, and/or energizing apparatus and/or field-deployable multi-function tool, said multi-function apparatus comprising:

a support ring, said support ring comprising at least one substantially tubular and inflatable ring, said support ring defining a vacant center;

at least one inflation means for inflating said support ring;

at least two pressure-deformable or pressure-deployable membranes extending across the center of said support ring, said membranes defining at least one substantially predetermined portion of at least one inflatable reflector chamber, at least one of said membranes having at least one means for reflecting radiant electromagnetic energy; and at least one pressure adjusting or inflation means for adjusting the pressure within said reflector chamber, wherein said multi-function apparatus is selectably deployable by a user or operator of said apparatus to perform at least one user-selectable function.

2. The apparatus according to claim 1, wherein said support ring and said membranes are substantially made from at least one thin and flexible sheet or gore of at least one type or class of substantially polymeric material, whereby said apparatus is substantially collapsible and/or compactly foldable to facilitate portage and storage.

3. The apparatus according to claim 1, wherein at least one of said inflation means is at least one valve comprising at least one flexible conduit closed by at least one closure means selected from the group consisting of:

a plug;

a tongue-and-groove sealing mechanism;

a self-sealing membrane;

a clamp; and a tie.

4. The apparatus according to claim 1, further comprising at least one accessory device attached to said apparatus, said accessory device being selected from the group consisting of:

a handle;

an apertured tab;

a tying or hanging strap;

a storage pouch; and a stabilizing pouch.

5. The apparatus according to claim 1, further comprising at least one fastener device attached to said apparatus, said fastener device being selected from the group consisting of:

a clevis;

a clip;

a bracket;

a mounting stud;

a socket;

a line; and a hook-and-loop fastening patch.

6. The apparatus according to claim 1, wherein the plurality of pressure-deformable membranes are at least two reflective membranes including a primary reflective membrane and at least one redundant or auxiliary reflective membrane, at least two of said reflective membranes having at least one substantially predetermined functional characteristic, whereby said reflective membranes have at least one substantially identical and/or at least one dissimilar functional characteristic.

7. The apparatus according to claim 1, further comprising at least one access port having a removable or openable fluid-tight cover, whereby said access port allows materials and/or equipment to be added to and/or removed from said apparatus.

8. The apparatus according to claim 1, wherein at least one of said pressure-deformable membranes has at least one outlet duct or port, whereby said outlet duct or port allows substantially fluidic materials to be transferred to, from, and/or through at least one said reflector chamber.

9. The apparatus according to claim 8, wherein said port has a conduit extending through said reflector chamber, whereby said port and said conduit allow substantially fluidic materials collecting on the top or upper surface of the apparatus to be drained through said conduit to an external location substantially below said reflector chamber.

10. The apparatus according to claim 1, wherein said support ring comprises at least two of said substantially tubular and inflatable rings, at least one of said tubular and inflatable rings being attached substantially to and above at least one other of said tubular and inflatable rings substantially above said pressure-deformable membranes, whereby the external volume capacity of the apparatus is increased and/or at least one inflatable element of an inflatable focal point support apparatus is provided.

11. The apparatus according to claim 1, wherein said support ring comprises at least two of said substantially tubular and inflatable rings, at least two of said tubular and inflatable rings being located substantially between at least two of said pressure-deformable membranes, whereby the internal volume capacity of the apparatus is increased.

12. The apparatus according to claim 1, further including at least one gutter attached to said support ring for capturing falling materials, whereby the effective capture area of the apparatus is increased.

13. The apparatus according to claim 1, further comprising at least one strip or band of stretched elastic material attached to at least one surface of at least one of said pressure-deformable membranes to cause wrinkling in a non-fully-deployed reflective membrane as a safety means.

14. The apparatus according to claim 1, further including at least one cover attached to at least one point of said apparatus as a safety means, said cover being rollable or foldable into a retracted position.

15. The apparatus according to claim 1, further comprising at least one alignment element for orienting said apparatus, said alignment element being selected from the group consisting of:

a visual alignment element or guide;

a magnetic compass;

an inclinometer; and a level.

16. The apparatus according to claim 1, further including an inflatable, substantially spherical support for supporting and orienting said support ring, said spherical support comprising a predetermined portion of a substantially spherical surface.

17. The apparatus according to claim 16, further including a separate inflatable support ring for supporting said spherical support.

18. The apparatus according to claim 1, further including at least one inflatable tube for supporting and orienting said apparatus, said tube having at least one compartment with at least one inflation means for inflating said tube, said tube having at least one securing or fastening means for securing each proximal end of said tube to implement a stabile apparatus.

19. The apparatus according to claim 1, further including at least one user-adjustable accessory support apparatus attached to said support ring, said accessory support apparatus comprising at least one rigid element and at least one means for adjustably supporting at least one accessory element in proximity to the focal point.

20. The apparatus according to claim 1, further including at least one safety cage attached to said apparatus, said safety cage including a foldable framework of substantially rigid elements.

21. The apparatus according to claim 1, further including at least one multi-leg support attached to said apparatus for supporting at least one accessory element in proximity to the focal point, said multi-leg support comprising at least one substantially rigid element and at least one means for stabilizing said rigid element.

22. The apparatus according to claim 1, wherein said support ring and said pressure-deformable membranes collectively are formed from a substantially flat pattern of at least four sheets of material.

23. The apparatus according to claim 1, wherein at least one predetermined portion of said support ring is fabricated from at least one predetermined portion or extension of at least one of said pressure-deformable membranes.

24. The apparatus according to claim 1, wherein said support ring is made in a substantially flat pattern from a predetermined portion of at least four sheets of material, whereby said flat pattern enables structural stability to be improved and/or weight to be reduced.

25. The apparatus according to claim 24, wherein the inner portion of said support ring is made from at least two sheets of material having a high-strain capability and the outer portion of said support ring is made from at least two sheets of material having a high elastic modulus.

26. The apparatus according to claim 1, wherein the at least two pressure-deformable membranes include at least one reflective membrane and at least one transparent membrane collectively defining at least one predetermined portion of at least one super-ambient pressurizable reflector chamber.

27. The apparatus according to claim 26, wherein said support ring is made of two pre-formed and joined substantially half-ring pieces, and wherein said support ring is joined to said reflective membrane and said transparent membrane substantially at the juncture of the joined half-ring pieces.

28. The apparatus according to claim 26, wherein substantially one half or side of said apparatus is substantially made from one transparent membrane and joined to an opposing side substantially made from one reflective membrane to form said reflector chamber and said support ring.

29. The apparatus according to claim 26, wherein at least one side of said apparatus is substantially made from one sheet of material.

30. The apparatus according to claim 26, wherein at least one said reflector chamber is attached at a predetermined distance or offset from the inner periphery of said support ring to enlarge the at least one offset reflector chamber.

31. The apparatus according to claim 1, wherein the plurality of pressure-deformable membranes and a predetermined portion of said support ring substantially define at least one said inflatable reflector chamber, wherein said support ring holds a predetermined portion of at least two of said pressure-deformable membranes in a spaced relationship, whereby at least one said inflatable reflector chamber is selectably pressurizable to ambient, sub-ambient, or super-ambient pressure.

32. The apparatus according to claim 31, wherein the plurality of pressure-deformable membranes are at least one reflective membrane and at least one transparent membrane, whereby said apparatus selectably provides a functional concave reflector surface during sub-ambient and super-ambient modes of deployment.

33. The apparatus according to claim 1, wherein at least one of said pressure-deformable membranes substantially covers or encapsulates at least one side of said support ring.

34. The apparatus according to claim 1, wherein at least one of said pressure-deformable membranes is pre-formed, whereby at least one said pressure-deformable membrane having at least one means for reflecting radiant electromagnetic energy provides a substantially fixed focal length as a safety means, and/or whereby the at least one pre-formed pressure-deformable membrane enables the loads imparted on the support ring to be reduced.

35. The apparatus according to claim 1, wherein at least one said pressure-deformable membrane having at least one means for reflecting radiant electromagnetic energy is pre-formed to have a non-parabolic shape to limit the maximum degree of energy concentration, whereby safety is enhanced and/or heating is made more uniform.

36. The apparatus according to claim 35, wherein the non-parabolic, pre-formed, reflective membrane has a surface contour selected from the group consisting of:

a spherical surface;

an undulating or dimpled surface; and a surface comprising a series of conic sections.

37. The apparatus according to claim 1, wherein at least one of said pressure-deformable membranes is planar and reflective, whereby a variable focal length is provided.

38. The apparatus according to claim 1, wherein at least one of said pressure-deformable membranes has a predetermined degree of at least one optical characteristic selected from the group consisting of: color, texture, reflectivity, transparency, and opacity, whereby the membrane selectively filters, absorbs, reflects, transmits, and/or diffuses impinging radiation.

39. The apparatus according to claim 1, wherein a predetermined portion of the external surface of the apparatus has a high-emissivity surface, whereby the absorption and/or emission of radiant electromagnetic energy is enhanced.

40. The apparatus according to claim 1, wherein said means for reflecting radiant electromagnetic energy comprises at least one reflective element selected from the group consisting of:

a thin metallic layer;

a plurality of reflective particles;

a conductive wire; and a conductive mesh.

41. The apparatus according to claim 1, wherein at least one of said pressure-deformable membranes is reflective and has an off-axis focal point.

42. The apparatus according to claim 1, wherein said pressure-deformable membranes are at least three pressure-deformable membranes, at least one of said pressure-deformable membranes being disposed between at least two surrounding pressure-deformable membranes, wherein a plurality of reflector chambers is provided.

43. The apparatus according to claim 1, wherein at least one of said pressure-deformable membranes is pre-formed to a predetermined extent, wherein at least one asymmetrical reflector chamber is provided.

44. The apparatus according to claim 1, wherein the apparatus has at least two of said reflector chambers, at least one of said reflector chambers being nested inside at least one other of said reflector chambers, each of said reflector chambers having at least one said pressure adjusting or inflation means.

45. The apparatus according to claim 1, wherein said support ring has a non-circular planform having an outer peripheral shape incorporating at least one substantially or effectively linear edge or segment, whereby the substantially or effectively linear edge enhances the stability of a free-standing apparatus.

46. The apparatus according to claim 1, further comprising at least one tapered inflatable ring for orienting and leveling said apparatus, said at least one tapered ring having at least one inflation means.

47. The apparatus according to claim 1, further comprising at least one inflatable focal-point support apparatus for supporting at least one accessory element in proximity to the focal point, said inflatable focal-point support apparatus comprising:

at least one inflatable support element attached to and above said support ring; and at least one inflation means for inflating said inflatable support element, whereby said inflatable focal-point support apparatus enables at least one item or accessory element to be supported in proximity to the focal point on an element substantially spanning said inflatable focal-point support apparatus.

48. The apparatus according to claim 1, further comprising at least one anaerobic airlock or pressure relief valve disposed in the upper pressure-deformable membrane, whereby said anaerobic airlock enables said apparatus to function as a portable fermentor apparatus.

49. The apparatus according to claim 1, further comprising:

at least one accessory element including at least one accessory element or accoutrement for holding or containing materials to be processed utilizing concentrated electromagnetic radiation; and at least one means for supporting the at least one accessory element in proximity to the focal point, whereby a portable heating, cooking, and/or processing apparatus is provided.

50. The apparatus according to claim 1, further comprising at least one accessory element including at least one electrical power generating element, and at least one means for supporting the at least one accessory element in proximity to the focal point, said electrical power generating element being selected from the group consisting of:
   a photovoltaic cell;
   a thermoelectric cell; and
   a steam or gas generator for energizing a turbo-electric generator,
   whereby a portable electrical power generating apparatus is provided.

51. The apparatus according to claim 1, further comprising:
   at least one accessory element including at least one electromagnetic radiation antenna device; and
   at least one means for supporting the at least one accessory element in proximity to the focal point,
   whereby a portable high-gain antenna is provided.

52. The apparatus according to claim 1, further comprising:
   at least one accessory element including at least one non-collimated electromagnetic or light source; and
   at least one means for supporting the at least one accessory element in proximity to the focal point,
   whereby a portable electromagnetic beaming, signaling, and/or illumination apparatus is provided.

53. The apparatus according to claim 1, further comprising:
   at least one accessory element including at least one waveguide intake device attached to a waveguide or electromagnetic conduit; and
   at least one means for supporting the at least one accessory element in proximity to the focal point,
   whereby a portable waveguide illumination apparatus is provided.

54. The apparatus according to claim 1, further comprising:
   at least one accessory element including at least one microphone; and
   at least one means for supporting the at least one accessory element in proximity to the focal point,
   whereby a portable high-gain directional acoustic device is provided.

55. The apparatus according to claim 1, further comprising at least one fluid handling accessory element selected from the group consisting of:
   a pump;
   a fan;
   a pipe;
   a tube;
   a conduit;
   a filter;
   a funnel;
   a valve;
   a anaerobic airlock; and
   a pressure-relief valve.

56. The apparatus according to claim 1, further comprising at least one process control element selected from the group consisting of:
   a timer;
   a thermostat;
   a controller;
   a pressure gauge;
   a flow meter;
   a movable louver; and
   an adjustable iris.

57. Apparatus according to claim 1, further including at least one affixed photovoltaic cell to energize at least one electrically powered accessory element.

58. A portable, multi-function, apparatus selectably for use as a radiant electromagnetic energy focusing apparatus, a non-focusing electromagnetic energy manipulating apparatus, and/or a non-electromagnetically functioning or operating apparatus, said multifunction apparatus comprising:
   a support ring, said support ring comprising at least one substantially tubular and inflatable ring, said support ring defining a vacant center;
   at least one inflation means for inflating said support ring;
   at least two pressure-deformable membranes extending across the center of said support ring, said membranes defining at least one substantially predetermined portion of at least one inflatable reflector chamber, at least one of said membranes having at least one means for reflecting radiant electromagnetic energy;
   at least one pressure adjusting or inflation means for adjusting the pressure within said reflector chamber; and
   at least one means for performing at least one function not involving concentrating, focusing, and/or beaming radiant electromagnetic energy, said means selected from the group consisting of:
   a means for collecting fluid;
   a means for storing fluid;
   a means for distributing fluid;
   a means for processing fluid;
   a means for fermenting materials;
   a means for storing material;
   a means for providing waterborne flotation;
   a means for providing snowborne transportation;
   a means for providing a compliant support;
   a means for immobilizing a broken limb;
   a means for concentrating sound;
   a means for providing electrostatic insulation;
   a means for providing thermal insulation; and
   a means for providing electromagnetic insulation,
   wherein said multi-function apparatus is selectably deployable to perform at least one focused electromagnetic function, at least one non-focused electromagnetic function, and/or at least one non-electromagnetic function.

59. A method of establishing or providing at least one function or element of life-sustaining infrastructure within an at least partially infrastructure-deprived environment utilizing a portable, multi-function, field-deployable apparatus, wherein said apparatus is selectably deployable by a user or operator of said apparatus to perform at least one user-selectable function in said environment, said method comprising the steps of:
   providing a support ring, said support ring comprising at least one substantially tubular and inflatable ring, said support ring defining a vacant center;
   providing at least one inflation means for inflating said support ring;

providing at least two pressure-deformable membranes extending across the center of said support ring, said membranes defining at least one substantially predetermined portion of at least one inflatable reflector chamber, at least one of said pressure-deformable membranes having at least one means for reflecting radiant electromagnetic energy;

providing at least one pressure adjusting or inflation means for adjusting the pressure within said reflector chamber; and deploying said support ring and said pressure-deformable membranes in a manner effective for performing a selected function.

60. The method according to claim 59, wherein the deploying step comprises the following steps:

inflating said support ring to support and tension the periphery of said pressure-deformable membranes;

adjusting pressure within said reflector chamber to deform at least one said membrane having at least one means for reflecting radiant electromagnetic energy into a functional concave reflector; and positioning the reflective membrane in a manner effective for allowing transmission of radiant electromagnetic energy between a source and target, whereby said method enables an energy-absorbing object placed in proximity to a focal point of the apparatus to absorb concentrated radiant electromagnetic energy, and/or whereby said method enables an energy-emitting object placed in proximity to a focal point of the apparatus to project radiant electromagnetic energy.

61. The method according to claim 59, wherein the deploying step comprises the following steps:

inflating said support ring to support and tension the periphery of said pressure deformable membranes;

adjusting pressure within said reflector chamber to deform at least one said membrane into a substantially concave surface; and positioning said apparatus in a substantially horizontal orientation with the substantially concave surface facing upward, whereby said method enables said apparatus to capture and/or hold substantially fluidic materials, and/or whereby said method enables said apparatus to support persons and/or objects on land, snow, and/or water.

62. The method according to claim 59, wherein the deploying step comprises the following step:

positioning said apparatus between an element and the surrounding environment to shield or insulate said element from said environment, whereby said method enables said apparatus to provide thermal, electrostatic, and/or electromagnetic insulation.

63. A portable, multi-function, apparatus principally for use as a field-deployable multifunction tool, said apparatus comprising:

a support ring, said support ring comprising at least one substantially tubular and inflatable ring, said support ring defining a vacant center;

at least one inflation means for inflating said support ring;

at least two pressure-deformable membranes extending across the center of said support ring, said membranes defining at least one substantially predetermined portion of at least one inflatable central chamber;

at least one pressure adjusting or inflation means for adjusting the pressure within said central chamber;

at least one mean for collecting fluid; and at least one means for performing at least one supplemental function, said means selected from the group consisting of:
a means for reflecting radiant electromagnetic energy;
a means for concentrating sound;
a means for internally storing fluid;
a means for distributing fluid;
a means for processing fluid;
a means for fermenting materials;
a means for internally storing material;

wherein said multifunction apparatus is selectably deployable by the user or operator of said apparatus to perform at least one user-selectable function.

64. A portable field-deployable electromagnetic energy concentrating apparatus comprising:

a support ring, said support ring comprising at least one substantially tubular and inflatable ring, said support ring defining a vacant center;

at least one inflation means for inflating said support ring;

at least two pressure-deformable membranes extending across the center of said support ring, said membranes defining at least one substantially predetermined portion of at least one inflatable reflector chamber, at least one of said pressure-deformable membranes having at least one means for reflecting radiant electromagnetic energy; and at least one pressure adjusting or inflation means for adjusting the pressure within said reflector chamber;

wherein said apparatus is further characterized by having at least one safety means for reducing the risk of accidental or unintentional exposure to concentrated electromagnetic radiation.

65. The apparatus according to claim 64, wherein said safety means is selected from the group consisting of:
a pre-formed reflector;
a non-parabolic pre-formed reflector;
a safety cover;
a safety cage; and
a strip or band of stretched elastic material for use as a reflector wrinkling mechanism.

66. A method of enhancing the safety of an apparatus having at least one pressure-deformable reflective membrane by using a pre-formed reflective membrane to provide a substantially fixed focal point at a substantially fixed focal length from the reflective membrane, said method comprising the steps of:

providing at least one pre-formed, pressure-deformable, reflective membrane extending across the center of a support ring, said membrane defining a predetermined portion of at least one inflatable reflector chamber, said pressure-deformable membrane having at least one means for reflecting radiant electromagnetic energy; and providing at least one pressure adjusting or inflation means for adjusting the pressure within said reflector chamber, whereby said method substantially limits the apparatus to producing highly concentrated radiant electromagnetic energy only in proximity to the substantially fixed focal point of the apparatus.

67. The method according to claim 66, wherein the provided pre-formed reflective membrane is pre-formed to a non-parabolic shape to limit the maximum degree of energy concentration to further enhance safety.

* * * * *